(12) United States Patent
Sekiya

(10) Patent No.: US 8,595,826 B2
(45) Date of Patent: Nov. 26, 2013

(54) PORTABLE ELECTRONIC DEVICE AND CONTROL METHOD THEREOF

(75) Inventor: Satoshi Sekiya, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 925 days.

(21) Appl. No.: 12/332,947

(22) Filed: Dec. 11, 2008

(65) Prior Publication Data

US 2009/0132852 A1     May 21, 2009

Related U.S. Application Data

(63) Continuation of application No. PCT/JP2007/062363, filed on Jun. 13, 2007.

(30) Foreign Application Priority Data

| Jun. 15, 2006 | (JP) | 2006-166046 |
| Jun. 27, 2006 | (JP) | 2006-176699 |

(51) Int. Cl.

| G06F 7/04 | (2006.01) |
| G06F 12/00 | (2006.01) |
| G06F 12/14 | (2006.01) |
| G06F 13/00 | (2006.01) |
| G06F 11/30 | (2006.01) |
| G06F 7/38 | (2006.01) |
| G06F 9/00 | (2006.01) |
| G06F 9/44 | (2006.01) |
| G11C 7/00 | (2006.01) |

(52) U.S. Cl.
USPC ............ 726/21; 714/15; 714/49; 712/225; 713/190; 713/193; 713/194; 726/26; 726/34

(58) Field of Classification Search
USPC ............................. 726/21; 714/15, 49
See application file for complete search history.

(56) References Cited

U.S. PATENT DOCUMENTS

| 4,709,136 A | * | 11/1987 | Watanabe | 235/379 |
| 5,146,068 A | * | 9/1992 | Ugawa et al. | 235/441 |
| 5,517,460 A | * | 5/1996 | Yamaguchi | 365/233.16 |
| 5,896,325 A | | 4/1999 | Fujioka | |

(Continued)

FOREIGN PATENT DOCUMENTS

| EP | 1 457 915 | 9/2004 |
| JP | 60-207957 | 10/1985 |

(Continued)

OTHER PUBLICATIONS

Singapore Written Opinion dated May 25, 2009.

(Continued)

*Primary Examiner* — Carolyn B Kosowski
(74) *Attorney, Agent, or Firm* — Pillsbury Winthrop Shaw Pittman, LLP

(57) ABSTRACT

A portable electronic device includes a storage unit in which information indicating correct process contents is stored. A reception unit of the portable electronic device receives a command for requesting a process from an external device, and the portable electronic device determines whether or not process contents to be executed according to the received command are matched with process contents stored in the storage unit. When it is determined that process contents according to the received command are matched with process contents stored in the storage unit, the portable electronic device executes a process according to the command received by the reception unit.

20 Claims, 27 Drawing Sheets

(56) References Cited

U.S. PATENT DOCUMENTS

| | | | |
|---|---|---|---|
| 6,092,120 A * | 7/2000 | Swaminathan et al. | 709/247 |
| 6,092,133 A * | 7/2000 | Erola et al. | 710/301 |
| 6,226,749 B1 * | 5/2001 | Carloganu et al. | 726/2 |
| 6,275,938 B1 * | 8/2001 | Bond et al. | 726/23 |
| 6,952,820 B1 * | 10/2005 | Schultz et al. | 717/151 |
| 7,168,065 B1 * | 1/2007 | Naccache et al. | 717/127 |
| 7,225,346 B2 * | 5/2007 | Kawano et al. | 713/300 |
| 7,364,083 B2 * | 4/2008 | Ogawa et al. | 235/487 |
| 7,664,939 B2 * | 2/2010 | Endo et al. | 712/220 |
| 7,684,567 B2 * | 3/2010 | Maillard et al. | 380/227 |
| 8,087,071 B2 * | 12/2011 | Delia et al. | 726/5 |
| 2004/0003166 A1 * | 1/2004 | Sekiya | 711/103 |
| 2004/0059925 A1 * | 3/2004 | Benhammou et al. | 713/189 |
| 2004/0088555 A1 * | 5/2004 | Girard et al. | 713/192 |
| 2005/0251708 A1 * | 11/2005 | Bancel et al. | 714/49 |
| 2006/0109982 A1 * | 5/2006 | Puiatti et al. | 380/200 |
| 2009/0050702 A1 * | 2/2009 | Sekiya | 235/492 |
| 2010/0205149 A1 * | 8/2010 | Sekiya | 707/640 |
| 2010/0310068 A1 * | 12/2010 | Fischer | 380/43 |

FOREIGN PATENT DOCUMENTS

| | | |
|---|---|---|
| JP | 61-196368 | 8/1986 |
| JP | 08-050644 | 2/1996 |
| JP | 11-282991 | 10/1999 |
| JP | 2001-052130 | 2/2001 |
| JP | 2002-342734 | 11/2002 |
| JP | 2003-263615 | 9/2003 |
| JP | 2004-247815 | 9/2004 |
| WO | WO 01/22359 | 3/2001 |
| WO | WO 02/093365 | 11/2002 |
| WO | WO 2005/122071 | 12/2005 |

OTHER PUBLICATIONS

European Search Report dated Nov. 9, 2009.

* cited by examiner

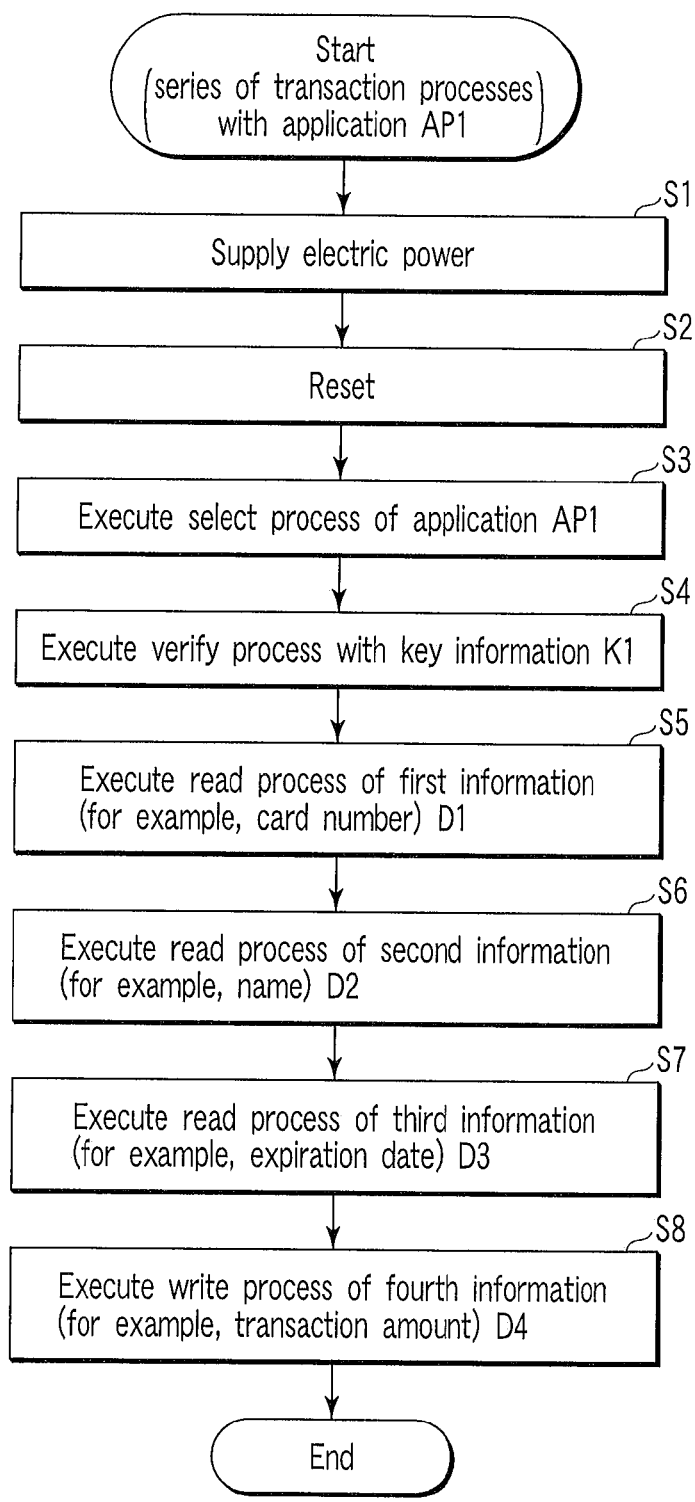
F I G. 3

| Execution sequence | Command | |
|---|---|---|
| | Command code (type of command) | Processing parameter (process contents) |
| 1 | Select | Application AP1 |
| 2 | Verify | Key information K1 |
| 3 | Read | First information D1 |
| 4 | Read | Second information D2 |
| 5 | Read | Third information D3 |
| 6 | Write | Fourth information D4 |

P1

F I G. 4

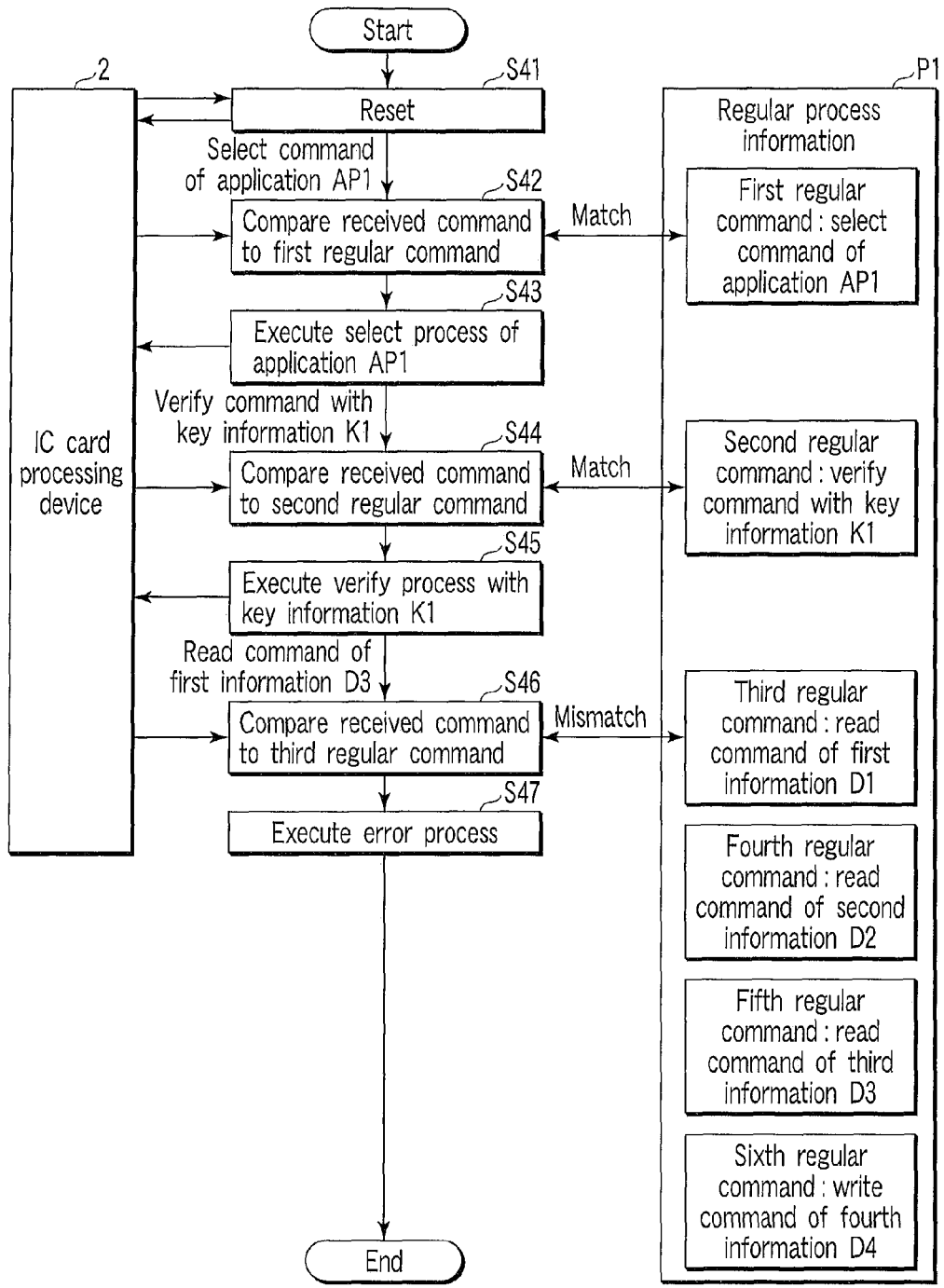
F I G. 7

| Execution sequence | Command | | Permissible time interval |
|---|---|---|---|
| | Command code (type of command) | Processing parameter (process contents) | |
| 1 | Select | Application AP1 | — |
| 2 | Verify | Key information K1 | T12=0.2±0.1 second |
| 3 | Read | First information D1 | T23=0.5±0.1 second |
| 4 | Read | Second information D2 | T34=0.4±0.1 second |
| 5 | Read | Third information D3 | T45=0.6±0.1 second |
| 6 | Write | Fourth information D4 | T56=0.5±0.1 second |

| Application AP1 | | | 
|---|---|---|
| Execution sequence | Command | |
| | Command code (type of command) | Processing parameter (process contents) |
| 1 | Select | Application AP1 |
| 2 | Verify | Key information K1 |
| 3 | Read | First information D1 |
| 4 | Read | Second information D2 |
| 5 | Read | Third information D3 |
| 6 | Write | Fourth information D4 |

P3a

| Application AP2 | | |
|---|---|---|
| Execution sequence | Command | |
| | Command code (type of command) | Processing parameter (process contents) |
| 1 | Select | Application AP2 |
| 2 | Verify | Key information K2 |
| 3 | Read | Fifth information D5 |
| 4 | Write | Sixth information D6 |

P3b

14a

Data table

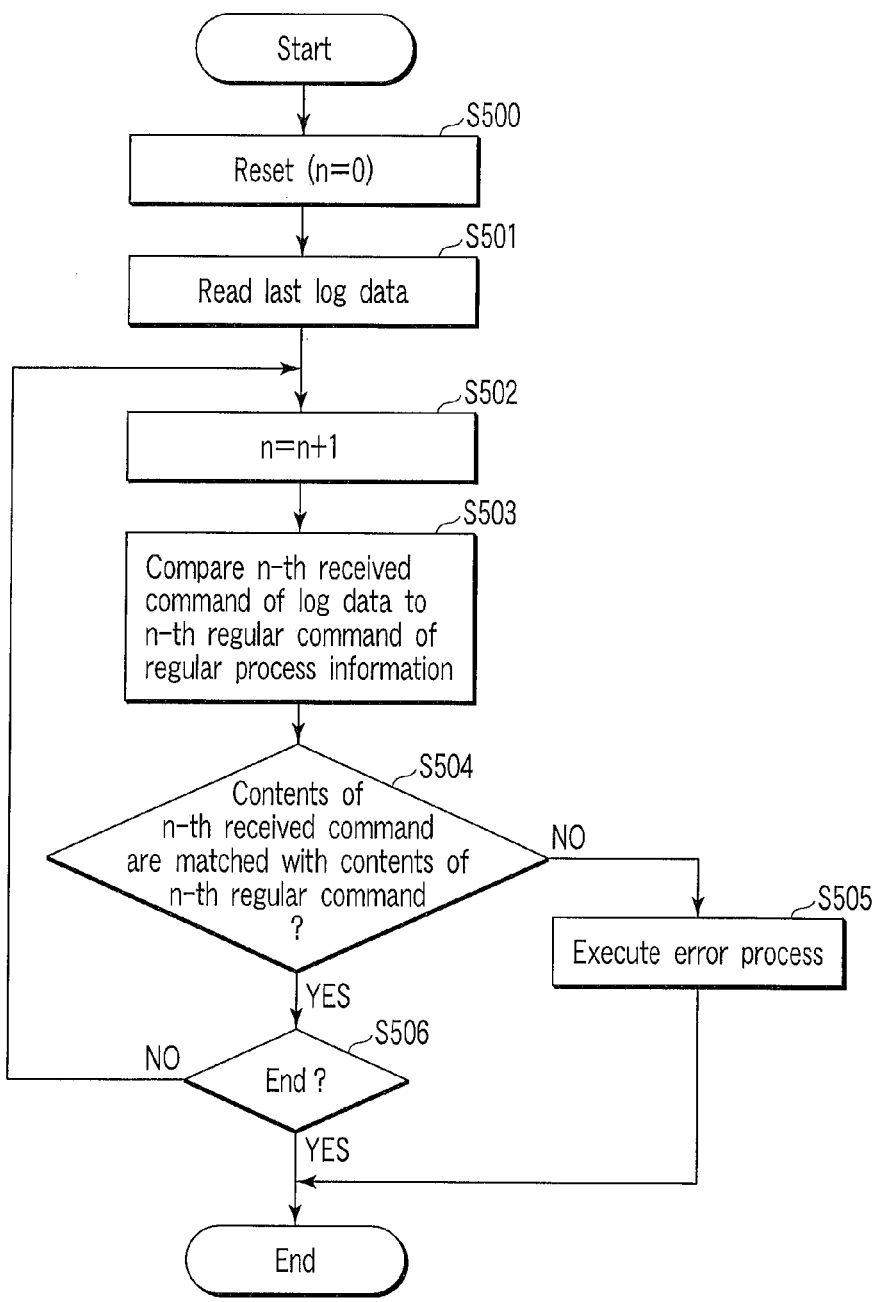
F I G. 21

PORTABLE ELECTRONIC DEVICE AND CONTROL METHOD THEREOF

CROSS-REFERENCE TO RELATED APPLICATIONS

This is a Continuation Application of PCT Application No. PCT/JP2007/062363, filed Jun. 13, 2007, which was published under PCT Article 21(2) in English.

This application is based upon and claims the benefit of priority from prior Japanese Patent Applications No. 2006-166046, filed Jun. 15, 2006; and No. 2006-176699, filed Jun. 27, 2006, the entire contents of which are incorporated herein by reference.

BACKGROUND OF THE INVENTION

1. Field of the Invention

The present invention relates to a portable electronic device, called an IC card, in which, e.g., personal information or transaction information is stored, and a control method thereof.

2. Description of the Related Art

Recently, portable electronic devices, such as the IC card, are utilized in various applications. Particularly, personal information or money-related transaction information is frequently stored in the IC card. In the IC card or a system in which the IC card is used, a high level of security is demanded, and a technique of preventing unauthorized access is demanded.

Jpn. Pat. Appln. KOKAI Publication Nos. 60-207957 (Pat. document 1) and 11-282991 (Pat. document 2) disclose techniques of detecting the unauthorized access based on a type of command and an execution sequence for the IC card. In the techniques, the type of correct command (command name) and the execution sequence are stored in a data table, and the IC card restricts the execution of the given command when the various commands are given in the sequence which is not stored in the data table or when a type of command (command name) which is not stored in the data table is given. However, in the techniques, process contents of each command are not checked. Accordingly, even if the process contents of each command is not authorized, the IC card cannot detect fraud but execute each command when the each command is given in each command name according to a predetermined sequence.

Recently, IC cards are being provided with ever higher levels of functionality. In the multifunctional IC card, various processes (functions) are realized by plural applications. The applications execute various processes according to different process sequences, respectively. Accordingly, in the conventional technique, there is also a problem that the execution sequence cannot be restricted in each application for the one IC card in which the plural applications are operated.

In the conventional technique, during the execution according to the predetermined sequence, the IC card executes the process according to the command. Accordingly, even if the fraud of the execution sequence by the command name is detected to halt the process, the process result executed prior to process halting cannot be canceled. For example, when data stored in a memory is rewritten in response to a write command given according to the predetermined execution sequence, the rewritten data cannot be restored even if the fraud is detected by the subsequent command execution sequence. That is, in the conventional technique, there is a problem that the data is possibly altered before the unauthorized access is detected.

Particularly, in a contactless IC card which executes various processes through wireless communication with an upper-level device, the unauthorized access is possibly made without being noticed by a user. This is because a malicious third party may make access to the IC card through wireless communication while the user is not aware of the unauthorized access, even if the user properly manages the IC card.

Because there is a limitation of a device size for the IC card, the IC card has a low-speed and small-capacity EEPROM or flash memory which is built in as a non-volatile memory. That is, in the IC card, unlike a general information processing device such as a computer, it is difficult to perform a process of detecting the unauthorized access using a hard disk drive or a large-capacity non-volatile memory.

WO 01/022359 (Pat. document 3) discloses a technique of displaying information indicating that the unauthorized access is made to the IC card. However, in the technique of Pat. document 3, it is necessary that the IC card include a particular circuit and component for performing the display on the IC card. The user is possibly not aware of the unauthorized access even if the information indicating that the unauthorized access is made to the IC card is displayed. Furthermore, even if the information indicating that the unauthorized access is made to the IC card is displayed, it is difficult to closely examine the contents of the unauthorized access.

BRIEF SUMMARY OF THE INVENTION

In view of the foregoing, an object of the invention is to provide a portable electronic device having a high level of security and a control method thereof.

A portable electronic device according to one aspect of the present invention comprises: a storage unit in which information indicating correct process contents is stored; a reception unit which receives a command for requesting a process from an external device; a determination unit which determines whether or not process contents to be executed according to the command received by the reception unit are matched with the process contents stored in the storage unit; and an execution unit which executes a process according to the command received by the reception unit when the determination unit determines that the process contents to be executed according to the command received by the reception unit are matched with the process contents stored in the storage unit.

A portable electronic device according to one aspect of the present invention comprises: a first storage unit in which regular process information indicating process contents of a regular series of processes is previously stored; a reception unit which receives a command from an external device; an execution unit which executes a process according to the command received by the reception unit; a second storage unit in which history information is stored, the history information indicating process contents executed by the execution unit according to the command received by the reception unit; and a detection unit which detects an unauthorized access from the history information stored in the second storage unit based on the information indicating regular process contents stored in the first storage unit.

A method of controlling a portable electronic device according to one aspect of the present invention comprises: receiving a command for requesting a process from an external device; determining whether or not process contents to be executed according to the received command received are matched with information indicating correct process contents stored in a storage unit; and executing a process according to the received command, when it is determined that the process contents to be executed according to the received command are matched with the process contents stored in the storage unit.

A method of controlling a portable electronic device according to one aspect of the present invention comprises: receiving a command from an external device; executing a process according to the received command; storing history information in a second storage unit, the history information indicating process contents executed according to the received command; and detecting an unauthorized access from the history information stored in the second storage unit based on the information indicating regular process contents previously stored in a first storage unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

FIG. 3 is a flowchart showing an example of correct process in the IC card;

FIG. 4 shows an example of regular process information which is information indicating correct process contents;

FIG. 7 is a flowchart showing a second example of the unauthorized access detected by the first fraud detecting process;

FIG. 9 shows an example of regular process information including a permissible time interval which is a reception interval of each correct command;

FIG. 12 shows an example of plural pieces of regular process information which are set in each application;

FIG. 21 is a flowchart showing a fourth fraud detecting process;

DETAILED DESCRIPTION OF THE INVENTION

First and second embodiments of the invention will be described below with reference to the drawings.

Figure 1:
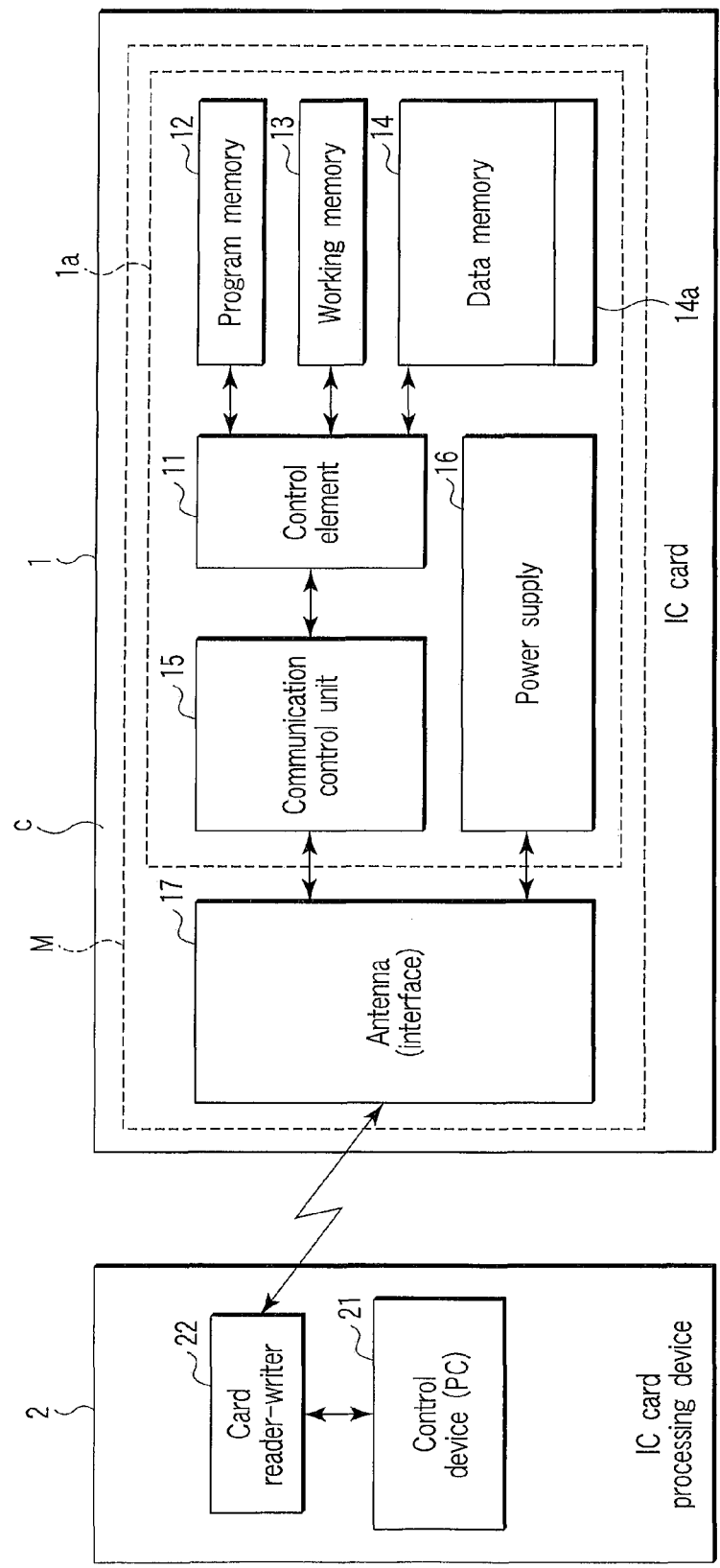
FIG. 1 is a block diagram showing a configuration example of an IC card according to first and second embodiments of the invention and a system including the IC card.

FIG. 1 is a block diagram showing a configuration example of an IC card according to the first and second embodiments of the invention and a system including the IC card.

The IC card 1 enters an operable upon electric power delivery from an IC card processing device 2, which is an external device. The operable IC card 1 executes various processes according to a command from the IC card processing device 2. The IC card processing device 2 issues commands for making a request of the IC card to execute various processes while supplying the electric power for operating the IC card 1. The IC card processing device 2 issues a command to the IC card 1 to execute a process according to an intended purpose or an operation mode.

The IC card 1 may be a contactless portable electronic device (contactless IC card) which conducts wireless communication with the IC card processing device 2 in a contactless manner using an antenna or a wireless communication unit, or the IC card may be a contact portable electronic device (contact IC card) which conducts communication with the IC card processing device 2 in a physically or electrically contact manner. The IC card 1 may also be a complex type IC card (dual interface IC card) having both the communication function as the contactless IC card and the communication function as the contact IC card. The first and second embodiments will mainly be described on the assumption that the invention is applied to the contactless IC card. The contactless IC card differs mainly from the contact IC card only in a method of conducting communication with the IC card processing device 2. Therefore, the following embodiments of the invention can similarly be applied to the contact IC card.

The configuration of the IC card 1 will be described.

As shown in FIG. 1, the IC card 1 includes a control element 11, a program memory 12, a working memory 13, a data memory 14, a communication control unit 15, a power supply 16, and an antenna (interface) 17.

Figure 2:
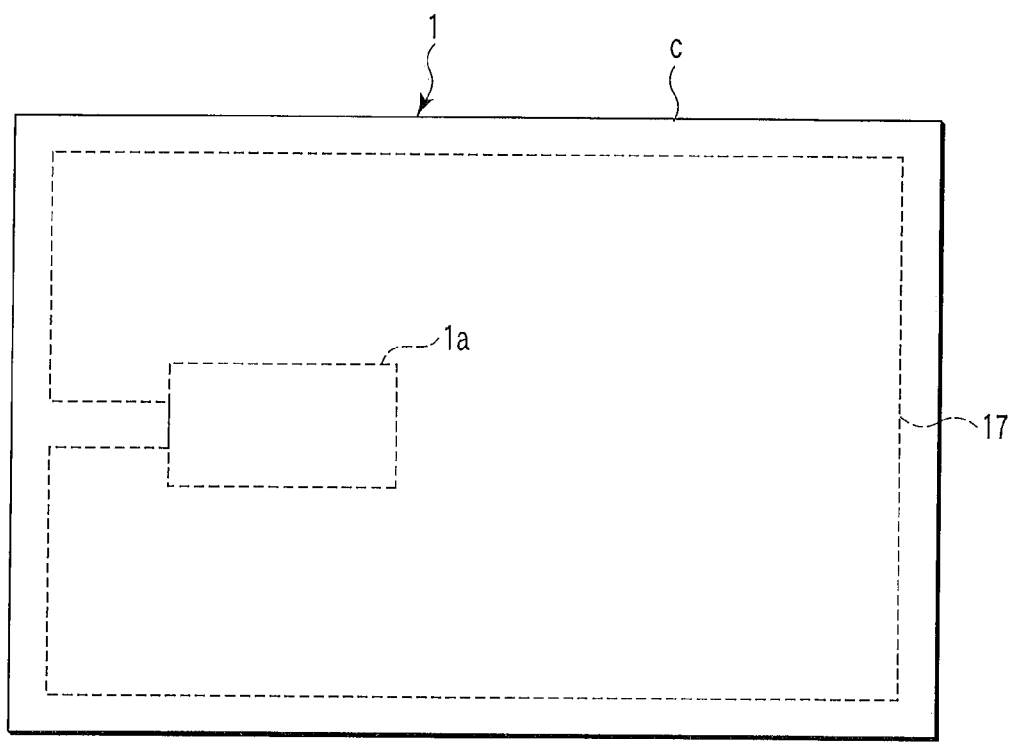
FIG. 2 shows a configuration example of an entire contactless IC card.

The body of IC card 1 is formed in the shape of a card. One (or plural) IC chip 1a and the antenna 17 are embedded in the card-shape body forming the IC card 1. The IC chip 1a includes the control element 11, the program memory 12, the working memory 13, the data memory 14, the communication control unit 15, and the power supply 16. The IC chip 1a is modularized, and is connected to the antenna 17, and is embedded in the card-shape body forming the IC card 1. FIG. 2 shows the configuration of the entire contactless IC card. The contactless IC card of FIG. 2 includes a card-shape body C. A module M including the one (or plural) IC chip 1a and antenna 17 is embedded in the body C as shown by a dotted line of FIG. 2.

The control element 11 controls the entire IC card 1. The control element 11 is operated based on a control program and control data which are stored in the program memory 12 or the data memory 14. The control element 11 executes the control program for controlling the basic operation, which executes the process according to the command issued from the external device. For example, when the external device issues the command to write data in the data memory 14, the control element 11 executes the process of writing the data in the data memory 14. When the external device issues the command to read the data stored in the data memory 14, the control element 11 executes the process of reading the data from the data memory 14. The control element 11 executes a processing program which is installed according to the intended purpose of the IC card 1, which realizes the process according to the intended purpose.

The program memory 12 is formed by a read-only memory (ROM). The control program and control data which control the basic operation of the IC card 1 are previously stored in the program memory 12. The control program and control data are previously stored in the program memory 12 according to specifications of the IC card 1. For example, using the control program stored in the program memory 12, the control element 11 executes the process according to the command issued from the outside.

The working memory 13 is formed by a volatile memory (random access memory (RAM)). The working memory 13 functions as a buffer memory in which the data is temporarily stored. For example, the data which is transmitted and received in a communication process with the IC card processing device (external device) 2 is temporarily stored in the working memory 13. The working memory 13 is also used as a memory in which various pieces of write data are temporarily stored.

The data memory (non-volatile memory) 14 is a non-volatile memory in which the data can be written. The data memory 14 is formed by, e.g., an EEPROM or a flash memory. The applications (processing program and operational data) are stored in the data memory 14 according to the intended purpose of the IC card 1. In the case where the IC card 1 is used for plural intended purposes, the plural applications are stored in the data memory 14 according to each of the plural intended purposes. The application according to the intended purpose of the IC card 1 is stored in a file related to each intended purpose, such as a program file and a data file, which is defined on the data memory 14. The file structure is formed based on, e.g., ISO/IEC 7816-4. That is, various applications and various pieces of operational data can be stored in the data memory 14 of the IC card 1.

Various pieces of setting data are also stored in the data memory 14. The pieces of setting data may be written in the data memory 14 while being not rewritten. In the configuration of FIG. 1, a data table 14a in which regular process information P (P1, P2, P3, and P4) is stored is provided in the data memory 14. The regular process information P stored in the data table 14a is information for making a determination whether or not a series of processes executed is a correct process.

For example, in the regular process information P stored in the data table 14a, each command in the series of processes includes the information indicating an execution sequence (reception sequence), a type of command (command code), process contents (processing parameter), and timing to be received. The regular process information P is stored in the data table 14a in each application. The plural pieces of regular process information P may be stored in the data table 14a for each application. The regular process information P (P1, P2, P3, and P4) stored in the data table 14a will be described in detail later.

History information (log data) is also stored in the data memory 14. The history information indicates both the command issued from the outside and contents of the series of processes executed according to the external command by the IC card 1. The log data (hereinafter also simply referred to as log) stored in the data memory 14 will be described in detail later in the second embodiment.

Furthermore, error history information may also be recorded in the data memory 14. The error history information indicates contents of the unauthorized access when it is determined that the command is unauthorized access from the outside (a command group issued from the outside is not authorized).

The communication control unit 15 controls data communication with an external device (for example, IC card processing device 2) through the antenna 17. When the data is received from the external device, the communication control unit 15 demodulates transmission data serving as the radio wave received through the antenna 17, and supplies the demodulated signal to the control element 11. When the data is transmitted to the external device, the communication control unit 15 modulates the data given from the control element 11, and transmits the modulated data in the form of a radio wave through the antenna 17. In place of the antenna 17, the contact IC card conducts the data communication with the external device through an interface which comes into physical contact with a contact portion of the external device.

The power supply 16 generates the electric power and clock pulse, which are used to operate each unit of the IC card 1, from the radio wave received through the antenna 17. The power supply 16 supplies the electric power voltage and clock pulse, which are generated from the radio wave received through the antenna 17, to each unit. When the control element 11 is turned on by the electric power delivery from the power supply 16, the control element 11 resets a processing state of the IC card 1. In the contact IC card, each unit is operated by the electric power and clock pulse which are directly supplied from the external device through the interface.

Next, the IC card processing device 2 will be described.

As shown in FIG. 1, the IC card processing device 2 includes a control device 21 and a card reader-writer 22. The control device 21 is a personal computer (PC) or the like. The control device 21 includes a computation processing unit such as CPU, various memories such as RAM, ROM, a non-volatile memory, and a hard disk drive, and various interfaces such as a communication interface. In the control device 21, the computation processing unit executes various control programs stored in the memory, which realizes various processes. The control device 21 inputs and outputs the data to and from the card reader-writer 22, which conducts the data communication with the IC card 1.

For example, a control program is previously stored in the control device 21 according to various processes in which the IC card 1 is used. The control device 21 executes the control program to realize various processes in which the IC card 1 is used. For example, in various processes in which the IC card 1 is used, the control device 21 issues a predetermined command according to a predetermined sequence. The control device 21 executes the various processes according to the command based on each response (information indicating process result for the command) from the IC card 1.

The card reader-writer 22 functions as communication means for conducting the data communication with the IC card 1. The card reader-writer 22 conducts the data communication according to a communication method of the IC card 1. That is, the control device 21 realizes the data communication with the IC card 1 through the card reader-writer 22.

In the case where the IC card 1 is formed by the contactless IC card, the card reader-writer 22 includes an antenna and a communication control unit (such as a modulation and demodulation circuit) to conduct the wireless data communication with the IC card 1. When the data is transmitted to the contactless IC card 1, the card reader-writer 22 modulates the transmission data given from the control device 21 by the communication control unit, and transmits the modulated signal in the form of the radio wave through the antenna. When the data is received from the contactless IC card 1, the card reader-writer 22 demodulates the signal which is the radio wave received through the antenna using the communication control unit, and supplies the demodulated data as the reception data to the control device 21. Additionally, the card reader-writer 22 transmits the electric power and clock pulse, which are used to operate the IC card 1, through the antenna simultaneously with transmission/reception of the data.

In the case where the IC card 1 is formed by the contact IC card, the card reader-writer 22 includes the communication control unit and the contact portion which comes into physical contact with the IC card 1 to conduct the data communication. When the card reader-writer 22 transmits and receives the data to and from the contact IC card, the contact portion of the card reader-writer 2 comes into physical contact with the contact portion provided on the side of the IC card 1 to conduct various kinds of data communication. The card reader-writer 22 supplies the electric power and clock pulse to the IC card 1 through the contact portion which is in physical contact with the IC card 1.

Next, a process in the IC card 1 will schematically be described.

In the IC card 1, the series of processes is executed according to the commands sequentially issued from the IC card processing device 2. The IC card processing device 2 sequentially issues the commands having predetermined process contents to the IC card 1 according to a predetermined processing sequence. In response to the commands, the IC card 1 executes the process according to each command, and transmits the process result to the IC card processing device 2.

For example, in the case where the money transaction process is executed using the IC card 1, the IC card processing device 2 sequentially supplies predetermined commands to the IC card 1 based on a predetermined processing sequence (i.e., a predetermined control program for the transaction process) of the transaction process. In the IC card 1, the processes are sequentially executed according to the commands sequentially issued from the IC card processing device 2. Therefore, the IC card processing device 2 and the IC card 1 realize the transaction process.

In the IC card 1, the application (processing program and operational data) is previously stored in the memory (for example, data memory 14) according to the series of processes requested from the IC card processing device 2. The application stored in the memory of the IC card 1 is used to realize various functions according to the intended purpose of the IC card 1. Accordingly, in the IC card 1 which realizes various functions, sometimes plural applications are simultaneously stored in the memory of the IC card 1.

Next, an example of the series of processes will be described. The IC card 1 sequentially executes processes having the predetermined process contents according to a predetermined process sequence to realize the series of processes.

The money transaction process will be described here as a specific example of the series of processes. It is assumed that, in the IC card 1, the transaction process is realized by the application AP1.

As described above, in the transaction process, the processes having the predetermined process contents are executed according to the predetermined sequence. Therefore, in the correct transaction process, the IC card processing device 2 issues the predetermined commands to the IC card 1 according to the predetermined sequence. In other words, when the predetermined commands are issued according to the predetermined sequence in the transaction process, it can be determined that the IC card processing device 2 makes the correct access to the IC card 1. In contrast, when the predetermined commands are not issued according to the predetermined sequence in the transaction process, it can be determined that the IC card processing device 2 makes the unauthorized access to the IC card 1.

A flow in which the IC card 1 executes the transaction process according to the correct sequence will be described below.

FIG. 3 is a flowchart showing an example of the correct transaction process executed by an application AP1 in the IC card 1.

In the correct transaction process, it is assumed that the IC card 1 sequentially executes a select process of the application AP1, a verify process with key information K1, a read process of first information D1, a read process of second information D2, a read process of third information D3, and a write process of fourth information D4. In this case, a "select" command C1 for requesting selection of the application AP1, a "verify" command C2 for requesting verification with the key information K1, a "read" command C3 for requesting read of the first information D1, a "read" command C4 for requesting the read of the second information D2, a "read" command C5 for requesting the read of the third information D3, a "write" command C6 for requesting write of the fourth information D4 are sequentially issued to the IC card 1 from the IC card processing device 2.

In the IC card processing device 2, during a standby state, the card reader-writer 22 transmits the electric power and clock pulse in the form of the radio wave to operate the IC card 1 as a response request signal for the IC card 1.

When the IC card 1 is presented within a communication range of the card reader-writer 22 of the IC card processing device 2 which is in the above state, the IC card 1 receives the radio wave which is the response request signal from the IC card processing device 2 through the antenna 17. The radio wave received through the antenna 17 is converted into the power supply voltage and clock pulse by the power supply 16, and the power supply voltage and clock pulse are used to operate the IC card 1. The power supply 16 supplies the power supply voltage and clock pulse generated from the received radio wave to each unit of the IC card 1 (Step S1). This enables the IC card 1 to be operated.

In the IC card 1 which is in the operable state, the control element 11 resets each unit (Step S2). When the reset is completed, the control element 11 of the IC card 1 transmits a response indicating that the process can be executed to the IC card processing device 2.

In the IC card processing device 2, the card reader-writer 22 receives the radio wave which is the response from the IC card 1. When the card reader-writer 22 receives the response from the IC card 1, the control device 21 of the IC card processing device 2 transmits the command (select command) C1 to the IC card 1 to select the application AP1 which is the application for executing the transaction process.

A command code of the select command C1 is information which indicates a "command for requesting the selection of the application (current directory)". A processing parameter of the select command C1 includes information indicating that "a selection target is the application AP1 (directory of application AP1)".

When the select command C1 is received, the IC card 1 executes an application select process of selecting the application specified by the command (Step S3). In the IC card 1 which has received the command from the IC card processing device 2, the control element 11 determines the type of the command based on the command code included in the received command, and determines the process contents (process target) based on the processing parameter included in the received command C1. In this case, from the command code and processing parameter of the received select command C1, the control element 11 of the IC card 1 recognizes that the IC card processing device 2 requests the selection of the application AP1. Accordingly, when the select command C1 is received, the control element 11 of the IC card 1 executes the process of selecting the application AP1 (application select process).

When the application AP1 is selected by the application select process, the control element 11 transmits the response (response indicating the process result of the select command C1) indicating that the application AP1 is selected to the IC card processing device 2. In the case where the application AP1 cannot be selected by the application select process (namely, in the case where an error is generated in the application select process), the control element 11 transmits the response (response indicating the process result of the select command C1) indicating that the control element 11 fails to select the application AP1 to the IC card processing device 2.

When the IC card processing device 2 receives the response indicating that the application AP1 is selected as the response to the select command C1, the control device 21 of the IC card processing device 2 requests the verify process to the IC card 1. The verify process in which the key information K1 is used is a predetermined process subsequent to the application select process. The key information K1 is verification information corresponding to the application AP1.

The control device 21 of the IC card processing device 2 transmits to the IC card 1 the command (verify command) C2 for requesting the verify process based on the key information K1 corresponding to the application AP1 of the IC card 1. The verify command C2 is information indicating that the command code is the verify request. The processing parameter of the verify command C2 includes the encrypted key information K1.

When the IC card 1 receives the verify command C2, the IC card 1 executes the verify process (key collating process) with the key information K1 (Step S4). When the verify command C2 is received from the IC card processing device 2, the control element 11 of the IC card 1 recognizes that the IC card processing device 2 requests the verify process with the key information K1 from the command code and processing parameter of the received verify command C2. Accordingly, when the verify command C2 is received, the control element 11 of the IC card 1 executes the process (verify process) of collating the key information K1 included in the processing parameter of the verify command C2.

When the verify process is successfully executed with the key information K1, the control element 11 transmits the response (response indicating the process result of the verify command C2) indicating that the verify process is successfully executed with the key information K1 to the IC card processing device 2. In the case where the control element 11 fails to execute the verify process with the key information K1, the control element 11 transmits the response (response indicating the process result of the verify command C2) indicating that the control element 11 fails to execute the verify process with the key information K1 to the IC card processing device 2.

When the IC card processing device 2 receives the response indicating that the verify process is successfully executed with the key information K1 as the response to the verify command C2, the control device 21 of the IC card processing device 2 requests the read process of the first information (for example, card number) D1 to the IC card 1. The read process of the first information D1 is a predetermined process subsequent to the verify process. The first information D1 is information which is retained by the IC card 1 as data (data file existing in the directory of the application AP1) corresponding to the application AP1.

The control device 21 of the IC card processing device 2 transmits the command (read command) C3 to the IC card 1 to request the read of the first information D1 corresponding to the application AP1 of the IC card 1. The read command C3 is information which indicates that the command code is the request of the data read. The processing parameter of the read command C3 includes the information indicating that the data of the read target is the first information D1.

When the IC card 1 receives the read command C3, the IC card 1 executes the process (first read process) of reading the first information D1 (Step S5). When the read command C3 is received from the IC card processing device 2, the control element 11 of the IC card 1 recognizes that the IC card processing device 2 requests the read process of the first information D1 from the command code and processing parameter of the received read command C3. Accordingly, when the read command C3 is received, the control element 11 of the IC card 1 executes the process (first read process) of reading the first information D1 which is specified by the processing parameter of the read command C3.

When the first information D1 is read by the first read process, the control element 11 of the IC card 1 transmits the response (response indicating the process result of the read command C3) including the information read as the first information D1 to the IC card processing device 2. In the case where the control element 11 fails to read the first information D1 through the first read process, the control element 11 transmits the response (response indicating the process result of the read command C3) indicating that the control element 11 fails to read the first information D1 to the IC card processing device 2.

When the IC card processing device 2 receives the response (response including the read first information D1) indicating that the first information is successfully read as the response to the read command C3, the control device 21 of the IC card processing device 2 requests the read process of the second information (for example, name) D2 to the IC card 1. The read process of the second information D2 is a predetermined process subsequent to the first read process. The second information D2 is information which is retained by the IC card 1 as data (data file existing in the directory of the application AP1) corresponding to the application AP1.

The control device 21 of the IC card processing device 2 transmits the command (read command) C4 to the IC card 1 to request the read of the second information D2 corresponding to the application AP1 of the IC card 1. The read command C4 is information which indicates that the command code is the request of the data read. The processing parameter of the read command C4 includes the information indicating that the data of the read target is the second information D2.

When the IC card 1 receives the read command C4, the IC card 1 executes the process (second read process) of reading the second information D2 (Step S6). When the read command C4 is received from the IC card processing device 2, the control element 11 of the IC card 1 recognizes that the IC card processing device 2 requests the read process of the second information D2 from the command code and processing parameter of the received read command C4. Accordingly, when the read command C4 is received, the control element 11 of the IC card 1 executes the process (second read process) of reading the second information D2 which is specified by the processing parameter of the read command C4.

When the second information D2 is read by the second read process, the control element 11 transmits the response (response indicating the process result of the read command C4) including the information read as the second information D2 to the IC card processing device 2. In the case where the control element 11 fails to read the second information D2 through the second read process, the control element 11 transmits the response (response indicating the process result of the read command C4) indicating that the control element 11 fails to read the second information D2 to the IC card processing device 2.

When the IC card processing device 2 receives the response (response including the read second information D2) indicating that the second information is successfully read as the response to the read command C4, the control device 21 of the IC card processing device 2 requests the read process of the third information (for example, expiration date) D3 to the IC card 1. The read process of the third information D3 is a predetermined process subsequent to the second read process. The third information D3 is information which is retained by the IC card 1 as data (data file existing in the directory of the application AP1) corresponding to the application AP1.

The control device 21 of the IC card processing device 2 transmits the command (read command) C5 to the IC card 1 to request the read of the third information D3 corresponding to the application AP1 of the IC card 1. The read command C5 is information which indicates that the command code is the request of the data read. The processing parameter of the read command C5 includes the information indicating that the data of the read target is the third information D3.

When the IC card 1 receives the read command C5, the IC card 1 executes the process (third read process) of reading the third information D3 (Step S7). When the read command C5 is received from the IC card processing device 2, the control element 11 of the IC card 1 recognizes that the IC card processing device 2 requests the read process of the third information D3 from the command code and processing parameter of the received read command C5. Accordingly, when the read command C5 is received, the control element 11 of the IC card 1 executes the process (third read process) of reading the third information D3 which is specified by the processing parameter of the read command C5.

When the third information D3 is read by the third read process, the control element 11 transmits the response (response indicating the process result of the read command C5) including the information read as the third information D3 to the IC card processing device 2. In the case where the control element 11 fails to read the third information D3 through the third read process, the control element 11 transmits the response (response indicating the process result of the read command C5) indicating that the control element 11 fails to read the third information D3 to the IC card processing device 2.

When the IC card processing device 2 receives the response (response including the read third information D3) indicating that the first information is successfully read as the response to the read command C5, the control device 21 of the IC card processing device 2 requests the write process of the fourth information (for example, transaction amount) D4 to the IC card 1. The write process of the fourth information D4 is a predetermined process subsequent to the third read process. The fourth information D4 is information which is written in the IC card 1 as data (data file existing in the directory of the application AP1) corresponding to the application AP1.

The control device 21 of the IC card processing device 2 transmits the command (write command) C6 to the IC card 1 to request the write of the fourth information D4 corresponding to the application AP1 of the IC card 1. The write command C6 is information which indicates that the command code is the request of the data write. The processing parameter of the write command C6 includes the information indicating that the data of the write target is the fourth information D4.

When the IC card 1 receives the write command C6, the IC card 1 executes the process (write process) of writing the fourth information D4 (Step S8). When the write command C6 is received from the IC card processing device 2, the control element 11 of the IC card 1 recognizes that the IC card processing device 2 requests the write process of the fourth information D4 in the data memory 14 from the command code and processing parameter of the received write command C6. Accordingly, when the write command C6 is received, the control element 11 of the IC card 1 executes the process (write process) of writing the fourth information D4, specified by the processing parameter of the write command C6, in the data memory 14.

When the fourth information D4 is written in the data memory 14 by the write process, the control element 11 transmits the response (response indicating the process result of the write command C6) including that the fourth information D4 is successfully written to the IC card processing device 2. In the case where the control element 11 fails to write the fourth information D4 through the write process, the control element 11 transmits the response (response indicating the process result of the write command C6) indicating that the control element 11 fails to write the fourth information D4 to the IC card processing device 2.

When the IC card processing device 2 receives the response indicating that the fourth information D4 is successfully written as the response to the write command C6, the control device 21 of the IC card processing device 2 determines that the series of transaction processes is normally ended to the IC card 1. When the IC card processing device 2 receives the response that the process according to the command cannot normally be ended as the response to each of the commands C1 to C6, the control device 21 of the IC card processing device 2 determines that the error is generated in the series of transaction process to the IC card 1. In the case where the error is generated, the control device 21 of the IC card processing device 2 can execute the series of transaction processes again from the beginning, or the control device 21 can stop the series of transaction processes.

As described above, in the series of correct transaction processes with the application AP1, the plural predetermined commands are sequentially issued to the IC card 1 according to the predetermined sequence. Accordingly, in the series of correct transaction processes with the application AP1, unless each command for requesting the predetermined process contents is issued to the IC card according to the predetermined sequence, it can be determined that the external device highly possibly requests the unauthorized process.

The first and second embodiments applied to the IC card 1 will be described below.

In the first embodiment, the IC card 1 previously stores regular process information indicating a regular process sequence and regular process contents in the data table, and the IC card 1 detects the unauthorized access by comparing the regular process information to contents of each received command.

In the second embodiment, the IC card 1 previously stores the command and process contents received as the log data in each series of processes, and the IC card 1 detects the unauthorized access by comparing the regular process information previously stored in the data table with the log data.

The first embodiment will be described.

Various techniques (fraud detecting process) in which the IC card 1 detects the unauthorized access made by the external device (IC card processing device 2) will be described in the first embodiment. In the first embodiment, a first fraud detecting process, a second fraud detecting process, and a third fraud detecting process will be described as the technique of detecting the unauthorized access.

The first fraud detecting process according to the first embodiment which is applied to the IC card 1 will be described.

In the first fraud detecting process, it is assumed that regular process information P indicating the correct process contents and process sequence is previously stored in the data table 14a of the data memory 14 of the IC card 1. That is, it is assumed that the pieces of information indicating the process contents (type of command and process target) of the commands used in the correct process and the execution sequence of the commands are previously stored as the regular process information P1 in the data table 14a of the data memory 14 of the IC card 1. In the following description, in the regular process information, each command whose process contents are defined is called a regular command and also called an n-th regular command by combination with the defined sequence.

It is assumed that the information indicating the process contents of each regular command includes at least the information (command code) indicating the type of command and the information (processing parameter) indicating the process target (process target of the command). The processing parameter indicates data (a value) which should be permitted as the process target of each regular command. Therefore, the processing parameter may be one value, plural values, or a value range. In the first embodiment, it is assumed that one command code is set as the command code. However, plural command codes may be set as the command code.

On the basis of the regular process information P, the IC card 1 determines whether or not the commands sequentially issued from the IC card processing device (external device) 2 are not only the correct sequence but the correct process contents. When the process contents of the commands issued from the IC card processing device 2 are not matched with the process contents of the regular commands specified by the regular process information P, the IC card 1 determines that the commands issued from the IC card processing device 2 are the unauthorized command (unauthorized access).

For example, when the processing parameter of the regular command specified by the regular process information P has plural values, the IC card 1 determines whether or not the processing parameter of the received command is matched with one of the plural values set as the processing parameter of the regular command. When the processing parameter of the regular command specified by the regular process information P has the value range, the IC card 1 determines whether or not the received command is matched with the regular command based on whether or not the processing parameter of the received command exists within the value range set as the processing parameter of the regular command.

When the IC card 1 determined that the commands issued from the IC card processing device 2 are the unauthorized command, the IC card 1 stops the series of processes to execute the error process. In the error process, a part of or all the functions of the IC card 1 are stopped or restricted.

FIG. 4 shows an example of the regular process information P1.

In regular process information P1 of FIG. 4, after the reset process, the regular processes are executed in the order of the "select process", "verify process", "read process", "read process", "read process", and "write process". In other words, after the reset process, when the external device (IC card processing device 2) issues the commands to the IC card 1 in the order of the "select" command C1, "verify" command C2, "read" command C3, "read" command C4, "read" command C5, and "write" command C6, the IC card 1 determines that the commands are the correct commands.

In FIG. 4, for the first "select" command C1 in the execution sequence, the application AP1 is specified by the processing parameter. The process contents of the "select" command C1 which should be executed first indicate the select process of the application AP1.

In FIG. 4, for the second "verify" command C2 in the execution sequence, the key information K1 is specified by the processing parameter. The process contents of the "verify" command C2 which should be executed second indicate the verify process with the key information K1.

In FIG. 4, for the third to fifth "read" commands C3 to C5 in the execution sequence, the first information D1 to the third information D3 are specified by the processing parameters respectively. The process contents of the "read" commands C3 to C5 which should be executed third to fifth indicate the read processes of the first information D1 to the third information D3. For example, the pieces of information such as the card number, the name, and the expiration date which are necessary to execute the transaction process with the IC card 1 are considered as the first information D1, the second information D2, and the third information D3.

In FIG. 4, for the sixth "write" command C6 in the execution sequence, the fourth information D4 is specified by the processing parameter. The process contents of the "write" command C6 which should be executed sixth indicate the write process of the fourth information D4. For example, the information such as the transaction amount which is necessary to execute the transaction process with the IC card 1 is considered as the fourth information D4.

The plural processing parameters of each command may be set in the regular process information. That is, one of the plural pieces of information may be set to the processing parameter of the command. For example, in the regular process information, data A, data B, or data C may be set to the processing parameter of the read command.

In the case where the regular process information is set as shown in FIG. 4, unless the IC card 1 sequentially receives the select command C1 in which the application AP1 is specified by the processing parameter, the verify command C2 in which the key information K1 is specified by the processing parameter, the read command C3 in which the first information D1 is specified by the processing parameter, the read command C4 in which the second information D2 is specified by the processing parameter, the read command C5 in which the third information D3 is specified by the processing parameter, and the write command C6 in which the fourth information D4 is specified by the processing parameter, the IC card 1 determines that the unauthorized access is made, and the IC card 1 stops the series of transaction processes.

Figure 5:
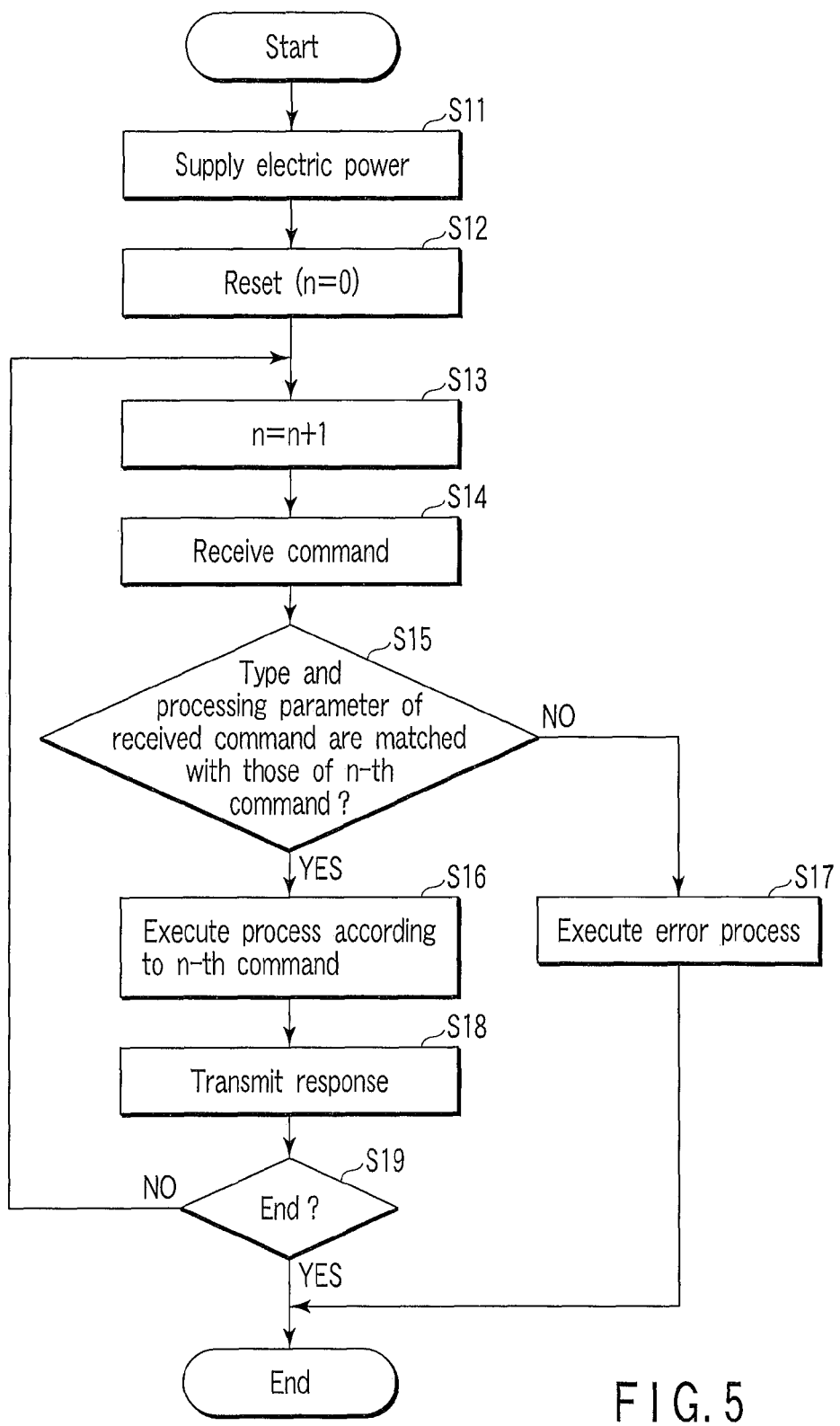
FIG. 5 is a flowchart showing a first fraud detecting process according to the second embodiment.

FIG. 5 is a flowchart showing a first fraud detecting process in the IC card 1.

At first the IC card 1 receives the radio wave in the form of the response request signal from the IC card processing device 2 through the antenna 17. The power supply 16 converts the radio wave received through the antenna 17 into the power supply voltage and clock pulse to operate the IC card 1. The power supply 16 supplies the power supply voltage and clock pulse, generated from the received radio wave, to each unit of the IC card 1 (Step S11). This enables the IC card 1 to be operated.

The control element 11 of the operable IC card 1 resets each unit (Step S12). A value of a variable n indicating the reception (execution) sequence of the command is initialized (n=0) in the reset process. When the reset process is normally ended, the control element 11 of the IC card 1 transmits the response indicating the reset completion to the IC card processing device 2. On the other hand, the control device 21 of the IC card processing device 2 causes the reader-writer 22 to transmit the first command which should be supplied to the IC card 1.

The control element 11 of the IC card 1 which transmits the response indicating the reset completion sets the variable n to n+1 (Step S13), and the control element 11 is in the standby state for receiving the command. In the standby state, when the control element 11 receives the command from the IC card processing device 2 through the antenna 17 and the communication control unit 15 (Step S14), the control element 11 of the IC card 1 determines whether or not the type (command code) and process contents (processing parameter) of the received command are matched with those of the n-th command indicated by the regular process information (Step S15).

When the control element 11 determines that the received command is matched with the n-th command (YES in Step S15), the control element 11 of the IC card 1 executes the process according to the received command (n-th command) (Step S16). When the process is completed to the received command, the control element 11 of the IC card 1 transmits the process result to the IC card processing device 2 in response to the received command. The control element 11 of the IC card 1 returns to Step S13, and the control element 11 repeatedly executes Steps S13 to S19 until the series of processes is ended.

When the control element 11 determines that the received command is not matched with the n-th command (NO in Step S15), the control element 11 of the IC card 1 stops the series of processes to execute the error process (Step S17). There are various modes in the error process. For example, in the error process, the key information used in the verification is disabled (locked), a particular function is stopped, or a particular process (particular application) is stopped. When the IC card 1 determines that the unauthorized access is made, the IC card 1 may transmit the response that the series of processes are stopped or the function is stopped in the error process to the IC card processing device 2.

In the case where a part of or all the functions possessed by the IC card 1 are stopped (restricted) by the error process, the IC card 1 is configured such that a part of or all the restricted functions are enabled by a later-mentioned recovery process.

Next, three examples of the unauthorized access detected by the first fraud detecting process will be described.

A first example of the unauthorized access detected by the first fraud detecting process will be described.

Figure 6:
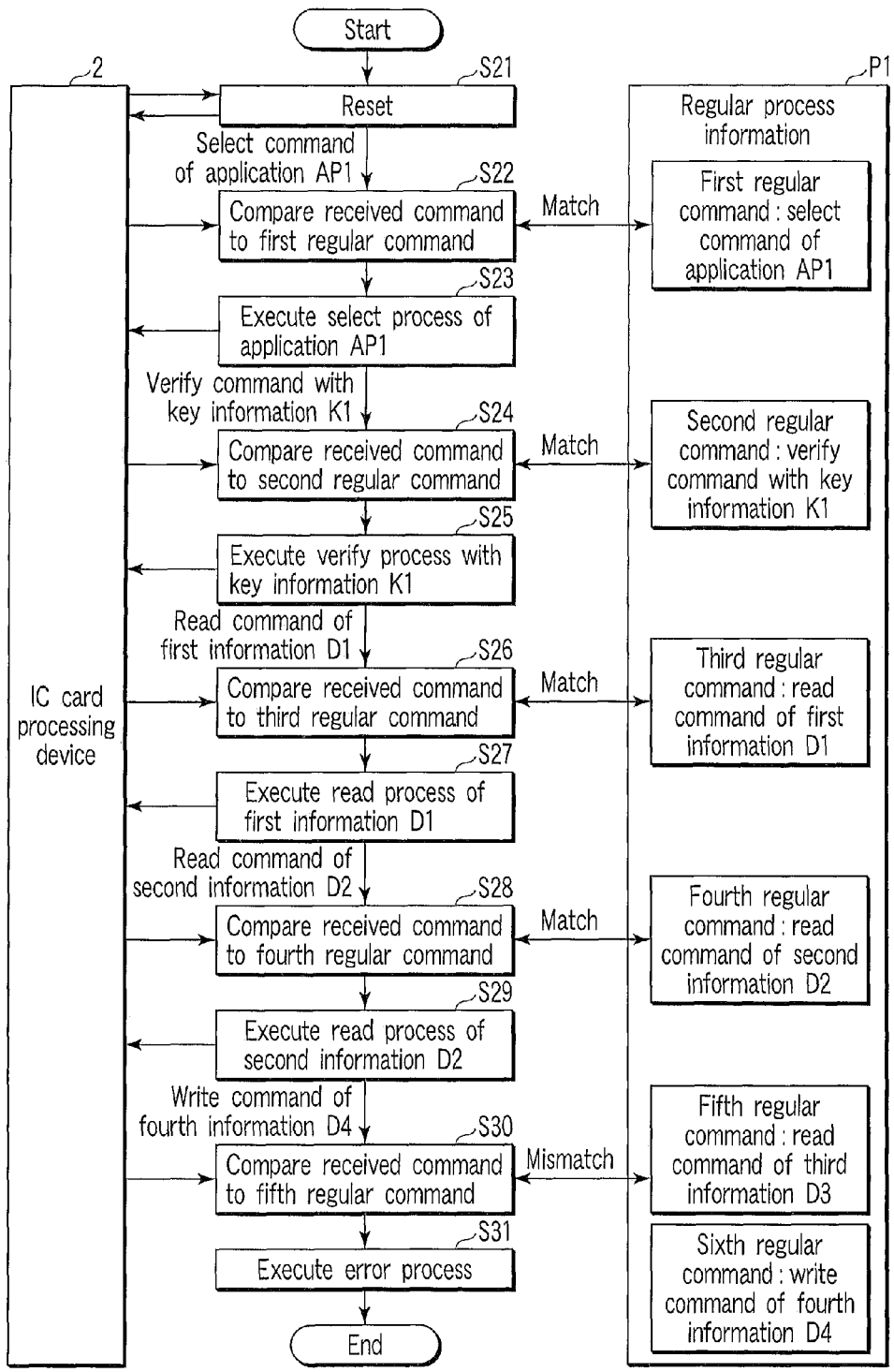
FIG. 6 is a flowchart showing a first example of unauthorized access detected by the first fraud detecting process.

FIG. 6 is a flowchart showing the first example of the unauthorized access detected by the first fraud detecting process. It is assumed that the regular process information P1 of FIG. 4 is previously stored in the data table 14a of the data memory 14. That is, the operation example will be described in the case where the first fraud detecting process is applied to the process which should be executed according to the above sequence.

In the first example, it is assumed that the IC card processing device 2 omits the read command of the third information D3 defined by the regular process information P1. The operation example in which the select command of the application AP1, the verify command with the key information (hereinafter simply referred to as key) K1, the read command of the first information D1, the read command of the second information D2, and the write command of the fourth information D4 are sequentially issued to the IC card 1 will be described below.

The IC card 1 is turned on to execute a reset process by the radio wave from the IC card processing device 2 (Step S21). When the IC card processing device 2 receives the notification that the reset process is completed from the IC card 1, the IC card processing device 2 transmits the select command of the application AP1 as the first command.

The IC card 1 receives the select command of the application AP1 as the first command after the reset. In this case, the control element 11 of the IC card 1 determines whether or not the received command is matched with the first regular command registered as the regular process information P1 (Step S22). In the determination, the command code of the received command is compared to the command code of the first regular command, and the processing parameter of the received command is compared to the processing parameter of the first regular command.

At this point, in both the received command and the first regular command, the command code is the selection (select request of application), and the application AP1 is specified by the processing parameter. Therefore, the control element 11 of the IC card 1 determines that the command received first after the reset is matched with the first regular command (command code is matched with the processing parameter). The control element 11 of the IC card 1 executes the select process of the application AP1 based on the determination (Step S23). After the select process of the application AP1 is completed, the control element 11 of the IC card 1 transmits the response indicating that the selection of the application AP1 is completed to the IC card processing device 2.

When the IC card processing device 2 receives the response indicating that the selection of the application AP1 is completed, the IC card processing device 2 transmits the verify command for requesting the verify process with the key K1 as the second command. The IC card 1 receives the verify command with the key K1 as the second command after the reset. The control element 11 of the IC card 1 determines whether or not the received command is matched with the second regular command registered as the regular process information P1 (Step S24).

At this point, in both the received command and the second regular command, the command code is the verification (verify request), and the key K1 is specified by the processing parameter. Therefore, the control element 11 of the IC card 1 determines that the command received second after the reset is matched with the second regular command (command code is matched with the processing parameter). The control element 11 of the IC card 1 executes the verify process with the key K1 based on the determination (Step S25). After the verify process is completed, the control element 11 of the IC card 1 transmits the response indicating that the verification is completed with the key K1 to the IC card processing device 2.

When the IC card processing device 2 receives the response indicating that the verification is completed with the key K1, the IC card processing device 2 transmits the read command for requesting the read of the first information D1 as the third command. The IC card 1 receives the read command of the first information D1 as the third command after the reset. The control element 11 of the IC card 1 determines whether or not the received command is matched with the third regular command registered as the regular process information P1 (Step S26).

At this point, in both the received command and the third regular command, the command code is the read (read request), and the first information D1 is specified as the data of the read target by the processing parameter. Therefore, the control element 11 of the IC card 1 determines that the command received third after the reset is matched with the third regular command (command code is matched with the processing parameter). The control element 11 executes the read process of the first information D1 based on the determination (Step S27). After the read process is completed, the control element 11 transmits the response indicating that the read of the first information D1 is completed to the IC card processing device 2.

When the IC card processing device 2 receives the response indicating that the read of the first information D1 is completed, the IC card processing device 2 transmits the read command for requesting the read of the second information D2 as the fourth command. The IC card 1 receives the read command of the second information D2 as the fourth command after the reset. The control element 11 of the IC card 1 determines whether or not the received command is matched with the fourth regular command registered as the regular process information P1 (Step S28).

At this point, in both the received command and the fourth regular command, the command code is the read (read request), and the second information D2 is specified as the data of the read target by the processing parameter. Therefore, the control element 11 of the IC card 1 determines that the command received fourth after the reset is matched with the fourth regular command (command code is matched with the processing parameter). The control element 11 of the IC card 1 executes the read process of the second information D2 based on the determination (Step S29). After the read process is completed, the control element 11 of the IC card 1 transmits the response indicating that the read of the second information D2 is completed to the IC card processing device 2.

When the IC card processing device 2 receives the response indicating that the read of the second information D2 is completed, the IC card processing device 2 transmits the write command for requesting the write of the fourth information D4 as the fifth command. The IC card 1 then receives the write command of the fourth information D4 as the fifth command after the reset. The control element 11 of the IC card 1 determines whether or not the received command is matched with the fifth regular command registered as the regular process information P1 (Step S30).

At this point, in the command received fifth after the reset, the command code is the write (write request), and the fourth information D4 is specified as the data of the write target by the processing parameter. On the other hand, in the fifth regular command of the regular process information P1, the command code is the read, and the third information D3 is specified as the data of the read target by processing parameter. Accordingly, the command received fifth after the reset differs from the fifth regular command in both the command code indicating the type of the command and the processing parameter for specifying the process target.

Thus, when the received command is not matched with the regular command, the control element 11 of the IC card 1 determines that the IC card processing device (external device) 2 issues the unauthorized command. When the control element 11 of the IC card 1 determines that the IC card processing device 2 issues the unauthorized command, the control element 11 determines that the unauthorized access is made, and the control element 11 executes the error process in association with the unauthorized access (Step S31). In the error process, a part of or all the functions of the IC card 1 are stopped.

Next, a second example of the unauthorized access detected by the first fraud detecting process will be described.

FIG. 7 is a flowchart showing the second example of the unauthorized access detected by the first fraud detecting process. As with the first example, it is assumed that the regular process information P1 of FIG. 4 is previously stored in the data memory 14.

In the second example, it is assumed that the IC card processing device 2 issues the read command of the third information D3 defined by the regular process information P1 in the unauthorized sequence. That is, in the second example, the operation example of the IC card 1 will be described in the case where the select command of the application AP1, the verify command with the key K1, and the read command of the third information D3 are sequentially issued to the IC card 1.

After the reset, the IC card 1 executes the processes similar to those in Steps S21 to S25 of the first example to the select command of the application AP1 and the verify command with the key K1 which are issued from the IC card processing device 2 (Steps S41 to S45). That is, when the verify command is completed with the key K1, the control element 11 of the IC card 1 returns the response indicating that the verify command is completed with the key K1 to the IC card processing device 2.

When the IC card processing device 2 receives the response indicating that the verify command is completed with the key K1, the IC card processing device 2 transmits the read command for requesting the read of the third information D3 as the third command. The IC card 1 receives the read command of the third information D3 as the third command after the reset. The control element 11 of the IC card 1 determines whether or not the received command is matched with the third regular command registered as the regular process information P1 (Step S46).

At this point, in the command received third after the reset, the command code is the read (read request), and the third information D3 is specified as the data of the read target by the processing parameter. On the other hand, in the third regular command of the regular process information P1, the command code is the read (read request), and the first information D1 is specified as the data of the read target by processing parameter. Accordingly, the command received third after the reset differs from the third regular command in the processing parameter for specifying the process target while the command received third after the reset is matched with the third regular command in the command code indicating the type of the command.

Thus, when the process contents (processing parameter) of the received command are not matched with the process contents (processing parameter) of the regular command, the control element 11 of the IC card 1 determines that the IC card processing device (external device) 2 issues the unauthorized command. When the control element 11 of the IC card 1 determines that the IC card processing device 2 issues the unauthorized command, the control element 11 determines that the unauthorized access is made, and executes the error process in association with the unauthorized access (Step S47). In the error process, a part of or all the functions of the IC card 1 are stopped.

Next, a third example of the unauthorized access detected by the first fraud detecting process will be described.

Figure 8:
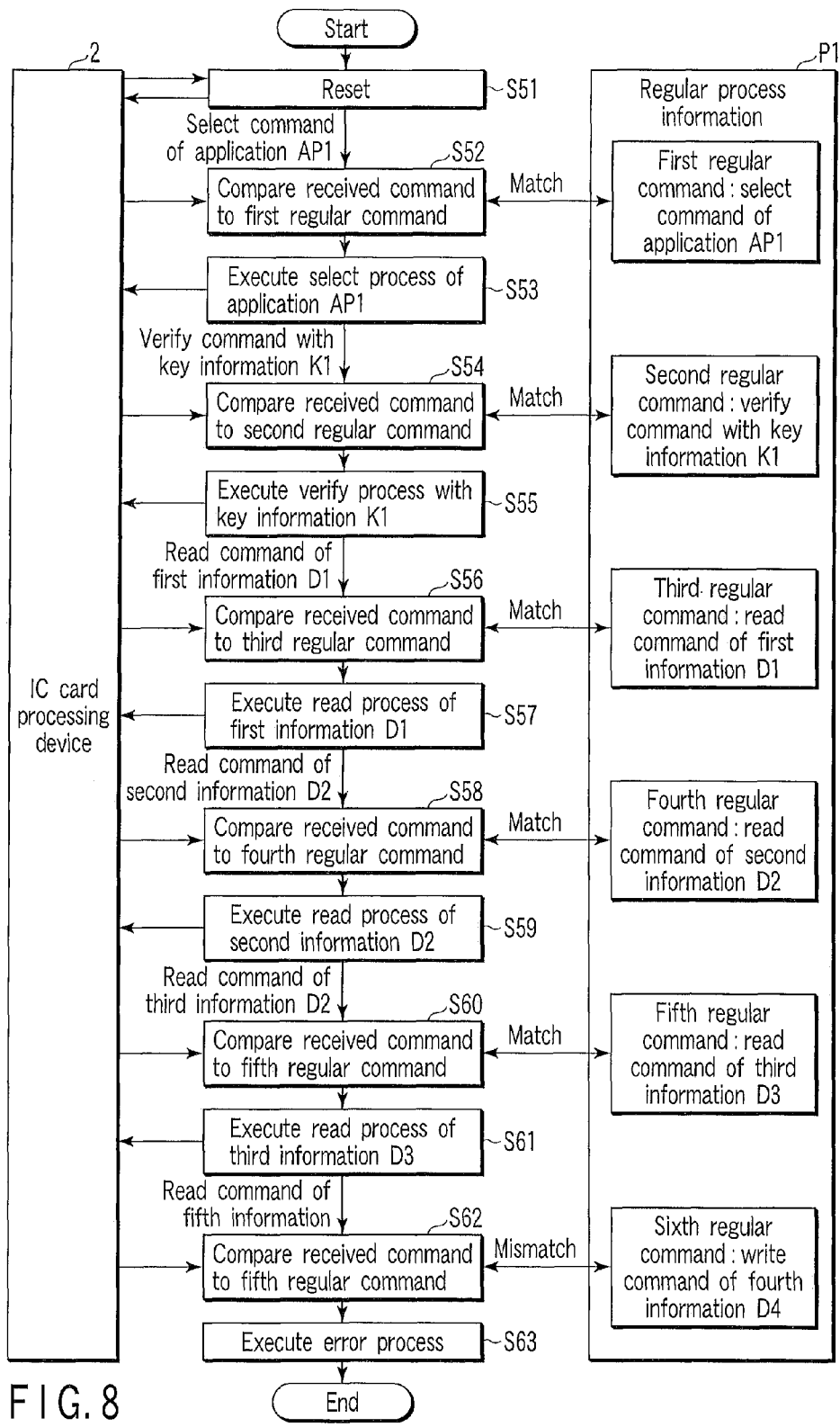
FIG. 8 is a flowchart showing a third example of the unauthorized access detected by the first fraud detecting process.

FIG. 8 is a flowchart showing the third example of the unauthorized access detected by the first fraud detecting process. As with the first and second examples, it is assumed that the regular process information P1 of FIG. 4 is previously stored in the data memory 14.

In the third example, it is assumed that the IC card processing device 2 issues the read command of fifth information which is not defined by the regular process information P1. That is, in the third example, the operation example of the IC card 1 will be described in the case where the select command of the application AP1, the verify command with the key K1, the read command of the first information D1, the read command of the second information D2, the read command of the third information D3, and the read command of the fifth information are sequentially issued to the IC card 1.

After the reset, the IC card 1 executes the processes similar to those in Steps S21 to S29 of the first example to the select command of the application AP1, the verify command with the key K1, the read command of the first information D1, and the read command of the second information D2 which are issued from the IC card processing device 2 (Steps S51 to S59). That is, the IC card processing device 2 issues the read command of the second information D2 according to the regular sequence, and the control element 11 of the IC card 1 returns the response including the read second information D2 to the IC card processing device 2 when the read process of the second information D2 is completed.

When the IC card processing device 2 receives the response including the second information D2, the IC card processing device 2 transmits the read command for requesting the read of the third information D3 as the fifth command. The IC card 1 receives the read command of the third information D3 as the fifth command after the reset. The control element 11 of the IC card 1 determines whether or not the received command is matched with the fourth regular command registered as the regular process information P1 (Step S60).

At this point, in both the received command and the fifth regular command, the command code is the read (read request), and the third information D3 is specified as the data of the read target by the processing parameter. Therefore, the control element 11 of the IC card 1 determines that the command received fifth after the reset is matched with the fifth regular command (command code is matched with the processing parameter). The control element 11 of the IC card 1 executes the read process of the third information D3 based on the determination (Step S61). After the read process is completed, the control element 11 of the IC card 1 returns the response indicating that the read of the third information D3 is completed to the IC card processing device 2.

When the IC card processing device 2 receives the response indicating that the read process of the third information D3 is completed, the IC card processing device 2 transmits the write command for requesting the read of the fifth information as the sixth command. The IC card 1 receives the read command of the fifth information as the sixth command after the reset. The control element 11 of the IC card 1 determines whether or not the received command is matched with the sixth regular command registered as the regular process information P1 (Step S62).

At this point, in the command received sixth after the reset, the command code is the read (read request), and the fifth information is specified as the data of the read target by the processing parameter. On the other hand, in the sixth regular command of the regular process information P1, the command code is the write (write request), and the fourth information D4 is specified as the data of the write target by the processing parameter. Accordingly, the command received sixth after the reset differs from the sixth regular command in both the command code indicating the type of the command and the processing parameter for specifying the process target.

Thus, when the received command is not matched with the regular command, the control element 11 of the IC card 1 determines that the IC card processing device (external device) 2 issues the unauthorized command. When the control element 11 of the IC card 1 determines that the IC card processing device 2 issues the unauthorized command, the control element 11 determines that the unauthorized access is made, and the control element 11 executes the error process in association with the unauthorized access (Step S63). In the error process, a part of or all the functions of the IC card 1 are stopped.

As described in the first and third examples, when the command which should be issued according to the regular process sequence is omitted, or the IC card 1 to which the first fraud detecting process is applied determines that unauthorized access is made because the received command is not matched with the regular command in the sequence and process contents which are specified by the regular process information. Therefore, in the first fraud detecting process, based on the sequence and process contents of the received command, it can be detected whether or not the external device makes the correct access, and the unauthorized access can be prevented. For example, when the command which should be issued according to the regular process sequence is omitted, as in the first example, the IC card 1 to which the first fraud detecting process is applied can determine that the unauthorized access is made.

As described in the second example, in addition to the command code (type of command), the IC card 1 to which the first fraud detecting process is applied determines whether or not the process contents of the command which should be issued according to the regular process sequence is matched with the process contents of the received command. Therefore, even if the command code of the command which should be issued according to the regular process sequence is matched with the command code of the received command (namely, even the same type of the command), it can be determined that the received command is unauthorized when the process contents (processing parameter) of the command which should be issued according to the regular process sequence are matched with the process contents (processing parameter) of the received command, and it can be determined that the unauthorized access is made.

That is, as described in the second example, the first fraud detecting process can prevent the unauthorized access in which the processing parameter is changed. For example, that the processing parameter of the read command is incorrectly changed to read the information or that the processing parameter of the write command is incorrectly changed to write the information can be prevented.

A second fraud detecting process in the IC card 1 of the first embodiment will be described below.

In the second fraud detecting process, it is assumed that, in addition to the information indicating the correct process contents and process sequence, the timing at which each command should be received is previously stored as regular process information P2 in the data table 14a of the data memory 14 of the IC card 1. That is, it is assumed that the information indicating contents (type of command and process contents) of the command used in the correct process, the information indicating the execution sequence of the commands, and the information indicating the timing at which each command should be received are previously stored as regular process information P2 in the data table 14a of the data memory 14 of the IC card 1.

In the regular process information P2, it is assumed that the information indicating the contents of each command includes at least the information (command code) indicating the type of command and the information (processing parameter) indicating the process target of the command (process contents). In the regular process information P2, it is assumed that the timing at which each command should be received indicates a time interval (permissible time) between commands. Examples of the time interval between commands include a time until the next command is received after the response to a certain command is transmitted and a time until the next command is received after the response to a certain command is received. It is assumed that the time interval between commands is the time until the next command is received after the response to a certain command is transmitted.

On the basis of the regular process information P2, the IC card 1 determines whether or not the commands sequentially issued from the IC card processing device (external device) 2 are the correct sequence, the correct process contents, and the correct reception timing. For example, when each command issued from the IC card processing device 2 is not received at the correct reception timing set in the regular process information P2, the IC card 1 determines that unauthorized access is made. When the IC card 1 determines that the unauthorized access is made, the IC card 1 stops the process to execute the error process. In the error process, a part of or all the functions of the IC card 1 are stopped.

FIG. 9 shows an example of the regular process information P2. In the regular process information P2 of FIG. 9, as with the regular process information P1 of FIG. 4, after the reset process, the regular processes are executed in the order of the "select process", "verify process", "read process", "read process", "read process", and "write process". Additionally, in the regular process information P2 of FIG. 9, the time interval (permissible time) between the commands is set as the information indicating the timing at which each command should be received. That is, in the second fraud detecting process, it is determined whether or not the commands are received at correct time intervals in addition to the determination of the correct contents and reception sequence of the commands like the first fraud detecting process.

In the regular process information P2 of FIG. 9, for the sake of simple explanation, the time interval (permissible time) between the commands is expressed by the number of seconds. However, preferably the time interval (permissible time) between the commands is set by the number of operation clocks of the IC card 1. Usually, the batteryless IC card 1 is operated by the operation clock supplied from the IC card processing device 2, which is the external device. In the IC card 1, it is efficient if the timing at which each command should be received is timed by the number of operation clocks corresponding to the predetermined permissible time. In the following description, for the sake of simple explanation, the time interval (permissible time) between the commands is set not by the number of clocks but by the number of seconds.

The time interval between the commands defined by the regular process information P2 of FIG. 9 is the time until the next command is received after the response (response indicating the process result of the command) to a certain command is transmitted. This is because, in the regular sequence, the time until the IC card processing device 2 transmits the next command after the IC card processing device 2 receives the response to the command from the IC card 1 (namely, the time until the IC card 1 receives the next command after the IC card 1 transmits the response to a certain command) is kept substantially constant. However, in the IC card 1, the process time necessary for the predetermined command is also kept substantially constant. Therefore, the time interval between the commands may be a time interval until the IC card 1 receives the next command after the IC card 1 receives a certain command.

In the regular process information P2 of FIG. 9, for the first regular command in the execution sequence, the type of the command is "select", and the application AP1 is specified by the processing parameter.

In the regular process information P2 of FIG. 9, for the second regular command in the execution sequence, the type of the command is "verify", and the key information K1 is specified by the processing parameter. In the second regular command in the execution sequence, the time interval (permissible time) between the first and second regular commands is set to T12=0.2±0.1 seconds. This shows that the command which should be executed second should be received within a range of 0.4 to 0.6 seconds after the response to the first command is transmitted.

In the regular process information P2 of FIG. 9, for the third to fifth regular commands in the execution sequence, the type of the command is "read", and the first information D1 to the third information D3 are specified by the processing parameters respectively. In the third to fifth regular commands in the execution sequence, the time interval (permissible time) between the second and third regular commands is set to T23=0.5±0.1 seconds, the time interval (permissible time) between the third and fourth regular commands is set to T34=0.4±0.1 seconds, and the time interval (permissible time) between the fourth and fifth regular commands is set to T45=0.6±0.1 seconds. These show that the command which should be executed third should be received within a range of 0.1 to 0.3 seconds after the response to the second command is transmitted, the command which should be executed fourth should be received within a range of 0.3 to 0.5 seconds after the response to the third command is transmitted, and the command which should be executed fifth should be received within a range of 0.5 to 0.7 seconds after the response to the fourth command is transmitted.

In the regular process information P2 of FIG. 9, for the sixth regular command in the execution sequence, the type of the command is "write", and the fourth information D4 is specified by the processing parameter. In the sixth regular command in the execution sequence, the time interval (permissible time) between the fifth and sixth regular commands is set to T56=0.5±0.1 seconds. This shows that the command which should be executed sixth should be received within a range of 0.4 to 0.6 seconds after the response to the fifth command is transmitted.

In the case where the regular process information P2 of FIG. 9 is set, unless each command is received at a predetermined timing even if the contents (type and process content) and sequence of the received command are matched with the regular process information, the IC card 1 determines that the unauthorized access is made, and the IC card 1 stops the series of transaction processes.

An operation example of the second fraud detecting process applied to the IC card 1 will be described below.

Figure 10:
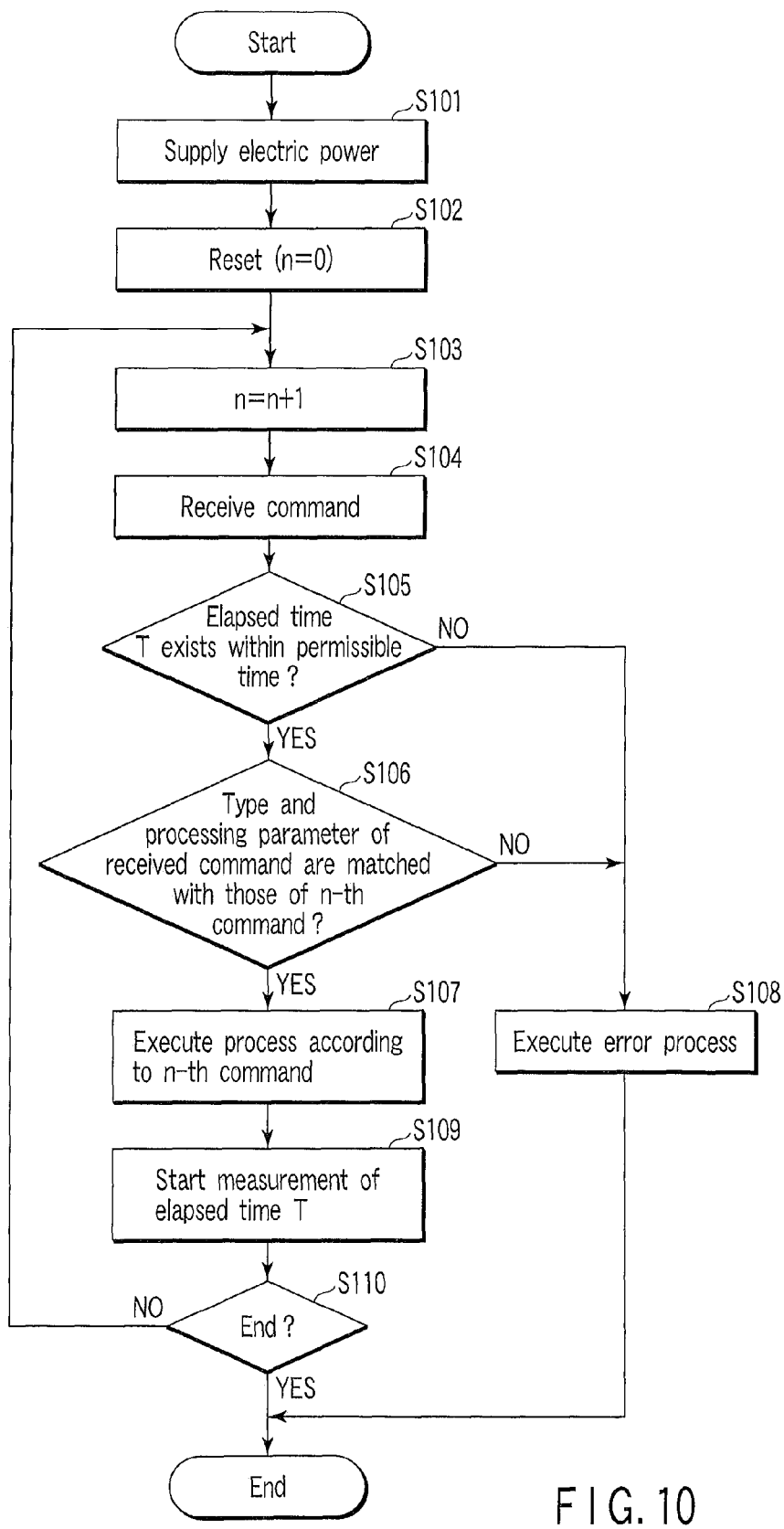
FIG. 10 is a flowchart showing a second fraud detecting process.

FIG. 10 is a flowchart showing the second fraud detecting process in the transaction process in which the IC card 1 is used.

In the following description, it is assumed that the regular process information P2 of FIG. 9 is stored in the data memory 14.

The IC card 1 receives the radio wave in the form of the response request signal from the IC card processing device 2 through the antenna 17. The power supply 16 converts the radio wave received through the antenna 17 into the power supply voltage and clock pulse to operate the IC card 1. The power supply 16 supplies the power supply voltage and clock pulse, generated from the received radio wave, to each unit of the IC card 1 (Step S101). This enables the IC card 1 to be operated by the predetermined clock.

The control element 11 of the operable IC card 1 resets each unit (Step S102). The value of the variable n indicating the reception (execution) sequence of the command is initialized (n=0) in the reset process. When the reset process is normally ended, the control element 11 of the IC card 1 transmits the response indicating the reset completion to the IC card processing device 2. On the other hand, the control device 21 of the IC card processing device 2 causes the reader-writer 22 to transmit the first command which should be supplied (first command after reset) to the IC card 1.

The control element 11 of the IC card 1 which transmits the response indicating the reset completion to the IC card processing device 2 sets the variable n to n+1 (in this case, n=0+1) (Step S103), and the control element 11 is in the standby state for receiving the command. In the standby state, when the control element 11 of the IC card 1 receives the first command after the reset from the IC card processing device 2, the control element 11 skips Step S105 because the permissible time is not set in the first command, and determines whether or not the contents (type (command code) and process contents (processing parameter)) of the received command are matched with the contents of the first regular command indicated by the regular process information P2 (Step S106).

When the control element 11 determines that the contents of the command received first are not matched with the contents of the first regular command (NO in Step S106), the control element 11 of the IC card 1 stops the series of processes to execute the error process (Step S108). There are various modes in the error process. For example, in the error process, the key information used in the verification is disabled (locked), a particular function is stopped, or a particular process (particular application) is stopped as in the first fraud detecting process.

When the control element 11 of the IC card 1 determines that the contents of the command received first are matched with the contents of the first regular command (YES in Step S106), the control element 11 executes the process according to the received command (n-th command) (Step S107). When the process is completed to the received command, the control element 11 of the IC card 1 transmits the process result to the IC card processing device 2 in response to the received command.

When the control element 11 of the IC card 1 transmits the response to the command received n-th (in this case, n=1), the control element 11 starts measurements (counting the number of operation clocks) of an elapsed time T (Step S109). When the series of processes is not ended (NO in Step S110), the control element 11 of the IC card 1 returns to Step S103, in which the control element 11 sets the variable n to n+1, and enters the standby state for waiting the next command (n-th command).

During the standby state for waiting for the next command, when the control element 11 of the IC card 1 receives the n-th command from the IC card processing device 2, the control element 11 determines the elapsed time T until the n-th command is received after the response to the last command ((n−1)th command) is transmitted. On the basis of the determination of the elapsed time T, the control element 11 of the IC card 1 determines whether or not the elapsed time T exists within the range of permissible time T(n−1)n set as the timing at which the n-th command should be received.

In the determination of Step S105, when the elapsed time T exists out of the permissible time (NO in Step S105), the control element 11 of the IC card 1 determines that the command is received at the unauthorized timing. In this case, the control element 11 stops the series of processes to execute the error process (Step S108).

On the other hand, when the elapsed time T exists within the permissible time (YES in Step S105), the control element 11 of the IC card 1 determines that the command is received at the correct timing. Then, the control element 11 of the IC card 1 goes to Step S106, and determines whether or not the contents of the command received n-th are matched with the contents of the n-th regular command indicated by the regular process information P2.

In Step S106, the control element 11 of the IC card 1 determines whether or not the contents of the command received n-th are matched with the contents of the n-th regular command indicated by the regular process information P2. In the determination, when the contents of the command received n-th are not matched with the contents of the n-th regular command (NO in Step S106), the control element 11 stops the series of processes to execute the error process (Step S108). The contents of the error process may be changed depending on the case where the time interval between the commands is incorrect and the case where the process contents of each command are not the correct process contents.

When the contents of the command received n-th are matched with the contents of the n-th regular command (YES in Step S106), the control element 11 of the IC card 1 executes the process according to the received command (n-th command) (Step S107). When the process as regards the received command is completed, the control element 11 of the IC card 1 transmits the process result to the IC card processing device 2 in the response to the received command. At this point, the control element 11 of the IC card 1 restarts the measurement (counting the number of operation clocks) of the elapsed time T.

When the series of processes is not ended (NO in Step S110), the control element 11 of the IC card 1 returns to Step S103, in which the control element 11 sets the variable n to n+1, and enters the standby state for waiting for the next command (n-th command). Accordingly, the control element 11 of the IC card 1 repeatedly executes Steps S103 to S110 until the series of processes is ended.

In the case where the time interval (permissible time) between the commands is set by the time until the next command is received after the last command is received, the control element 11 of the IC card 1 may start the measurement (counting the number of operation clocks) of the elapsed time T when receiving each command. In such cases, the timing at which the measurement of the elapsed time T is started in Step S109 is changed when the control element 11 receives the command from the IC card processing device 2.

An example of the unauthorized access detected by the second fraud detecting process will be described.

Figure 11:
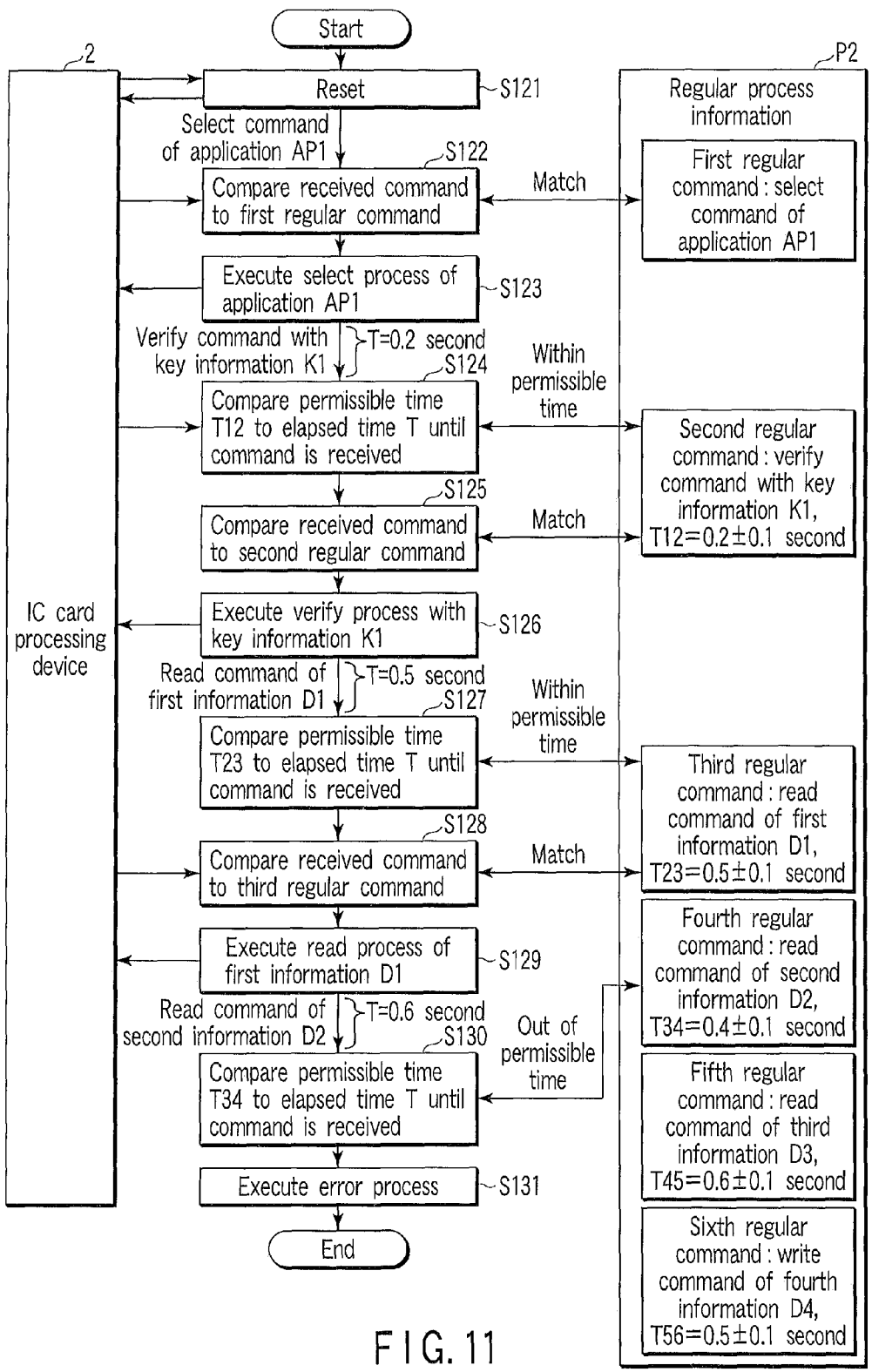
FIG. 11 is a flowchart showing an example of the unauthorized access detected by the second fraud detecting process.

FIG. 11 is a flowchart showing the unauthorized access detected by the second fraud detecting process. In the following description, it is assumed that the regular process information P2 of FIG. 9 is previously stored in the data table 14a of the data memory 14. That is, an operation example will be described in the case where the second fraud detecting process is applied to the process which should be executed according to the above sequence. In addition, an operation example of the IC card 1 will be described in the case where the read command of the second information D2 defined by the regular process information P2 cannot be received at a predetermined timing.

The IC card 1 is turned on to execute the reset process by the radio wave from the IC card processing device 2 (Step S121). When the IC card processing device 2 receives the notification that the reset process is completed from the IC card 1, the IC card processing device 2 transmits the select command of the application AP1 as the first command.

The IC card 1 receives the select command of the application AP1 as the first command after the reset. In the regular process information P2, the permissible time is not set for the first command. Therefore, the control element 11 of the IC card 1 determines whether or not the received command is matched with the first regular command registered as the regular process information P1 (Step S122). In the determination, the command code of the received command is compared to the command code of the first regular command, and the processing parameter of the received command is compared to the processing parameter of the first regular command.

At this point, in both the received command and the first regular command, the command code is the selection (select request of application), and the application AP1 is specified by the processing parameter. Therefore, the control element 11 of the IC card 1 determines that the command received first after the reset is matched with the first regular command (command code is matched with the processing parameter). The control element 11 of the IC card 1 executes the select process of the application AP1 based on the determination (Step S123).

After the process (select process of application AP1) is executed according to the command received first, the control element 11 of the IC card 1 transmits the response indicating that the selection of the application AP1 is completed to the IC card processing device 2. When the control element 11 of the IC card 1 transmits the response to the command received first after the reset, the control element 11 starts the measurement of the elapsed time T until the command received second after the reset is received as the next command.

When the IC card processing device 2 receives the response indicating that the selection of the application AP1 is completed, the IC card processing device 2 transmits the verify command for requesting the verify process with the key K1 as the second command. The IC card 1 receives the verify command with the key K1 as the second command after the reset. When the IC card 1 receives the second command after the reset, the control element 11 of the IC card 1 determines the elapsed time T until the second command is received after the response to the first command is transmitted. After the control element 11 of the IC card 1 determines the elapsed time T until the second command is received, the control element 11 determines whether or not the elapsed time T exists within the permissible time T12 (0.2±0.1 seconds) set as the timing at which the second regular command is received (Step S124).

It is assumed that the elapsed time T until the second command is received is 0.2 seconds. Accordingly, in Step S124, the control element 11 of the IC card 1 determines that the elapsed time T (0.2 seconds) until the second command is received exists within the predetermined permissible time T12 (0.1 to 0.3 seconds). Therefore, it can be confirmed that the command received second after the reset is received at the correct timing set by the regular process information P2.

When the control element 11 of the IC card 1 determines that the elapsed time T until the second command is received exists within the permissible time T12, namely, when it can be confirmed that the command received second after the reset is received at the correct timing, the control element 11 determines whether or not the contents of the command received second are matched with the contents of the second regular command registered as the regular process information P1 (Step S125). At this point, in both the received command and the second regular command, the command code is the verification (verify request), and the key K1 is specified by the processing parameter. Therefore, the control element 11 of the IC card 1 determines that the command received second after the reset is matched with the second regular command (command code is matched with the processing parameter). The control element 11 of the IC card 1 executes the verify process with the key K1 based on the determination (Step S126).

After the process (verify process with the key K1) is executed according to the second received command, the control element 11 of the IC card 1 transmits the response indicating that the verification is completed with the key K1 to the IC card processing device 2. When the control element 11 of the IC card 1 transmits the response to the command received second after the reset, the control element 11 starts the measurement of the elapsed time T until the third command after the reset is received as the next command.

When the IC card processing device 2 receives the response indicating that the verification is completed with the key K1, the IC card processing device 2 transmits the read command for requesting the read of the first information D1 as the third command. The IC card 1 then receives the read command of the first information D1 as the third command after the reset.

When the IC card 1 receives the third command after the reset, the control element 11 of the IC card 1 determines the elapsed time T until the third command is received after the response to the second command is transmitted. After the control element 11 of the IC card 1 determines the elapsed time T until the third command is received, the control element 11 determines whether or not the elapsed time T exists within the permissible time T23 (0.5+0.1 second) set as the timing at which the third regular command is received (Step S127).

It is assumed that the elapsed time T until the third command is received is 0.5 second. Accordingly, in Step S127, the control element 11 of the IC card 1 determines that the elapsed time T (0.5 second) until the third command is received exists within the predetermined permissible time T23 (0.4 to 0.6 second). Therefore, it can be confirmed that the command received third after the reset is received at the correct timing set by the regular process information P2.

When the control element 11 of the IC card 1 determines that the elapsed time T until the third command is received exists within the predetermined permissible time T23, namely, when it can be confirmed that the command received third after the reset is received at the correct timing, the control element 11 determines whether or not the contents of the command received third are matched with the contents of the third regular command registered as the regular process information P2 (Step S128). At this point, in both the command received third after the reset and the third regular command, the command code is the read (read request), and the first information D1 is specified by the processing parameter. Therefore, the control element 11 of the IC card 1 determines that the command received third after the reset is matched with the third regular command (command code is matched with the processing parameter). The control element 11 of the IC card 1 executes the read process of the first information D1 based on this determination (Step S129).

After the process (read process of the first information D1) is executed according to the third received command, the control element 11 of the IC card 1 transmits the response including the first information D1 to the IC card processing device 2. When the control element 11 of the IC card 1 transmits the response to the command received third after the reset, the control element 11 starts the measurement of the elapsed time T until the fourth command after the reset is received as the next command.

When the IC card processing device 2 receives the response including the first information D1, the IC card processing device 2 transmits the read command for requesting the read of the second information D2 as the fourth command after 0.6 seconds elapses after the response is received. The IC card 1 receives the read command of the second information D2 as the fourth command after the reset.

When the IC card 1 receives the fourth command after the reset, the control element 11 of the IC card 1 determines the elapsed time T until the fourth command is received after the response to the third command is transmitted. After the control element 11 of the IC card 1 determines the elapsed time T until the fourth command is received, the control element 11 determines whether or not the elapsed time T exists within the permissible time T34 (0.4±0.1 second) set as the timing at which the fourth regular command is received (Step S130).

It is assumed that the elapsed time T until the fourth command is received is 0.6 seconds. Accordingly, in Step S130, the control element 11 of the IC card 1 determines that the elapsed time T (0.6 seconds) until the fourth command is received exists out of the predetermined permissible time T34 (0.3 to 0.5 second). Therefore, it can be confirmed that the command received fourth after the reset is not received at the correct timing set by the regular process information P2.

When the control element 11 of the IC card 1 determines that the elapsed time T until the fourth command is received exists out of the predetermined permissible time T34, namely, when it cannot be confirmed that the command received fourth after the reset is received at the correct timing, the control element 11 determines that the IC card processing device (external device) 2 issues the unauthorized command. When the IC card processing device 2 issues the unauthorized command, the control element 11 of the IC card 1 determines that the unauthorized access is made, and executes the error process in association with the unauthorized access (Step S131). In the error process, a part of or all the functions of the IC card 1 are stopped.

Thus, in the IC card 1 to which the second fraud detecting process is applied, even if the commands for executing the series of processes are issued according to the regular sequence, the control element 11 determines that the unauthorized access is made when the command is not received at the predetermined timing. Therefore, in the second fraud detecting process, the unauthorized access can be detected not only by the sequence of the received commands but also by the correct timing at which the command is received. As a result, the unauthorized access can be prevented in the case where the external device issues the plural commands to the IC card using an unauthorized control program other than the regular control program.

The third fraud detecting process of the first embodiment which is applied to the IC card 1 will be described.

In the third fraud detecting process, it is assumed that plural pieces of regular process information P3a, P3b, . . . are previously stored in the data table 14a of the data memory 14 of the IC card 1. Each piece of regular process information has the configuration shown in FIG. 4 or 9. The pieces of regular process information correspond to various processes executed by the IC card 1. For example, in the case where plural applications for realizing various functions are stored in the data memory 14, the pieces of regular process information P3a, P3b, . . . are set in the applications respectively. The plural pieces of regular process information may be set in one application.

When the plural pieces of regular process information are stored in the data table 14a, the IC card 1 to which the third fraud detecting process is applied determines whether or not the regular process information exists. The regular process information is used to determine whether or not the commands sequentially issued from the IC card processing device (external device) 2 are the correct commands. That is, each time the command is received from the IC card processing device 2, the IC card 1 to which the third fraud detecting process is applied determines whether or not the regular process information exists. The regular command having the contents matched with the contents of the received command is set in the regular process information.

For example, when the IC card 1 determines that the regular process information which is matched with the contents of the command issued from the IC card processing device 2 does not exist, the IC card 1 determines that unauthorized access is made. When the IC card 1 determines that unauthorized access is made, the IC card 1 stops the process to execute the error process of stopping or restricting a part of or all the functions.

FIG. 12 shows an example of plural pieces of regular process information P3a and P3b which are stored in the data table 14a.

The regular process information P3a of FIG. 12 is information which is similar to that of FIG. 4. In the regular process information P3b of FIG. 12, after the reset process, the series of regular processes should be executed in the order of the "select command" for requesting the selection of the application AP2, "verify command" for requesting the verification with key information K2, "read command" for requesting the read of the fifth information D5, and "write command" for requesting the write of the sixth information D6.

Referring to FIG. 12, the regular process information P3a differs from the regular process information P3b in the application which should be selected as the first command in the execution sequence. Accordingly, in the case where the pieces of regular process information are stored in the data table 14a, the IC card 1 selects one of the regular process information P3*a* and the regular process information P3*b* depending on which of the select request of the application AP1 and the select request of the application AP2 is received first after the reset.

That is, in the case where the pieces of regular process information P3*a* and P3*b* are stored in the data table 14*a* as shown in FIG. 12, the IC card 1 executes the fraud detecting process similar to the first fraud detecting process using the regular process information P3*a* when the command received first after the reset is the select request (processing parameter is application AP1) of the application AP1. When the command received first after the reset is the select request (processing parameter is application AP2) of the application AP2, the IC card 1 executes the fraud detecting process similar to the first fraud detecting process using the regular process information P3*b*.

Figure 13:
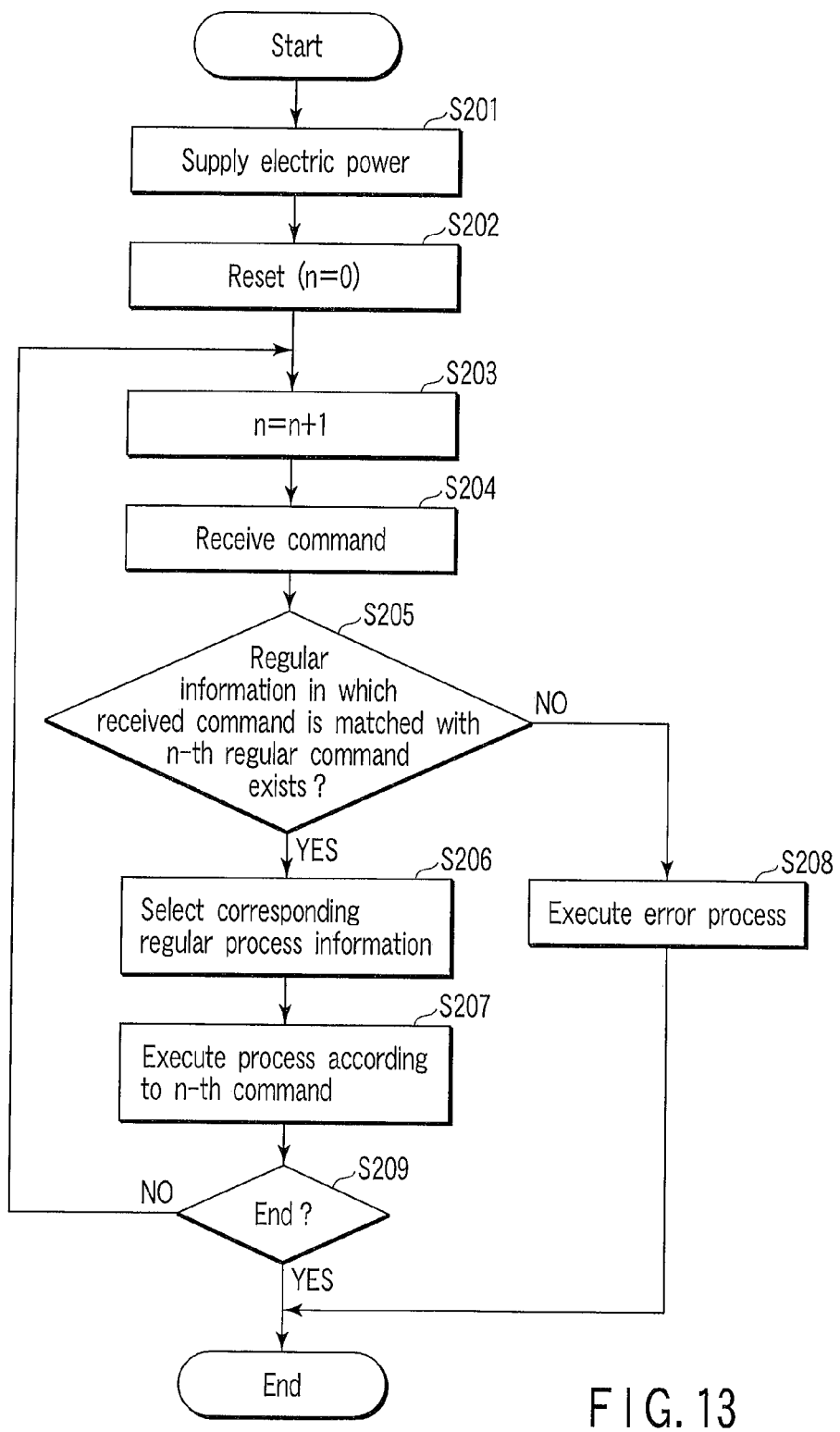
FIG. 13 is a flowchart showing a third fraud detecting process.

FIG. 13 is a flowchart showing the third fraud detecting process in the transaction process in which the IC card 1 is used.

In the following description, it is assumed that the two pieces of regular process information P3*a* and P3*b* of FIG. 12 are stored in the data table 14*a* of the data memory 14.

At first, the IC card 1 receives the radio wave in the form of the response request signal from the IC card processing device 2 through the antenna 17. The power supply 16 converts the radio wave received through the antenna 17 into the power supply voltage and clock pulse to operate the IC card 1. The power supply 16 supplies the power supply voltage and clock pulse, generated from the received radio wave, to each unit of the IC card 1 (Step S201). This enables the IC card 1 to be operated.

The control element 11 of the operable IC card 1 resets each unit (Step S202). The value of the variable n indicating the reception (execution) sequence of the command is initialized (n=0) in the reset process. When the reset process is normally ended, the control element 11 of the IC card 1 transmits the response indicating the reset completion to the IC card processing device 2. On the other hand, the control device 21 of the IC card processing device 2 causes the reader-writer 22 to transmit the next command which should be supplied to the IC card 1.

The control element 11 of the IC card 1 which transmits the response indicating the reset completion sets the variable n to n+1 (Step S203), and the control element 11 is in the standby state for receiving the command. During the standby state, when the control element 11 of the IC card 1 receives the command from the IC card processing device 2 through the antenna 17 and the communication control unit 15 (Step S204), the control element 11 determines whether or not there exists the regular process information in which the n-th regular command matched with the contents (type (command code) and process contents (processing parameter)) of the command received n-th is set (Step S205). In this case, based on the selected regular process information, the control element 11 determines whether or not there exists the regular process information in which the n-th regular command matched with the contents of the command received n-th is set.

When the control element 11 of the IC card 1 determines that the regular process information in which the n-th regular command matched with the contents of the command received n-th is set exists (YES in Step S205), the control element 11 selects the regular process information in which the n-th regular command matched with the n-th received command is set exists (Step S206).

When the control element 11 of the IC card 1 selects the regular process information in which the n-th regular command matched with the contents of the command received n-th is set exists, the control element 11 executes the process according to the received command (n-th command) (Step S207). After the process executed to the received command, the control element 11 of the IC card 1 transmits the process result to the IC card processing device 2 in response to the received command. The control element 11 of the IC card 1 returns to Step S203, and repeatedly executes Steps S203 to S209 until the series of processes is ended (NO in Step S209).

When the control element 11 of the IC card 1 determines that the regular process information in which the n-th regular command matched with the contents of the command received n-th is set does not exist (NO in Step S205), the control element 11 stops the series of processes to execute the error process (Step S208). There are various modes in the error process. For example, in the error process, the key information used in the verification is disabled (locked), a particular function is stopped, or a particular process (particular application) is stopped. Because the IC card 1 determines that unauthorized access is made, the IC card 1 may transmit the response indicating that the process is stopped or function is stopped to the IC card processing device 2 as the error process.

In the case where the plural pieces of regular process information in which the n-th regular command matched with the contents of the command received n-th is set exist, the control element 11 of the IC card 1 selects the pieces of regular process information as a candidate. In such cases, for the sequentially received commands, the regular process information in which the n-th regular command matched with the contents of the command received n-th is set is narrowed from the regular process information which becomes the candidate. In other words, in the Step S205, it is determined whether or not the regular process information in which the first to n-th regular commands matched with the commands received first to n-th are set exists. Therefore, even if the plural pieces of regular process information in which the regular commands having the same sequence are partially exist, the control element 11 can determine that the regular process information in which the regular command matched with the sequentially received commands is set exists.

An example of the unauthorized access detected by the third fraud detecting process will be described below.

Figure 14:
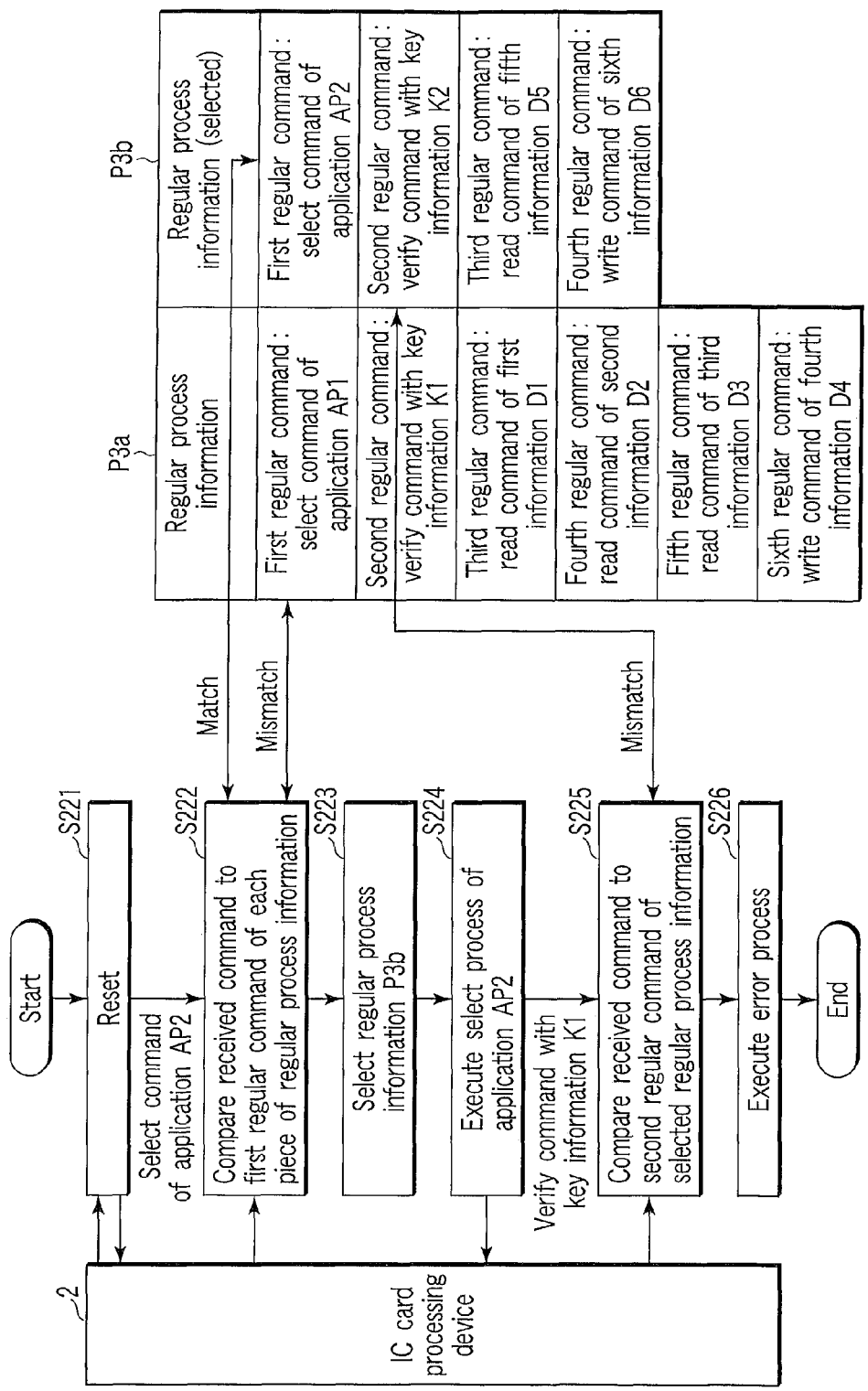
FIG. 14 is a flowchart showing an example of the unauthorized access detected by the third fraud detecting process.

FIG. 14 is a flowchart showing the unauthorized access detected by the third fraud detecting process. It is assumed that the pieces of regular process information P3*a* and P3*b* of FIG. 12 are previously stored in the data table 14*a* of the data memory 14. In FIG. 14, the detection of the unauthorized access will be described in the case where the select command of the application AP2 and the verify command with the key K1 are sequentially issued to the IC card 1.

The IC card 1 is turned on to execute reset process by the radio wave from the IC card processing device 2 (Step S221). When the IC card processing device 2 receives the notification that the reset process is completed from the IC card 1, the IC card processing device 2 transmits the select command of the application AP2 as the first command.

The IC card 1 receives the select command of the application AP2 as the first command after the reset. In this case, the control element 11 of the IC card 1 compares the contents of the received command to the contents of the first regular command in each piece of regular process information, and the control element 11 determines whether or not the regular process information in which the received command matched with the first regular command is set exists (Step S222). In the determination, the command code of the received command is compared to the command code of the first regular command in each piece of regular process information, and the processing parameter of the received command is compared to the processing parameter of the first regular command in each piece of regular process information.

At this point, the received command is matched with the first regular command in the regular process information P3$a$ with respect to the command code, although the received command is not matched with the first regular command with respect to the processing parameter. On the other hand, the received command is matched with the first regular command in the regular process information P3$b$ with respect to both the command code and the processing parameter.

For the command received first after the reset, the command code is the selection (select request), and the application AP2 is specified by the processing parameter. For the first regular command in the regular process information P3$a$, the command code is the selection, and the application AP1 is specified by the processing parameter. For the first regular command in the regular process information P3$b$, the command code is the selection, and the application AP2 is specified by the processing parameter.

Accordingly, the command received first after the reset is matched with the first regular command in the regular process information P3$a$ with respect to the command code indicating the type of command, although the received command differs from the first regular command in the processing parameter specifying the process target. On the other hand, the received command received first after the reset is matched with the first regular command in the regular process information P3$b$ with respect to both the command code indicating the type of command and the processing parameter specifying the process target.

Thus, the control element 11 of the IC card 1 determines that the command received first after the reset is matched with the first regular command in the regular process information P3$b$. Therefore, the control element 11 of the IC card 1 selects the regular process information P3$b$ as the regular process information in which the regular command matched with the received command is set (Step S223). In such case, in the subsequent series of processes, it is determined whether or not the sequentially received commands are matched with the regular commands in the regular process information P3$b$.

When the control element 11 selects the regular process information P3$b$ in which the first regular command matched with the command received first is set, the control element 11 executes the select process of the application AP2 as the process corresponding to the first received command (Step S224). When the process is completed, the control element 11 of the IC card 1 transmits the response indicating that the selection of the application AP2 is completed to the IC card processing device 2.

When the IC card processing device 2 which receives the response indicating that the selection of the application AP2 is completed, the IC card processing device 2 transmits the verify command for requesting the verify process with the key K1 as the second command. The IC card 1 receives the verify command with the key K1 as the second command after the reset. In Step S223, the regular process information P3$b$ is selected. Therefore, the control element 11 compares the contents of the received command to the second regular command set in the regular process information P3$b$ (Step S225).

At this point, for the command received second after the reset, the command code is the verification (verify request), and the key K1 is specified by the processing parameter. On the other hand, for the second regular command in the selected regular process information P3$b$, the command code is the verification, and the key K2 is specified by the processing parameter. That is, the command received second after the reset is matched with the second regular command in the regular process information P3$b$ with respect to the command code indicating the type of the command, although the received command is not match with the second regular command with respect to the processing parameter specifying the process target.

In the case where the received command is not matched with the regular command in the selected regular process information, the control element 11 of the IC card 1 determines that the IC card processing device (external device) 2 issues the unauthorized command. When the control element 11 of the IC card 1 determines that the IC card processing device 2 issues the unauthorized command, the control element 11 determines that the unauthorized access is made, and executes the error process in association with the unauthorized access (Step S226). In the error process, a part of or all the functions of the IC card 1 are stopped.

Thus, in the case where the plural pieces of regular process information are stored in the data table 14$a$, the IC card 1 to which the third fraud detecting process is applied determines whether or not the regular process information in which the regular command matched with the contents of the sequentially received commands is set exists. When the IC card 1 determines that the regular process information in which the regular command matched with the received command is set does not exist, the IC card 1 determines that the unauthorized access is made. Therefore, in the third fraud detecting process, the unauthorized access can be detected for the plural types of the processes based on the sequence of the contents of the received command. As a result, even in the IC card having various functions, the IC card can detect whether or not the process content requested from the external device is correct, and the unauthorized access can be prevented.

The third fraud detecting process can also be realized by the combination with the second fraud detecting process. In the plural pieces of regular process information to which the third fraud detecting process is applied, as shown in FIG. 9, the information (permissible time) indicating the regular reception timing may be set to each command. In such cases, in addition to the contents of the received command, the IC card 1 can determine whether the command is received at the correct timing each time the command is received. In such cases, even the IC card having various functions can detect whether or not the process content and the receiving timing of the commands requested from the external device are correct, and the unauthorized access can be prevented.

A method of executing each command which can be adopted to the first to third fraud detecting processes will be described below.

In the first to third fraud detecting processes, the unauthorized access is detected each time the command is received based on whether or not the contents, sequence, and reception timing of each command are authorized. However, the process which is executed before the unauthorized command is received is not canceled in the first to third fraud detecting processes. This means that the result of the process which is executed before the unauthorized access is detected is left when the process is stopped at the time the unauthorized access is detected. For example, the data rewritten before the unauthorized command is received might not be restorable.

Therefore, in the command executing method which can be adopted to the first to third fraud detecting processes, the process is executed on a particular command at the time the series of processes is completed according to all the regular commands or at the time all the regular commands associated with the series of processes are received. That is, the process contents of the particular command are retained in the working memory 13 of the IC card 1 until the series of processes is completed according to the commands or until all the regular commands associated with the series of processes are received. The process contents retained in the working memory 13 are thoroughly canceled when the unauthorized access is detected. When the unauthorized access is not detected, the process contents retained in the working memory 13 are collectively executed after the series of processes is completed according to the commands or after all the regular commands associated with the series of processes are received.

A write process is described below. In the write process, the data (write data) to be written in the non-volatile memory is retained in the working memory and the write data retained in the working memory are collectively written in the non-volatile memory at the time the series of processes is ended or at the time all the commands for executing the series of processes are received.

Figure 15:
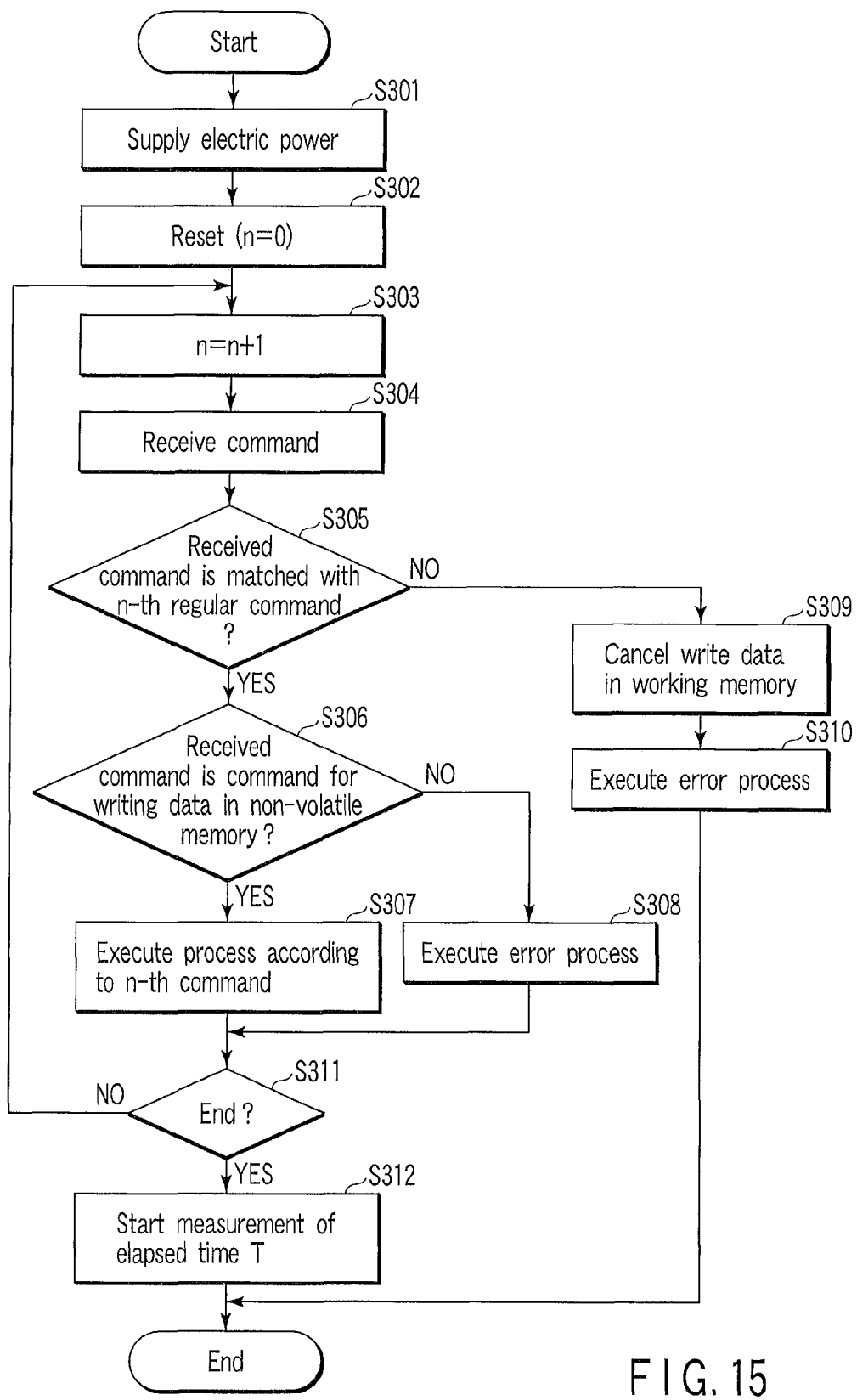
FIG. 15 is a flowchart showing a command executing method which can be applied to the first to third fraud detecting processes.

FIG. 15 is a flowchart showing the command executing method which can be adopted to the first to third fraud detecting processes.

FIG. 15 shows a process example in the case where the command executing method is adopted to the first fraud detecting process. However, the command executing method can similarly be adopted to the second and third fraud detecting processes.

At first the IC card 1 receives the radio wave in the form of the response request signal from the IC card processing device 2 through the antenna 17. The power supply 16 converts the radio wave received through the antenna 17 into the power supply voltage and clock pulse to operate the IC card 1. The power supply 16 supplies the power supply voltage and clock pulse, generated from the received radio wave, to each unit of the IC card 1 (Step S301). This enables the IC card 1 to be operated.

The control element 11 of the operable IC card 1 resets each unit (Step S302). The value of the variable n indicating the reception (execution) sequence of the command is initialized (n=0) in the reset process. When the reset process is normally ended, the control element 11 of the IC card 1 transmits the response indicating the reset completion to the IC card processing device 2. On the other hand, the control device 21 of the IC card processing device 2 causes the reader-writer 22 to transmit the first command which should be supplied to the IC card 1.

The control element 11 of the IC card 1 which transmits the response indicating the reset completion sets the variable n to n+1 (Step S303), and the control element 11 is in the standby state for receiving the command. During the standby state, when the control element 11 of the IC card 1 receives the command from the IC card processing device 2 through the antenna 17 and the communication control unit 15 (Step S304), the control element 11 determines whether or not the type (command code) and process contents (processing parameter) of the received command are matched with the n-th regular command indicated by the regular process information (Step S305).

When the control element 11 of the IC card 1 determines that the received command is not matched with the n-th regular command (NO in Step S305), the control element 11 determines that the received command is unauthorized, and stops the series of processes. In such cases, the control element 11 of the IC card 1 cancels all the pieces of write data stored in the working memory 13 through the series of processes (Step S309), and the control element 11 executes the error process (Step S310). As described above, there are various modes in the error process.

When the control element 11 of the IC card 1 determines that the received command is matched with the n-th regular command (YES in Step S305), the control element 11 determines whether or not the process contents of the received command (n-th command) are the process contents to be written in the data memory 14 (Step S306). At this point, the control element 11 determines whether or not the process contents of the received command should be executed at the time the series of processes is completed or at the time the commands of the series of processes are received. It is assumed that the process contents of the received command are written in the data memory 14 after the series of processes is completed. Therefore, the data to be written in the data memory 14 is stored in the working memory 13 formed by RAM in which the data can temporarily be retained.

When the control element 11 of the IC card 1 determines that the process contents of the received command (n-th command) are the process contents to be written in the data memory 14 (YES in Step S306), the control element 11 executes the process according to the received command while the write data to be written in the data memory 14 is retained in the working memory 13 (Step S307).

When the control element 11 of the IC card 1 determines that the process contents of the received command (n-th command) are not the process contents to be written in the data memory 14 (NO in Step S306), the control element 11 executes the process according to the received command (Step S308).

When the process is completed to the command received in Step S307 or S308, the control element 11 of the IC card 1 transmits the process result to the IC card processing device 2 in response to the received command. At the same time, the control element 11 of the IC card 1 determines whether or not the series of processes is ended according to the commands (Step S311). When the control element 11 of the IC card 1 determines that the series of processes is not ended according to the commands (NO in Step S311), the control element 11 returns to Step S303, and repeatedly executes processes in Steps S303 to S311.

When the control element 11 of the IC card 1 determines that the series of processes is ended according to the commands (YES in Step S311), the control element 11 executes the process of writing all the pieces of write data retained in the working memory 13 through the series of processes in the data memory 14 (Step S312). Therefore, all the pieces of write data retained in the working memory 13 are written in the data memory 14.

An example of the command executing method will be described below.

Figure 16:
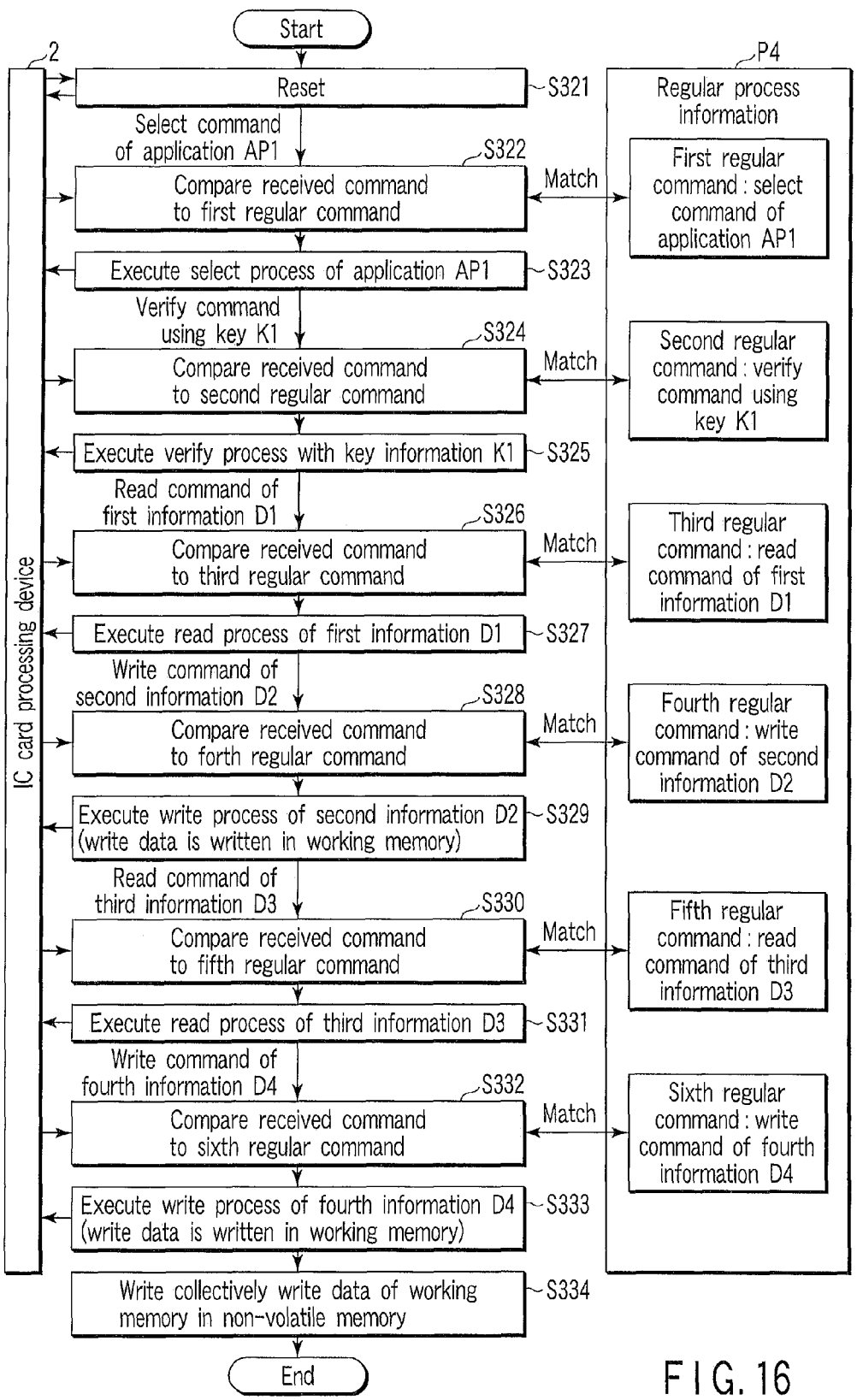
FIG. 16 is a flowchart showing a process example when an unauthorized command is not detected in a series of processes to which the command executing method of FIG. 15 is applied.
Figure 17:
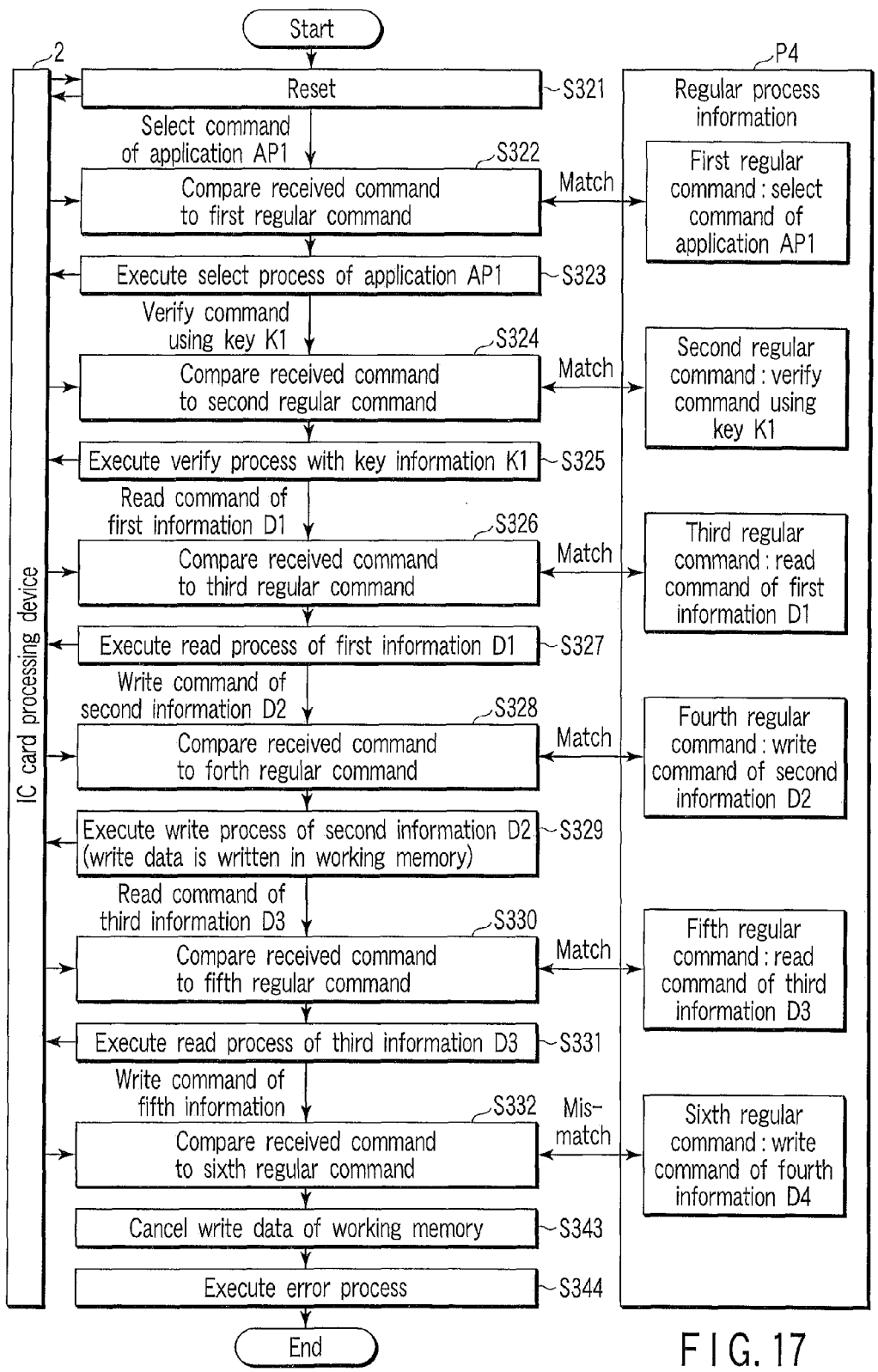
FIG. 17 is a flowchart showing a process example when an unauthorized command is detected in a series of processes to which the command executing method of FIG. 15 is applied.

FIGS. 16 and 17 are a flowchart showing a process example to which the command executing method is applied. At this point, it is assumed that the select command of the application AP1 as the first regular command, the verify command with the key K1 as the second regular command, the read command of the first information D1 as the third regular command, the read command of the second information D2 as the fourth regular command, the read command of the third information D3 as the fifth regular command, and the write command of the fourth information D4 as the sixth regular command are set as regular process information P4. FIG. 16 shows the process example when all the regular commands are correctly received. FIG. 17 shows the process example when the command received sixth is not matched with the sixth regular command.

The IC card 1 is turned on to execute a reset process by the radio wave from the IC card processing device 2 (Step S321). When the IC card processing device 2 receives the notification that the reset process is completed from the IC card 1, the IC card processing device 2 transmits the select command of the application AP1 as the first command.

The IC card 1 receives the select command of the application AP1 as the first command after the reset. In this case, the control element 11 of the IC card 1 determines that the contents (command code and processing parameter) of the received command are matched with the first regular command set as the regular process information P4 (Step S322). The control element 11 of the IC card 1 executes the select process of the application AP1 based on the determination (Step S323). After the select process is completed, the control element 11 of the IC card 1 transmits the response indicating that the selection of the application AP1 is completed to the IC card processing device 2.

When the IC card processing device 2 receives the response indicating that the selection of the application AP1 is completed, the IC card processing device 2 transmits the verify command for requesting the verify process with the key K1 as the second command. The IC card 1 receives the verify command with the key K1 as the second command after the reset. The control element 11 of the IC card 1 determines that the process contents of the received command are matched with the process contents of the second regular command set as the regular process information P4 (Step S324). The control element 11 of the IC card 1 executes the verify process with the key K1 based on the determination (Step S325). After the verify process is completed, the control element 11 of the IC card 1 transmits the response indicating that the verification is completed with the key K1 to the IC card processing device 2.

When the IC card processing device 2 receives the response indicating that the verification is completed with the key K1, the IC card processing device 2 transmits the read command for requesting the read of the first information D1 as the third command. The IC card 1 receives the read command of the first information D1 as the third command after the reset. In this case, the control element 11 of the IC card 1 determines that the received command is matched with the third regular command set as the regular process information P4 (Step S326). The control element 11 executes the read process of the first information D1 based on the determination (Step S327). When the read process is completed, the control element 11 of the IC card 1 transmits the response indicating that the read of the first information D1 is completed to the IC card processing device 2.

When the IC card processing device 2 receives the response indicating that the read of the first information D1 is completed, the IC card processing device 2 transmits the write command for requesting the write of the second information D2 as the fourth command. The IC card 1 then receives the write command of the second information D2 as the fourth command after the reset. The control element 11 of the IC card 1 determines that the process contents of the received command are matched with the fourth regular command set as the regular process information P4 (Step S328).

The control element 11 of the IC card 1 executes the write process of the second information D2 based on the determination (Step S329). Because the received command is the write command, the control element 11 of the IC card 1 determines that the received command is the process contents to be written in the data memory 14. The control element 11 of the IC card 1 writes (retains) the write data in the working memory 13 in the process corresponding to the received command (write command of second information D2) based on the determination, instead of writing the write data as the second information D2 in the data memory 14.

When the process is completed according to the write command of the second information D2, the control element 11 of the IC card 1 transmits the response indicating that the write of the second information D2 is completed to the IC card processing device 2.

When the IC card processing device 2 receives the response indicating that the write of the second information D2 is completed, the IC card processing device 2 transmits the read command for requesting the read of the third information D3 as the fifth command. The IC card 1 receives the read command of the third information D3 as the fifth command after the reset. The control element 11 of the IC card 1 determines that the received command is matched with the fifth regular command set as the regular process information P4 (Step S330). The control element 11 of the IC card 1 executes the read process of the third information D3 based on the determination (Step S331). When the read process is completed, the control element 11 of the IC card 1 transmits the response indicating that the read of the third information D3 is completed to the IC card processing device 2.

In the process example of FIG. 16, when the IC card processing device 2 receives the response indicating that the read of the third information D3 is completed, the IC card processing device 2 transmits the write command for requesting the write of the fourth information D4 as the sixth command. The IC card 1 receives the write command of the fourth information D4 as the sixth command after the reset. In this case, the control element 11 of the IC card 1 compares the process contents of the received command to the sixth regular command set as the regular process information P4 (Step S332), and determines whether or not the process contents of the received command are matched with the sixth regular command.

In the process example of FIG. 16, the control element 11 of the IC card 1 determines that the process contents of the command received sixth are matched with the sixth regular command set as the regular process information P4. The control element 11 of the IC card 1 executes the write process of the fourth information D4 corresponding to the sixth command based on the determination (Step S333). Because the sixth received command is the write command, the control element 11 of the IC card 1 determines that the received command is the process contents to be written in the data memory 14. The control element 11 of the IC card 1 writes (retains) the write data in the working memory 13 in the process corresponding to the received command (write command of fourth information D4) based on the determination, instead of writing the write data as the fourth information D4 in the data memory 14.

When the process is completed according to the write command of the fourth information D4, the control element 11 of the IC card 1 transmits the response indicating that the write of the fourth information D4 is completed to the IC card processing device 2. At the same time, when the write of the fourth information D4 is completed, the control element 11 of the IC card 1 determines that the series of processes is normally ended. The control element 11 may determine the end of the series of processes based on the notification from the IC card processing device 2.

When the control element 11 of the IC card 1 determines that the series of processes is normally ended, the control element 11 executes the process of collectively writing the write data retained by the working memory 13 in the data memory 14 (Step S334). After all the pieces of write data retained by the working memory 13 are written in the data memory 14, the series of processes is completely ended.

In the process example of FIG. 17, when the IC card processing device 2 receives the response indicating that the read of the third information D3 is completed, it is assumed that the IC card processing device 2 transmits the write command for requesting the write of the fifth information as the sixth command. The IC card 1 receives the write command of the fifth information as the sixth command after the reset. In this case, the control element 11 of the IC card 1 compares the process contents of the received command to the sixth regular command set as the regular process information P4 (Step S332), and determines whether or not the process contents of the received command are matched with the sixth regular command.

In the process example of FIG. 17, the control element 11 of the IC card 1 determines that the process contents of the command received sixth are not matched with the sixth regular command set as the regular process information P4. Because the command received sixth is the unauthorized command, the control element 11 determines that the IC card processing device (external device) 2 makes the unauthorized access.

When the control element 11 of the IC card 1 determines that the unauthorized access is made, the control element 11 determines that the series of processes is stopped. When the control element 11 of the IC card 1 determines that the series of processes is stopped based on the detection of the unauthorized access, the control element 11 cancels all the pieces of write data retained by the working memory 13 (Step S343), and executes the error process (Step S344). As described above, the working memory 13 is formed by RAM. Therefore, the write data retained on the working memory 13 can easily be canceled.

In the IC card 1 to which the command executing method is applied, for the write data of which the received command requests the write in the non-volatile memory 14, write data is not actually written in the non-volatile memory 14 but retained in the working memory 13, before the unauthorized command is received, namely, before the unauthorized access is detected. All the pieces of write data retained in the working memory 13 are collectively written in the non-volatile memory 14 after the control element 11 determines that all the commands of the series of processes are the correct commands. All the pieces of write data retained in the working memory 13 are canceled when the unauthorized command is detected until the series of processes is completed.

Therefore, in the IC card, the result of the process according to the received command can be prevented from remaining, before the unauthorized command is received in the series of processes, namely, before the unauthorized access is detected in the series of processes.

Thus, in the IC card according to the first embodiment, the information indicating the correct process contents is stored in the data memory 14*a*, and the control element 11 determines whether or not the process contents of the command issued from the external device 2 are matched with the process contents stored in the data memory 14*a*. When the control element 11 determines that the process contents of the received command are matched with the correct process contents stored in the data memory 14*a*, the control element 11 executes the process according to the received command. When the control element 11 determines that the process contents of the received command are not matched with the process contents stored in the data memory 14*a*, the control element 11 determines that the received command is the unauthorized command.

Therefore, according to the first embodiment, the unauthorized command issued from the external device 2 to the IC card 1 can be detected to prevent the unauthorized access.

Next, the second embodiment applied to the IC card 1 will be described below.

The process according to the second embodiment will schematically be described first.

As described above, in the IC card 1, the series of processes is executed according to the series of commands sequentially issued from the IC card processing device (external device) 2. In the IC card 1 according to the second embodiment, log data is stored in the data memory 14 in the series of processes. The log data indicates the command received from the IC card processing device 2 and the process contents executed according to each command. On the basis of the log data, the IC card 1 executes the process of detecting the presence or absence of the unauthorized access immediately after the reset. That is, in the IC card 1 of the second embodiment, the process of detecting the presence or absence of the unauthorized access is executed to the last log data in each reset.

Figure 18:
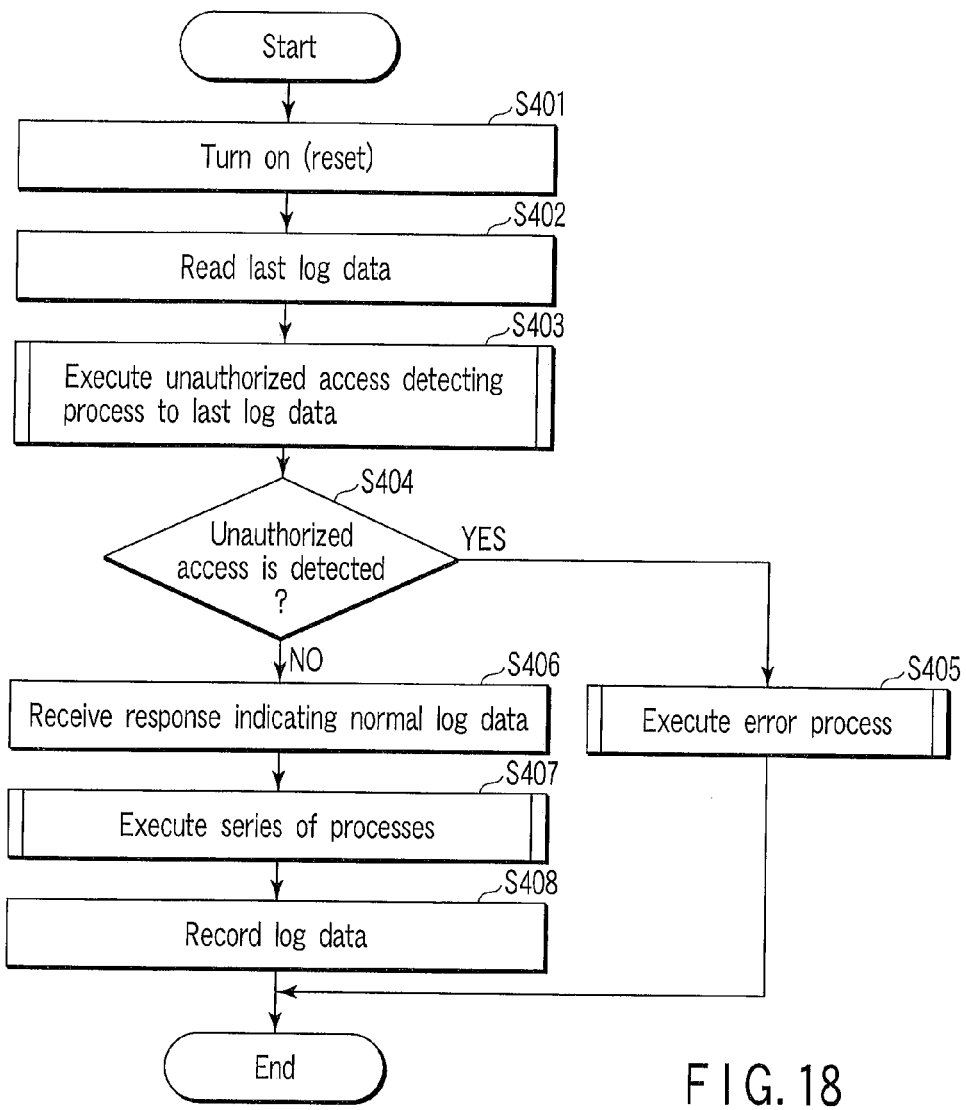
FIG. 18 is a flowchart showing a process example of the IC card according to the second embodiment.
Figure 19:
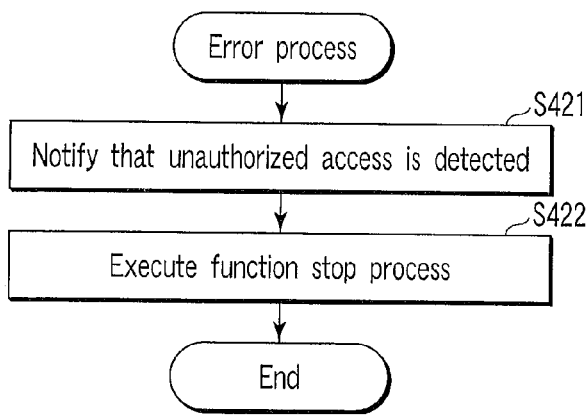
FIG. 19 is a flowchart showing an example of an error process.

FIG. 18 is a flowchart schematically showing the process (the IC card process including the fraud detecting process with the log data) according to the second embodiment. FIG. 19 is a flowchart showing an example of the error process when the unauthorized access is detected from the log data.

In the IC card processing device 2, during the standby state, the card reader-writer 22 transmits the electric power and clock pulse in the form of the radio wave to operate the IC card 1 as the response request signal to the IC card 1.

When the IC card 1 is presented within a communication range of the card reader-writer 22 of the IC card processing device 2 which is in the above state, the IC card 1 receives the radio wave which is the response request signal from the IC card processing device 2 through the antenna 17. The radio wave received through the antenna 17 is converted into the power supply voltage and clock pulse by the power supply 16, and the power supply voltage and clock pulse are used to operate the IC card 1. The power supply 16 supplies the power supply voltage and clock pulse generated from the received radio wave to each unit of the IC card 1. This enables the IC card 1 to be operated. The control element 11 of the operable IC card 1 resets each unit (Step S401).

When the reset process is completed, the control element 11 of the IC card 1 reads one piece of log data indicating the last series of process contents from the data memory 14. The one piece of log data is information which indicates contents of each received command or executed process contents in the last series of processes. When the control element 11 of the IC card 1 reads the log data, the control element 11 executes the unauthorized access detecting process (fraud detecting process) (Step S403). In the unauthorized access detecting process, the control element 11 determines whether or not the command contents or executed process contents which are indicated by the log data are the proper contents. The fraud detecting process from the log data will be described in detail later.

When the unauthorized access is detected in the log data through the fraud detecting process (YES in Step S404), the control element 11 of the IC card 1 executes the error process (Step S405). In the error process, as shown in FIG. 19, the IC card processing device 2 is notified that the unauthorized access is detected (Step S421), and the control element 11 executes the process of stopping a part of or all the functions of the IC card (Step S422).

When the unauthorized access is not detected in the log data through the fraud detecting process (NO in Step S404), the control element 11 of the IC card 1 transmits the response indicating that the series of processes can be executed to the IC card processing device 2 (Step S406). The IC card 1 which transmits the response executes the series of processes according to the commands sequentially issued from the IC card processing device 2 (Step S407). In the series of processes, the control element 11 of the IC card 1 stores the information as the one piece of log data in the data memory 14 (Step S408). The information indicates the contents of each received command and the process contents executed according to the command.

The log data stored in the data memory 14 is appropriately be deleted. In the second embodiment, at least the last log data may be held in the data memory 14 when the unauthorized access determination process is executed. Accordingly, the control element 11 of the IC card 1 sequentially deletes the log data in which the unauthorized access is not detected. However, depending on the operational mode, sometimes a large amount of log data is preferably stored as much as possible. In such cases, the control element 11 of the IC card 1 can sequentially delete the log data according to a capacity in which the data can be stored as the log data in the data memory 14.

The transaction process realized by the application AP1 and the process of collecting the log data of the transaction process will be described as a specific example.

In the transaction process realized by the application AP1, it is assumed that processes having the predetermined contents are executed according to the predetermined sequence. Therefore, in the correct transaction process, the IC card processing device 2 issues the predetermined commands to the IC card 1 according to the predetermined sequence. In other words, when it is detected that the predetermined commands are not issued according to the predetermined sequence in the log data of the transaction process, the IC card 1 can determine that the unauthorized access is possibly made.

Figure 20:
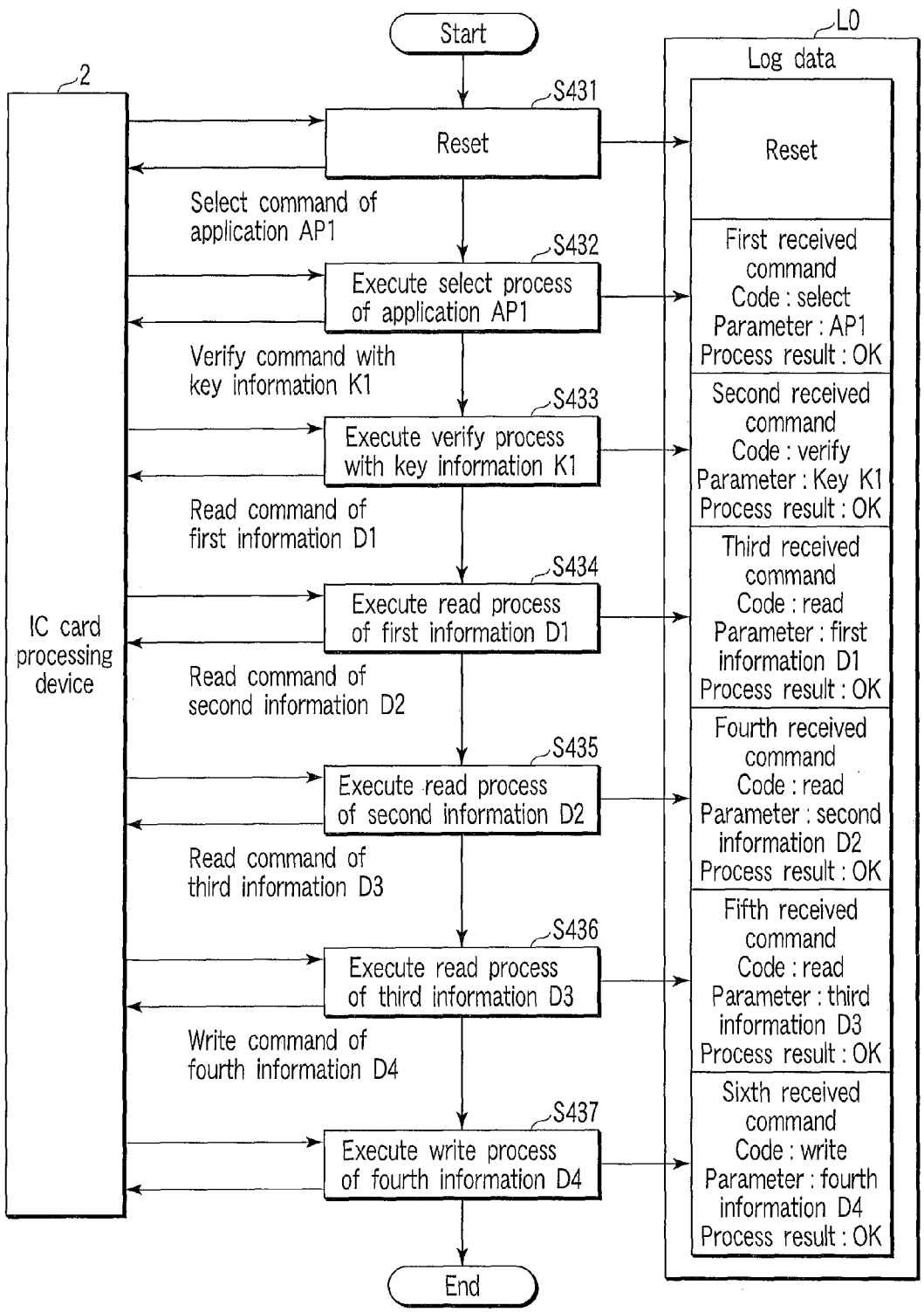
FIG. 20 is a flowchart showing an example a correct transaction process and a log data collecting process in the transaction process.

FIG. 20 is a flowchart showing the correct transaction process performed by the IC card 1 and a log data collecting process in the transaction process.

It is assumed that the select process of the application AP1, the verify process with the key information K1, the read process of the first information D1, the read process of the second information D2, the read process of the third information D3, and the write process of the fourth information D4 are sequentially executed in the correct transaction process.

As described above, the IC card 1 is turned on by the radio wave from the IC card processing device 2, and executes the reset process. When the reset is completed in the IC card 1 and it is determined, based on the log data, that the last series of processes is correct, the IC card 1 transmits the response indicating that the process can be executed to the IC card processing device 2. The reset control element 11 of the IC card 1 stores the information indicating that the reset process is completed in the data memory 14 as the log data L0 of the series of processes (transaction process) to be executed (Step S431).

When the control device 21 of the IC card processing device 2 receives the response indicating that the reset process is completed from the IC card 1, the control device 21 transmits the command (select command) C1 to the IC card 1. The command C1 requests the selection of the application AP1 as the first command for executing the transaction process. The command code of the select command C1 is information indicating the select request (select). The processing parameter of the select command C1 includes information indicating the application AP1.

When the control element 11 of the IC card 1 receives the select command C1, the control element 11 executes the application select process according to the command received first after the reset (Step S432). At this point, the control element 11 of the IC card 1 stores the information indicating the contents of the select command C1 (command received first after the reset) in the data memory 14 as the log data L0 of the transaction process. The command code (in this case, select), the processing parameter (in this case, application AP1), and the like are stored in the data memory 14 as the information indicating the contents of the first received command (select command C1) in the transaction process.

When the selection of the application AP1 is completed, the control element 11 of the IC card 1 stores the information indicating the process result of the select command C1 (first received command) in the data memory 14 as the log data L0 of a transaction process, and the control element 11 transmits the response (response indicating the process result of the select command C1) indicating the selection of the application AP1 to the IC card processing device 2.

When the control device 21 of the IC card processing device 2 receives the response indicating the selection of the application AP1, the control device 21 transmits the command (verify command) C2 to the IC card 1. The command C2 requests the verify process with the key information K1 as the predetermined process subsequent to the process of selecting the application AP1. The key information K1 is the verify information corresponding to the application AP1. The command code of the verify command C2 is information indicating the verify request. The processing parameter of the verify command C2 includes the encrypted key information K1.

When the control element 11 of the IC card 1 receives the verify command C2, the control element 11 executes the verify process with the key K1 according to the command received second after the reset (Step S433). At this point, when the control element 11 of the IC card 1 receives the verify command C2, the control element 11 stores the information indication the contents of the verify command C2 (command received second after the reset) in the data memory 14 as the log data L0 of the transaction process. The command code (in this case, verify), the processing parameter (in this case, key K1), and the like are stored in the data memory 14 as the information indicating the contents of the second received command (verify command C2) in the transaction process.

When the verify process with the key K1 is completed, the control element 11 of the IC card 1 stores the information indicating the process result of the second received command (verify command C2) in the data memory 14 as the log data L0 of transaction process, and transmits the response (response indicating the process result of the verify command C2) indicating the successful verification with the key information K1 to the IC card processing device 2.

When the control device 21 of the IC card processing device 2 receives the response indicating the successful verification with the key information K1, the control device 21 transmits the command (read command) C3 to the IC card 1. The command C3 requests the read of the first information (for example, card number) D1 as the predetermined process subsequent to the verify process. The first information D1 is information which is possessed by the IC card 1 as the data (data file existing in the directory of the application AP1) corresponding to the application AP1. The command code of the read command C3 is information indicating the read request (read). The processing parameter of the read command C3 includes the information indicating that the data which becomes the read target is the first information D1.

When the IC card 1 receives the read command C3, the IC card 1 executes the read process of the first information D1 according to the command received third after the reset (Step S434). At this point, the control element 11 of the IC card 1 stores the information indicating the contents of the read command C3 (command received third after the reset) in the data memory 14 as the log data L0 of the transaction process. The command code (in this case, read), the processing parameter (in this case, first information D1), and the like are stored in the data memory 14 as the information indicating the contents of the third received command (read command C3) in the transaction process.

When the read of the first information D1 is completed, the control element 11 of the IC card 1 stores the information indicating the process result of the third received command (read command C3) in the data memory 14 as the log data L0 of a transaction process, and transmits the response (response indicating the process result of the read command C3) including the information on the read first information D1 to the IC card processing device 2.

When the control device 21 of the IC card processing device 2 receives the response (response including the read first information D1) indicating the successful read of the first information D1, the control device 21 transmits the command (read command) C4 to the IC card 1. The command C4 requests the read of the second information (for example, name) D2 as the predetermined process subsequent to the process of reading the first information D1. The second information D2 is information which is possessed by the IC card 1 as the data (data file existing in the directory of the application AP1) corresponding to the application AP1. The command code of the read command C4 is information indicating the read request (read). The processing parameter of the read command C4 includes the information indicating that the data which becomes the read target is the second information D2.

When the IC card 1 receives the read command C4, the IC card 1 executes the read process of the second information D2 according to the command received fourth after the reset (Step S435). At this point, the control element 11 of the IC card 1 stores the information indicating the contents of the read command C4 (command received fourth after the reset) in the data memory 14 as the log data L0 of the transaction process. The command code (in this case, read), the processing parameter (in this case, second information D2), and the like are stored in the data memory 14 as the information indicating the contents of the fourth received command (read command C4) in the transaction process.

When the read of the second information D2 is completed, the control element 11 of the IC card 1 stores the information indicating the process result of the fourth received command (read command C4) in the data memory 14 as the log data L0 of a transaction process, and transmits the response (response indicating the process result of the read command C4) indicating the information on the read second information D2 to the IC card processing device 2.

When the control device 21 of the IC card processing device 2 receives the response (response including the read second information D2) indicating the successful read of the second information D2, the control device 21 transmits the command (read command) C5 to the IC card 1. The command C5 requests the read of the third information (for example, expiration date) D3 as the predetermined process subsequent to the process of reading the second information D2. The third information D3 is information which is possessed by the IC card 1 as the data (data file existing in the directory of the application AP1) corresponding to the application AP1. The command code of the read command C5 is information indicating the read request (read). The processing parameter of the read command C5 includes the information indicating that the data which becomes the read target is the third information D3.

When the IC card 1 receives the read command C5, the IC card 1 executes the read process of the third information D3 according to the command received fifth after the reset (Step S436). At this point, the control element 11 of the IC card 1 stores the information indicating the contents of the read command C5 (command received fifth after the reset) in the data memory 14 as the log data L0 of the transaction process. The command code (in this case, read), the processing parameter (in this case, third information D3), and the like are stored in the data memory 14 as the information indicating the contents of the fifth received command (read command C5) in the transaction process.

When the read of the third information D3 is completed, the control element 11 of the IC card 1 stores the information indicating the process result of the fifth received command (read command C5) in the data memory 14 as the log data L0 of a transaction process, and transmits the response (response indicating the process result of the read command C5) indicating the information on the read third information D3 to the IC card processing device 2.

When the control device 21 of the IC card processing device 2 receives the response (response including the read third information D3) indicating the successful read of the third information D3, the control device 21 transmits the command (write command) C6 to the IC card 1. The command C6 requests the write process of the fourth information (for example, transaction amount) D4 as the predetermined process subsequent to the process of reading the third information D3. The fourth information D4 is information which is possessed by the IC card 1 as the data (data file existing in the directory of the application AP1) corresponding to the application AP1. The command code of the write command C6 is information indicating the write request (write). The processing parameter of the write command C6 includes the information indicating that the data which becomes the write target is the fourth information D4.

When the IC card 1 receives the write command C6, the IC card 1 executes the write process of the fourth information D4 according to the command received sixth after the reset (Step S437). At this point, the control element 11 of the IC card 1 stores the information indication the contents of the write command C6 (command received sixth after the reset) in the data memory 14 as the log data L0 of the transaction process. The command code (in this case, write), the processing parameter (in this case, fourth information D4), and the like are stored in the data memory 14 as the information indicating the contents of the sixth received command (write command C6) in the transaction process.

When the write of the fourth information D4 is completed, the control element 11 of the IC card 1 stores the information indicating the process result of the sixth received command (write command C6) in the data memory 14 as the log data L0 of a transaction process, and transmits the response (response indicating the process result of the write command C6) indicating the successful write of the fourth information D4 to the IC card processing device 2.

When the control device 21 of the IC card processing device 2 receives the response indicating the successful write of the fourth information D4 in response to the write command C6, the control device 21 determines that the series of transaction process is normally ended to the IC card 1. When the control device 21 of the IC card processing device 2 receives the response indicating that the process according to the command cannot normally be ended in response to each of the commands C1 to C6, the control device 21 determines that error is generated in the series of transaction process to the IC card 1. When the error is generated, the control device 21 of the IC card processing device 2 can execute the series of transaction process again from the beginning, or the control device 21 can stop the series of transaction process.

According to the series of processes of the second embodiment, the process is executed according to the commands, and the log data L0 is stored in the data memory 14. The log data L0 indicates the contents (command code and processing parameter) of each command and the process results. That is, the log data L0 for the series of processes indicates the process results from the reset process to the process according to the last command in the series of processes. Therefore, when the external device makes the next access, namely, when the IC card 1 is turned on next time, the IC card 1 can execute the process (fraud detecting process) of detecting the unauthorized access in the log data.

Next, the fraud detecting process of detecting the unauthorized access from the log data will be described in detail.

In the second embodiment, the unauthorized access is detected from the log data based on the regular process information P stored in the memory (for example, data memory 14) of the IC card 1. The regular process information P indicates the regular process sequence and the regular process contents. As described above, in the correct series of transaction processes, the predetermined plural commands are sequentially issued to the IC card 1 in the predetermined sequence. Therefore, when the log data of the series of processes is not matched with the predetermined process contents, the IC card 1 executes the process (fraud detecting process) of determining that the external device makes the unauthorized access. There are various techniques in the fraud detecting process of detecting the unauthorized access from the log data. In the second embodiment, fourth to sixth fraud detecting processes will be described as the technique of detecting the unauthorized access from the log data.

In the following description, it is assumed that regular process information P indicating the correct process contents and process sequence is previously stored in the data table 14*a* of the data memory 14 of the IC card 1. It is assumed that the log data L indicating the contents (contents and of the received command and process results) of the already-executed series of processes are previously stored in the data memory 14. Each command in which the type of the command and the process contents are defined in the regular process information is called a regular command, and the command whose order is defined n-th in the regular process information is called an n-th regular command.

The fourth fraud detecting process, which is the second embodiment applied to the IC card 1, will be described below.

In the fourth fraud detecting process, it is assumed that the unauthorized access is detected in the log data based on the regular process information P1 of FIG. 4.

As shown in FIG. 4, in the regular process information P1, at least the command code indicating the type of the command and the processing parameter indicating the process target are defined as the contents of each regular command. In the regular process information P1, the processing parameter is indicated by data (value) which should be permitted as the process target of each regular command. The processing parameter of each regular command defined in the regular process information P1 may be one value, plural values, or a value range. The command code defined in the regular process information P1 may be one command code or plural command codes.

In the fourth fraud detecting process, the IC card 1 compares the log data to the regular process information P1 of FIG. 4 to determine whether or not each command in the log data is the correct sequence and the correct process contents. For example, when the processing parameter of the regular command defined by the regular process information P1 has plural values, the IC card 1 determines whether or not the processing parameter of the received command is matched with one of the plural values in which the processing parameter of each command in the log data is set as the processing parameter of the regular command. When the processing parameter of the regular command defined by the regular process information P has the value range, the IC card 1 determines whether or not the received command is matched with the regular command based on whether or not the processing parameter of the received command exists within the value range in which the processing parameter of each command in the log data is set as the processing parameter of the regular command.

That is, when the IC card 1 determines that the contents of the command in the log data are not matched with the contents of the regular command specified by the regular process information P1, or when the IC card 1 determines that the reception sequence of the command in the log data is not matched with the reception sequence of the regular command specified by the regular process information P1, the IC card 1 determines that the unauthorized command is issued (the unauthorized access is made). When the IC card 1 determines that the unauthorized access is made, the IC card 1 executes the error process. In the error process, the IC card 1 notifies the outside that the unauthorized access is made, and a part of or all the functions of the IC card 1 are stopped or restricted.

In the case where the regular process information P1 is set as shown in FIG. 4, unless the log data indicates that the select command C1 in which the application AP1 is specified by the processing parameter, the verify command C2 in which the key information K1 is specified by the processing parameter, the read command C3 in which the first information D1 is specified by the processing parameter, the read command C4 in which the second information D2 is specified by the processing parameter, the read command C5 in which the third information D3 is specified by the processing parameter, and the write command C6 in which the fourth information D4 is specified by the processing parameter are sequentially received, the IC card 1 determines that the unauthorized access is made.

FIG. 21 is a flowchart showing the fourth fraud detecting process. The process of FIG. 21 corresponds to Steps S402 to S405 of FIG. 18, and the fourth fraud detecting process is executed immediately after the IC card 1 is turned on (reset).

When the control element 11 of the IC card 1 is turned on (reset) by receiving the radio wave from the IC card processing device 2, the control element 11 initializes the variable n (n=0) (Step S500), and reads the log data corresponding to the last series of processes (Step S501). Then, the control element 11 initializes the variable n to set the variable n to n+1 (Step S502), and compares the contents of the n-th received command in the log data to the contents of the n-th regular command in the regular process information (Step S503).

When the control element 11 determines that the contents of the n-th received command in the log data are matched with the contents of the n-th regular command in the regular process information (YES in Step S504), the control element 11 determines whether or not the process of detecting the unauthorized access is completed to the log data based on whether or not all the received command in the log data are compared to the regular commands in the regular process information P1 (Step S506). Until the control element 11 determines that the process of detecting the unauthorized access is completed, the control element 11 of the IC card 1 returns to Step S502, and repeatedly executes the process in the Steps S502 to S506.

When the control element 11 determines that the contents of the n-th received command in the log data are not matched with the contents of the n-th regular command in the regular process information P1 (NO in Step S504), the control element 11 stops the series of processes to execute the error process (Step S505). For example, in the error process, the control element 11 notifies the IC card processing device 2 that the unauthorized access is detected, or a part of or all the functions possessed by the IC card 1 are stopped. When a part of or all the functions possessed by the IC card 1 are stopped (restricted), the IC card 1 is configured such that a part of or all the restricted functions are enabled by the later-mentioned recovery process. The recovery process will be described later.

Next, two examples of the unauthorized access detected by the fourth fraud detecting process will be described.

A first example of the unauthorized access detected by the fourth fraud detecting process will be described.

Figure 22:
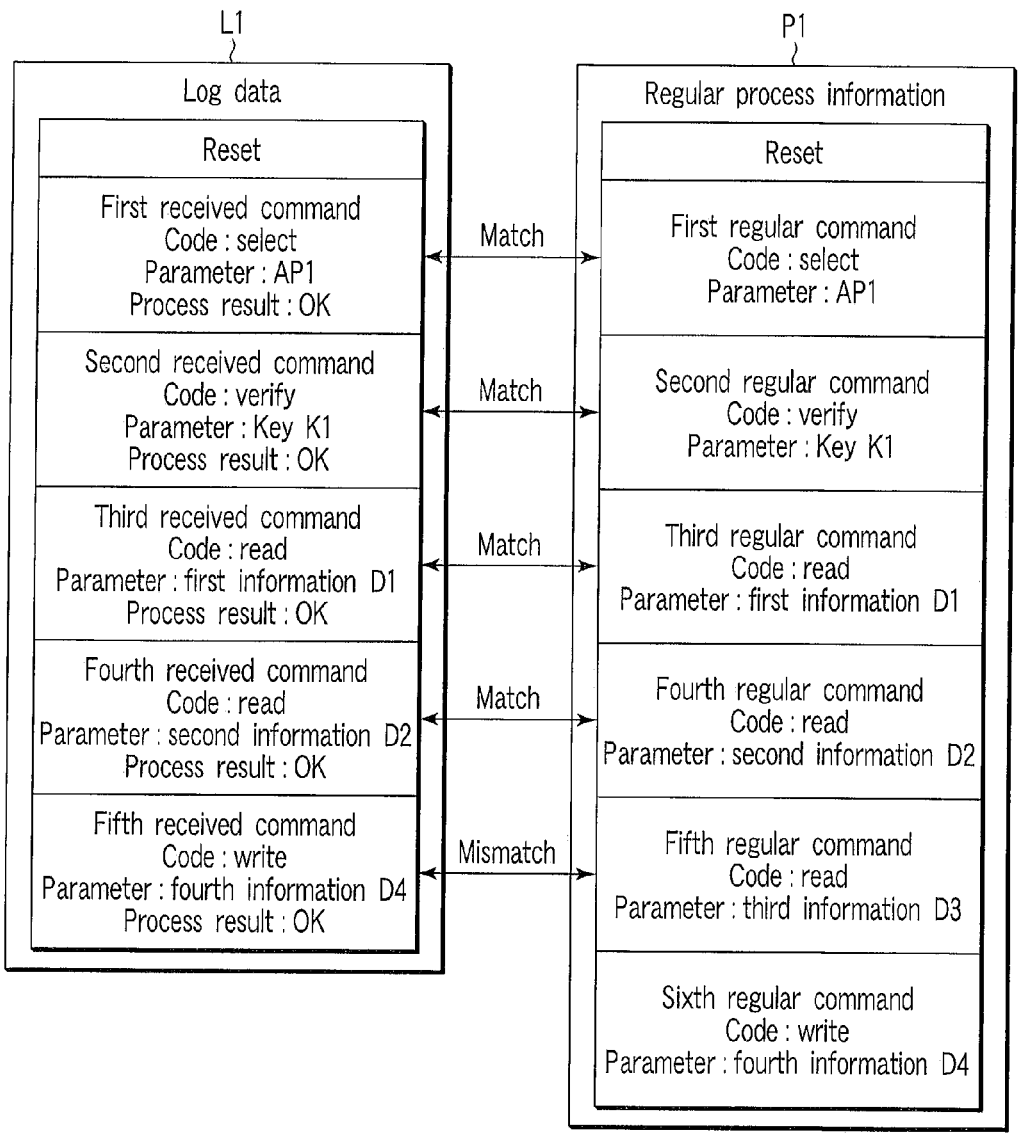
FIG. 22 shows a first example of the unauthorized access detected by the fourth fraud detecting process.

FIG. 22 shows the first example of the unauthorized access detected by the fourth fraud detecting process. It is assumed that the regular process information P1 of FIG. 4 is previously stored in the data table 14a of the data memory 14. In the first example of FIG. 22, it is assumed that the read command of the third information D3 defined by the regular process information P1 is omitted in the log data L1.

According to the fourth fraud detecting process, the control element 11 of the IC card 1 sequentially compares the received commands in the log data L1 to the regular commands in the regular process information P1. As shown in FIG. 22, although the first to fourth received commands are matched with the regular commands, the fifth received command is not matched with the regular command. That is, the fifth received command in the log data L1 differs from the fifth regular command in the regular process information P1 in both the command code and the processing parameter. Accordingly, the control element 11 of the IC card 1 determines that the unauthorized access is made in the series of processes indicated by the log data, and the control element 11 executes the error process in association with the unauthorized access.

Next, a second example of the unauthorized access detected by the fourth fraud detecting process will be described.

Figure 23:
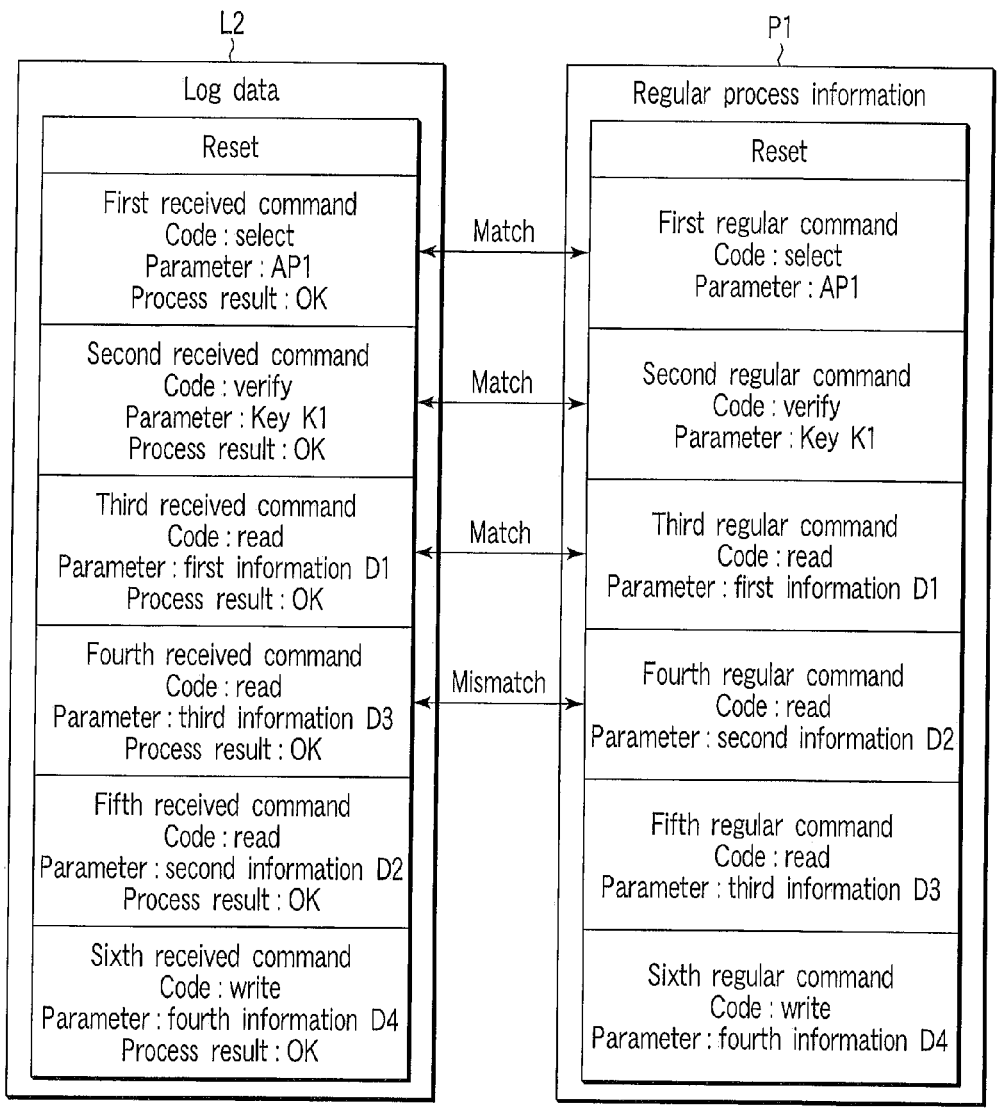
FIG. 23 shows a second example of the unauthorized access detected by the fourth fraud detecting process.

FIG. 23 shows the second example of the unauthorized access detected by the fourth fraud detecting process. It is assumed that the regular process information P1 of FIG. 4 is previously stored in the data table 14a of the data memory 14. In the log data L2 of FIG. 23, when compared with the regular process information P1, the sequence is changed between the read command of the third information D3 and the read command of the second information D2. In the second example of FIG. 23, it is assumed that the log data L2 indicates that the read command of the third information D3 defined by the regular process information P1 is received in the unauthorized sequence.

According to the fourth fraud detecting process, the control element 11 of the IC card 1 sequentially compares the received commands in the log data L2 to the regular commands in the regular process information P1. As shown in FIG. 23, although the first to third received commands are matched with the regular commands, the fourth received command is not matched with the regular command. That is, the fourth received command in the log data L2 differs from the fourth regular command in the regular process information P1 in the processing parameter while the fourth received command is matched with the fourth regular command in the command code. Accordingly, the control element 11 of the IC card 1 determines that the unauthorized access is made in the series of processes indicated by the log data, and the control element 11 executes the error process in association with the unauthorized access.

Thus, in the IC card 1 to which the fourth fraud detecting process is applied, the contents of the received commands in the log data are sequentially verified with the contents of the regular commands in the regular process information, and the unauthorized access is detected in the series of processes indicated by the log data when the received command is not matched with the regular command. Therefore, in the fourth fraud detecting process, it can be determined whether or not the received command recorded as the log data are the regular contents and reception sequence, and thereby the appropriate process can be executed to the IC card in which the unauthorized access is made.

For example, as shown in the first example of FIG. 22, in the IC card 1 to which the fourth fraud detecting process is applied, it can be determined that the unauthorized access is made when the command which should be given according to the regular process sequence in the log data is omitted. As shown in the second example of FIG. 23, in the IC card 1 to which the fourth fraud detecting process is applied, it can be determined that the unauthorized access is made when the command which should be given according to the regular process sequence in the log data is given according to the unauthorized sequence.

As shown in the second example of FIG. 23, in the IC card 1 to which the fourth fraud detecting process is applied, not only for the command code (type of command) but also for the process contents indicated by the processing parameter, it is determined whether or not the process contents of the command which should be given according to the regular process sequence are matched with the process contents of the received command in the log data. Therefore, it can be determined that the unauthorized access is made, when the process contents (processing parameter) of the command which should be given according to the regular process sequence are not matched with the process contents (processing parameter) of the received command in the log data, even if the command code of the command which should be given according to the regular process sequence is matched with the command code of the received command in the log data.

That is, in the fourth fraud detecting process, as shown in the second example of FIG. 23, it is possible to detect the unauthorized access in which the processing parameter is changed. For example, the following items can be detected in the fourth fraud detecting process: the processing parameter of the read command is wrongly changed to read the information, and the processing parameter of the write command is wrongly changed to write the information.

The fifth fraud detecting process which is the second embodiment applied to the IC card 1 will be described below.

In the fifth fraud detecting process, it is assumed that the unauthorized access is detected in the log data based on the regular process information P2 of FIG. 9 according to the first embodiment.

In the regular process information P2, as shown in FIG. 9, the timing at which each command should be received is defined as the contents of each regular command in addition to the command code indicating the type of the command and the command processing parameter indicating the process target. In the regular process information P2, the timing at which each command should be received is indicated by a permissible value of the time interval between the commands. As with the regular process information P1, the processing parameter or command code may be defined by plural values in the regular process information P2.

As described above, in the regular process information P2 of FIG. 9, for the sake of simple explanation, the time interval (permissible time) between the commands is expressed by the number of seconds. However, preferably the time interval (permissible time) between the commands is set by the number of operation clocks of the IC card 1. This is because usually the batteryless IC card 1 is operated by the operation clock supplied from the IC card processing device 2 which is the external device. The time interval between the commands defined by the regular process information P2 of FIG. 9 is the time until the next command is received after the response (response indicating the process result of the command) to a certain command is transmitted. However, the time interval between the commands may be a time interval until the IC card 1 receives the next command after the IC card 1 receives a certain command.

In the fifth fraud detecting process, it is determined whether or not the time interval between the commands in the log data is authorized based on the time interval between the commands defined by the regular process information P2. Therefore, in the IC card 1 to which the fifth fraud detecting process is applied, the information indicating the time interval between the commands is stored as the log data. That is, in the IC card 1 to which the fifth fraud detecting process is applied, the time (the number of clocks) until the next command is received after the response to the command is transmitted is measured in the series of processes such as the transaction process. The measured time interval (received time interval) between the commands is stored as the information indicating the time interval between the commands in the form of the log data along with the contents and process result of each command.

The IC card 1 in which the log data is stored compares the log data to the regular process information P2 of FIG. 9 to determine whether or not the command in the log data has the correct sequence, correct process contents, and correct reception timing. That is, in the fifth fraud detecting process, it is determined whether or not the commands in the log data are received at correct time intervals, in addition to the determination, which is also executed in the fourth fraud detecting process, whether or not the command in the log data has the correct sequence and correct process contents.

For example, in the case where it is determined that the command reception timing in the log data is not matched with the correct reception timing set in the regular process information P2, the IC card 1 determines that the unauthorized access is made. When the IC card 1 determines that the unauthorized access is made, the IC card 1 executes the error process. In the error process, the IC card 1 notifies the outside that the unauthorized access is detected from the log data, and a part of or all the functions of the IC card 1 are stopped or restricted.

In the case where the regular process information P2 of FIG. 9 is set, unless the log data indicates that each command is received at the timing defined by the regular process information P2 even if the contents (type and process content) and sequence of the received command in the log data are matched with the contents and sequence of the regular command defined by the regular process information P2, the IC card 1 determines that the unauthorized access is made.

Next, an example of the fifth fraud detecting process will be described.

Figure 24:
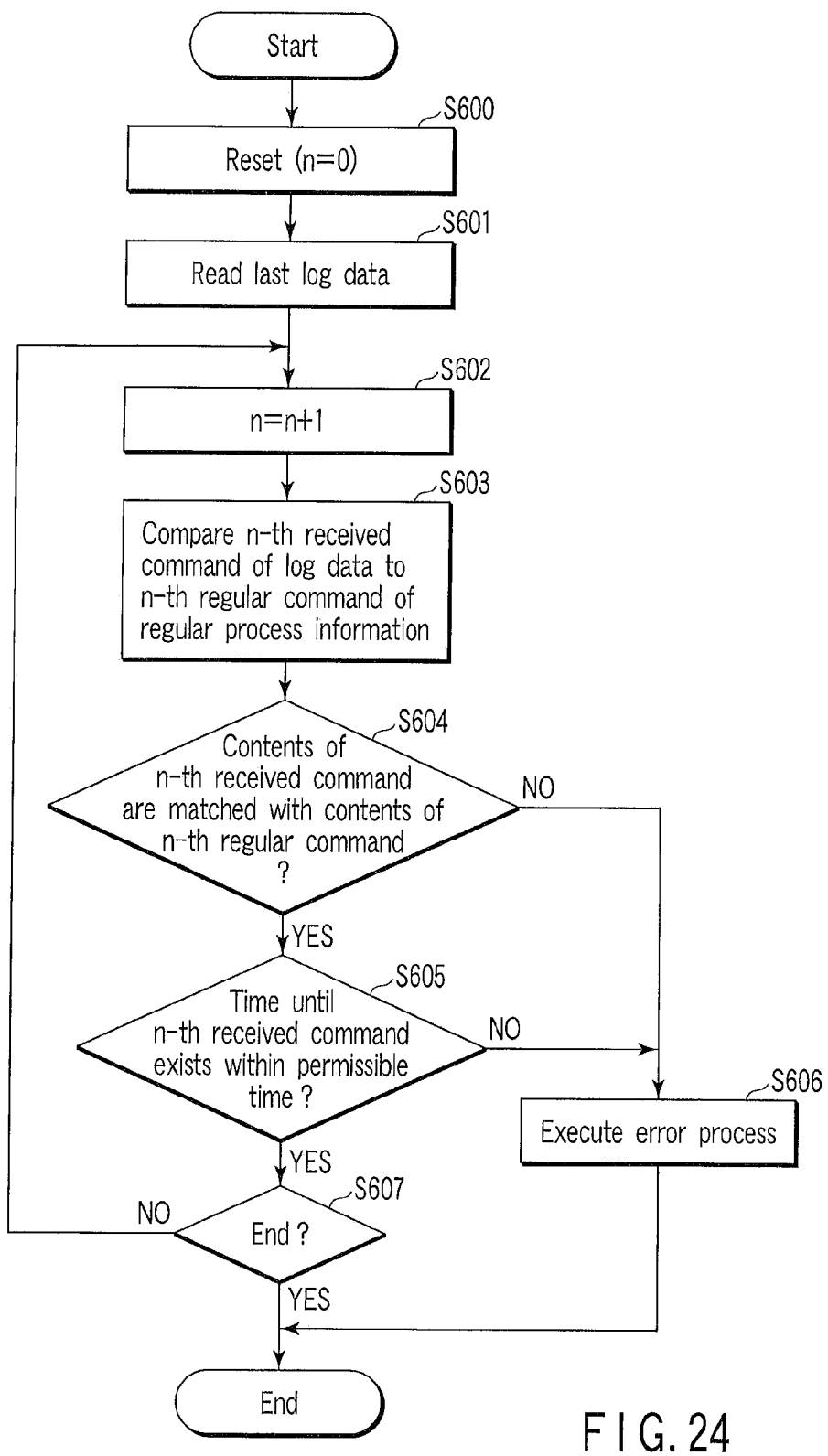
FIG. 24 is a flowchart showing a fifth fraud detecting process.

FIG. 24 is a flowchart showing the fifth fraud detecting process. The process of FIG. 24 corresponds to Steps S402 to S405 of FIG. 18, and the fifth fraud detecting process is executed immediately after the IC card 1 is turned on (reset).

When the control element 11 of the IC card 1 is turned on (reset) by receiving the radio wave from the IC card processing device 2, the control element 11 initializes the variable n (n=0) (Step S600), and reads the log data corresponding to the last series of processes (Step S601). Then, the control element 11 of the IC card 1 initializes the variable n to set the variable n to n+1 (Step S602), and compares the information on the n-th received command after the reset in the log data to the information on the n-th regular command in the regular process information (Step S603).

When the control element 11 of the IC card 1 determines that the contents of the n-th received command in the log data are matched with the contents of the n-th regular command in the regular process information (YES in Step S604), the control element 11 further determines whether or not the time interval (the number of clocks), recorded as the log data, until the n-th command is received exists within the range of permissible time T(n−1)n, defined by the regular process information P2, until the n-th command is received (Step S605).

When the control element 11 determines that the time until the n-th command is received exists within the permissible time T(n−1)n (YES in Step S605), the control element 11 determines whether or not the unauthorized access detecting process is completed to the log data based on whether or not the comparison between all the received commands in the log data and the regular commands in the regular process information P1 is completed (Step S607). Until the control element 11 of the IC card 1 determines that the unauthorized access detecting process is completed, the control element 11 returns to Step S602, and repeatedly executes the process in the Steps S602 to S607.

When the control element 11 of the IC card 1 determines that the contents of the n-th received command in the log data are not matched with the contents of the n-th regular command in the regular process information (NO in Step S604), or when the control element 11 determines that the time until the n-th command is received exists out of the permissible time T(n−1)n (NO in Step S605), the control element 11 stops the series of processes to execute the error process (Step S606). For example, in the error process, the control element 11 notifies the IC card processing device 2 that the unauthorized access is detected, or a part of or all the functions possessed by the IC card 1 are stopped. When a part of or all the functions possessed by the IC card 1 are stopped (restricted), the IC card 1 is configured such that a part of or all the restricted functions are enabled by the later-mentioned recovery process. The recovery process will be described later.

Next, an example of the unauthorized access detected by the fifth fraud detecting process will be described.

Figure 25:
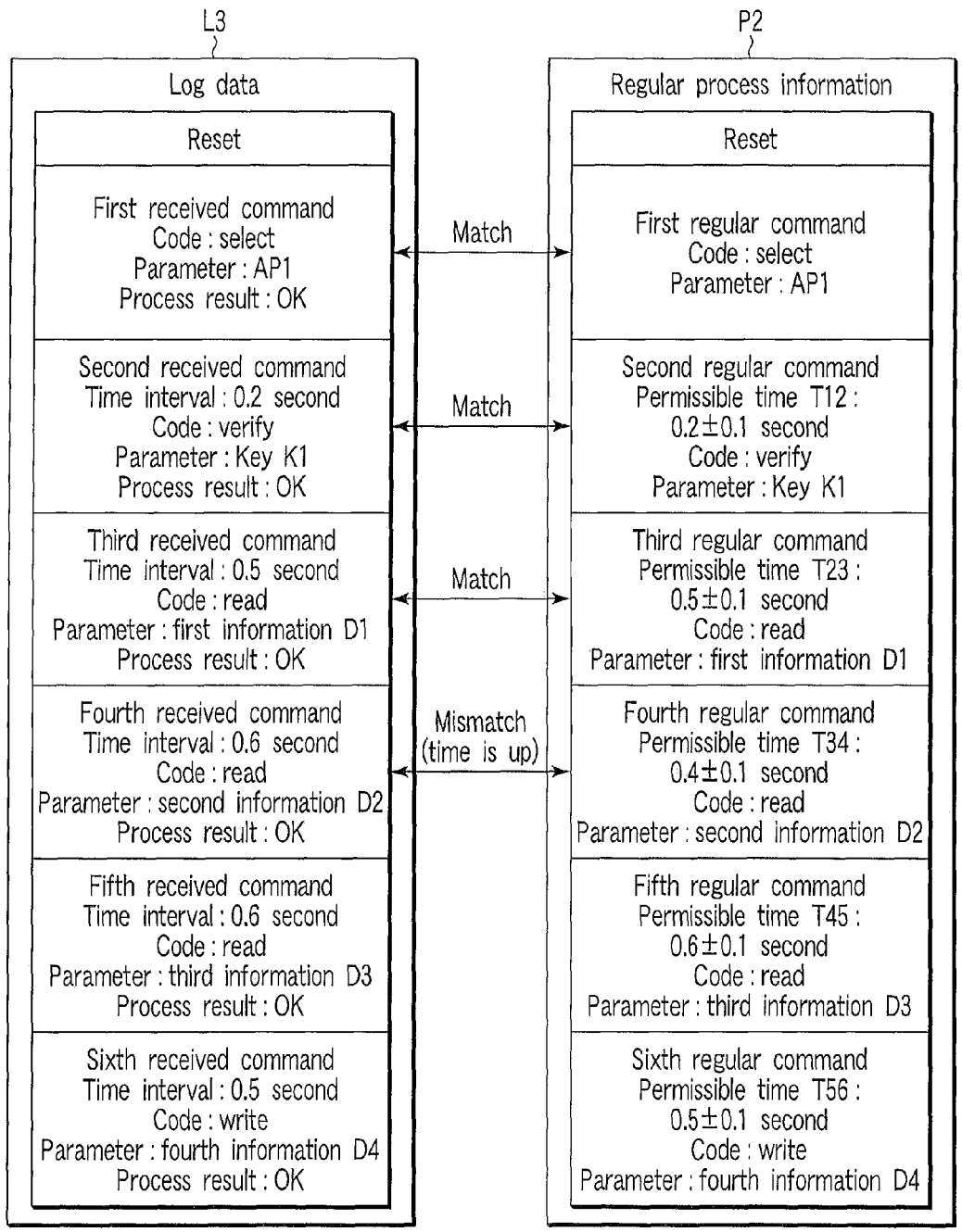
FIG. 25 shows an example of the unauthorized access detected by the fifth fraud detecting process.

FIG. 25 shows an example of the unauthorized access detected by the fifth fraud detecting process. It is assumed that the regular process information P2 of FIG. 9 is previously stored in the data table 14a of the data memory 14. In the example of FIG. 25, it is assumed that the time interval until the fourth command is received in log data L3 exceeds the permissible time T34 defined by the regular process information P2.

According to the fifth fraud detecting process, the control element 11 of the IC card 1 sequentially compares the received commands in the log data L3 to the regular commands in the regular process information P2. As shown in FIG. 25, the contents of the received commands are matched with the contents of the regular commands. However, the time interval until the fourth command is received exceeds the permissible time T34 defined by the regular process information P2. Accordingly, the control element 11 of the IC card 1 determines that the unauthorized access is made in the series of processes indicated by the log data L3, and executes the error process in association with the unauthorized access.

Thus, in the IC card 1 to which the fifth fraud detecting process is applied, even if the regular contents of each command are given according to the regular sequence in the log data indicating the contents of the already-executed series of processes, the IC card 1 determines that the unauthorized access is made unless the time interval until each command is received exists within the predetermined permissible time defined by the regular process information.

Therefore, in the fifth fraud detecting process, the unauthorized access can be detected based on whether or not each command is given at correct timing in addition to the contents and sequence of the already-executed commands. As a result, based on the log data, the IC card 1 can detect the unauthorized access in which the external device issues the plural commands to the IC card using the unauthorized program other than the regular control program.

Next, an example of the sixth fraud detecting process which is the second embodiment applied to the IC card 1 will be described.

In the sixth fraud detecting process, it is assumed that the unauthorized access is detected in the log data based on the regular process information P3 (P3a and P3b) of FIG. 12.

In the sixth fraud detecting process, it is assumed that plural pieces of regular process information P3a, P3b, . . . are previously stored in the data table 14a of the data memory 14 of the IC card 1. The pieces of regular process information P3a and P3b have the configurations shown in FIGS. 4 and 9 respectively. The pieces of regular process information P3a and P3b correspond to various series of processes executed by the IC card 1. For example, in the case where plural applications for realizing various functions are stored in the data memory 14, the pieces of regular process information P3a, P3b, . . . are set in the applications respectively. The plural pieces of regular process information may be set in one application.

In the sixth fraud detecting process, it is determined the presence or absence of the regular process information in which the regular command matched with each command in log data is defined. When it is determined that the regular process information in which the regular command having the contents and sequence matched with the contents and sequence of each command in log data is defined does not exist, the IC card 1 determines that the unauthorized access is made. When the IC card 1 determines that the unauthorized access is made, the IC card 1 notifies the external device that the unauthorized access is detected from the log data, or a part of or all the functions possessed by the IC card 1 are stopped.

That is, in the case where the pieces of regular process information P3a and P3b of FIG. 12 are stored in the data table 14a, the IC card 1 executes the fraud detecting process similar to the fourth and fifth fraud detecting processes to the log data using the regular process information P3a when the first received command is the select request of the application AP1. The IC card 1 executes the fraud detecting process similar to the fourth and fifth fraud detecting processes to the log data using the regular process information P3b when the first received command is the select request of the application AP2.

Next, an example of the sixth fraud detecting process will be described.

Figure 26:
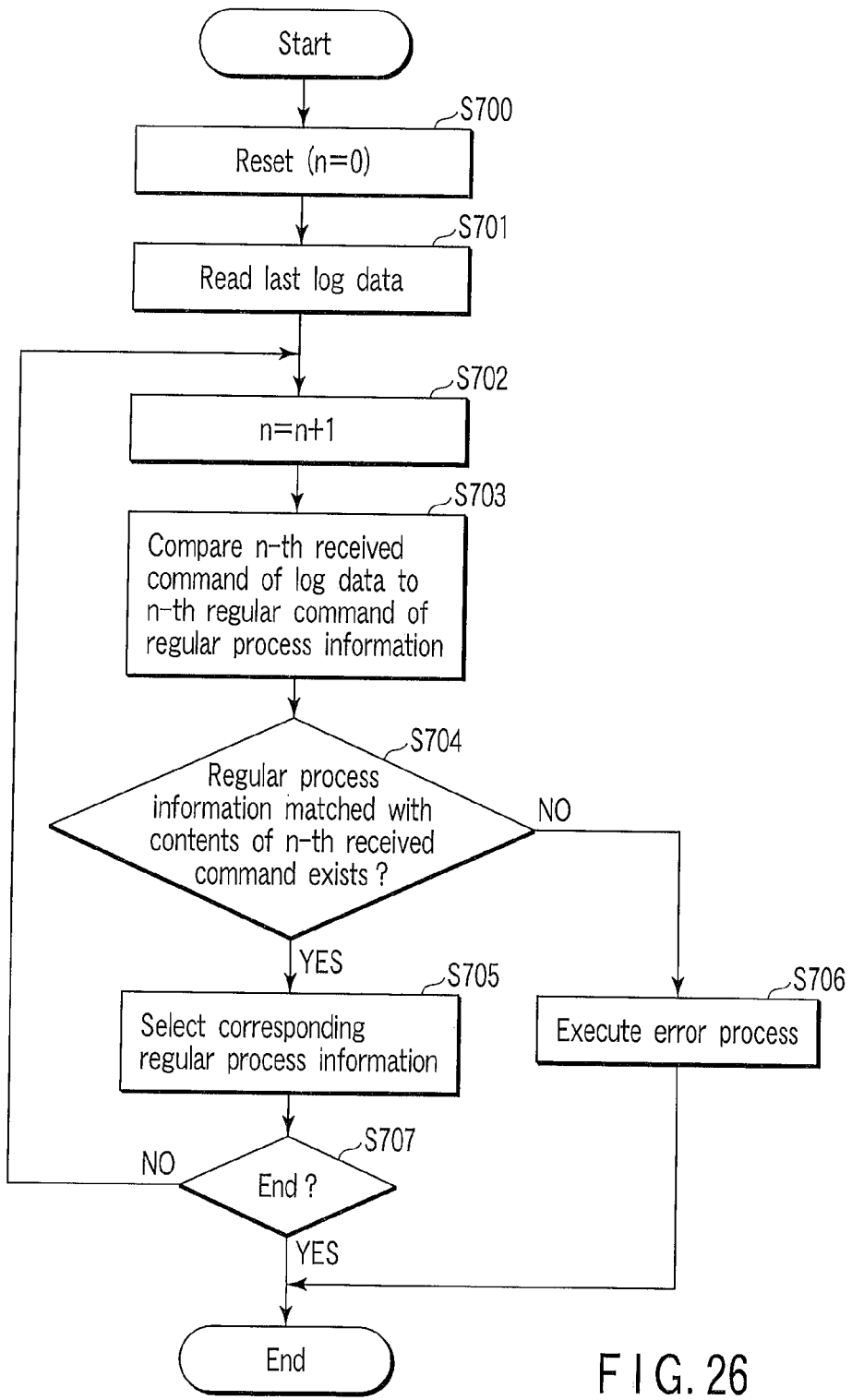
FIG. 26 is a flowchart showing a sixth fraud detecting process.

FIG. 26 is a flowchart showing the sixth fraud detecting process. The process of FIG. 26 corresponds to Steps S402 to S405 of FIG. 18, and the sixth fraud detecting process is executed immediately after the IC card 1 is turned on (reset).

When the control element 11 of the IC card 1 is turned on (reset) by receiving the radio wave from the IC card processing device 2, the control element 11 initializes the variable n (n=0) (Step S700), and reads the log data corresponding to the last series of processes (Step S701). Then, the control element 11 initializes the variable n to set the variable n to n+1 (Step S702), and compares the contents of the n-th received command in the log data to the contents of the n-th regular command in the regular process information (Step S703).

On the basis of the comparison result in Step S703, the control element 11 of the IC card 1 determines whether or not the regular process information in which the n-th regular command having the contents matched with the contents of the n-th received command in the log data is defined exists (Step S704). In Step S704, the control element 11 compares the contents of the n-th regular command in the regular process information selected in Step S705 to the contents of the n-th received command in the log data. Accordingly, the control element 11 determines the presence or absence of the regular process information in which the n-th regular command in the regular process information selected in Step S705 having the contents matched with the contents of the n-th received command in the log data is defined.

When the control element 11 of the IC card 1 determines that the regular process information in which the n-th regular command having the contents matched with the contents of the n-th received command in the log data is defined exists (YES in Step S704), the control element 11 selects the regular process information in which the n-th regular command matched with the n-th received command is defined (Step S705).

In the case where the plural pieces of regular process information in which the n-th regular command having the contents matched with the contents of the command received n-th is defined exist, the control element 11 of the IC card 1 selects the pieces of regular process information as a candidate. Consequently, the control element 11 of the IC card 1 can sequentially narrow the regular process information in which the n-th regular command matched with the contents of the command received n-th is defined from the regular process information which becomes the candidate. In other words, in the Step S704, it is determined whether or not the regular process information in which the first to n-th regular commands matched with the commands received first to n-th are set exists. Therefore, even if the plural pieces of regular process information in which the regular commands having the same sequence are partially defined exist, the IC card 1 can determine whether or not the regular process information in which the regular commands matched with the sequentially received commands are set exists.

When the control element 11 of the IC card 1 selects the regular process information in which each regular command matched with the received command is defined, the control element 11 determines whether or not the unauthorized access detecting process is completed to the log data based on whether or not the comparison between all the received commands in the log data and the regular commands in the regular process information P1 is completed (Step S707). Until the control element 11 determines that the unauthorized access detecting process is completed, the control element 11 returns to Step S702, and repeatedly executes the process in the Steps S702 to S707.

When the control element 11 of the IC card 1 determines that the regular process information in which the n-th regular command having the contents matched with the contents of the n-th received command in the log data is defined does not exist (NO in Step S704), the control element 11 stops the series of processes to execute the error process (Step S706). For example, in the error process, the control element 11 notifies the IC card processing device 2 that the unauthorized access is detected, or a part of or all the functions possessed by the IC card 1 are stopped. When a part of or all the functions possessed by the IC card 1 are stopped, the IC card 1 is configured such that a part of or all the restricted functions are enabled by the later-mentioned recovery process. The recovery process will be described later.

Next, an example of the unauthorized access detected through the sixth fraud detecting process will be described.

Figure 27:
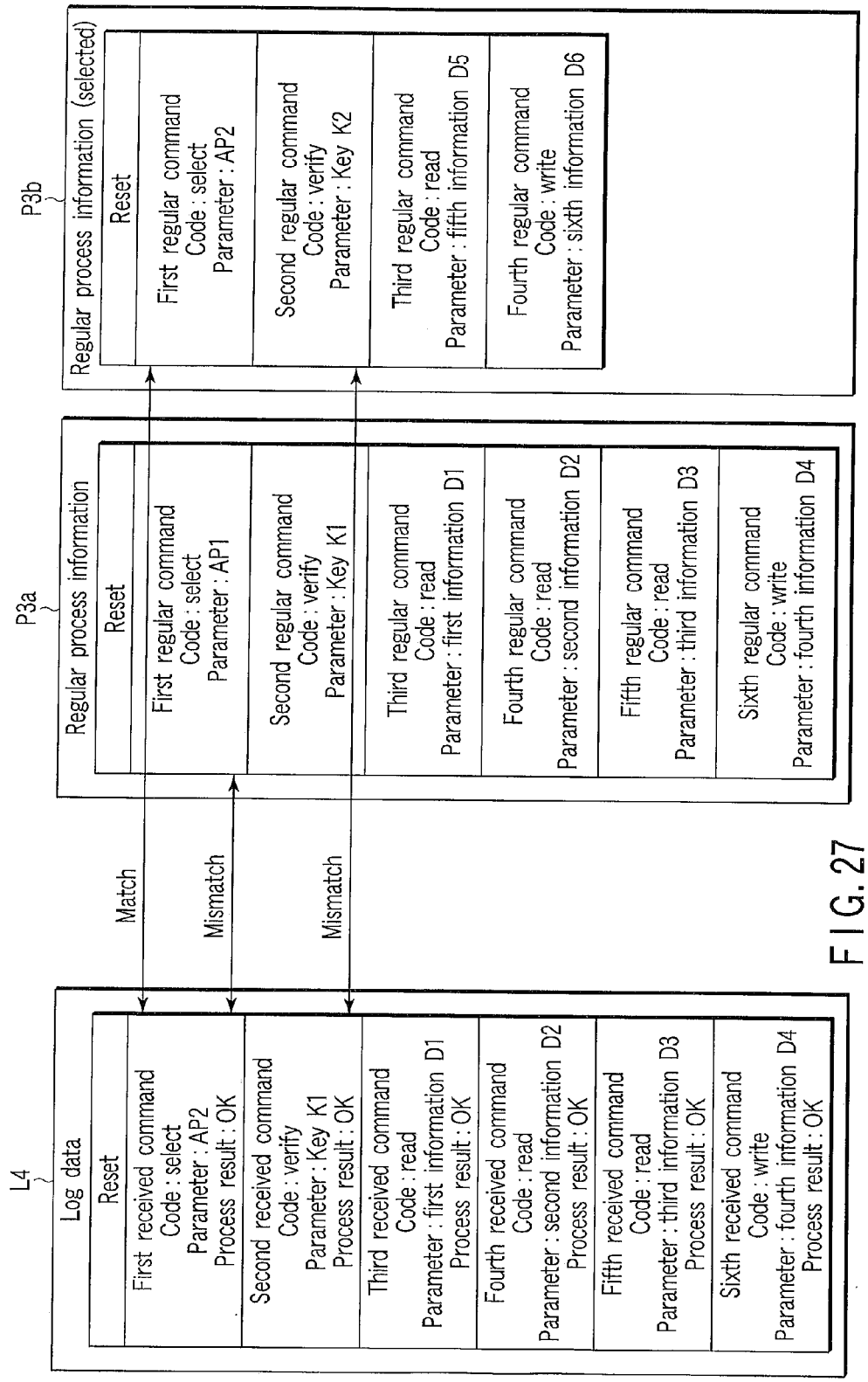
FIG. 27 shows an example of the unauthorized access detected by the sixth fraud detecting process.

FIG. 27 shows an example of the unauthorized access detected by the sixth fraud detecting process. It is assumed that the pieces of regular process information P3a and P3b of FIG. 12 are previously stored in the data table 14a of the data memory 14. In the sixth fraud detecting process, the control element 11 of the IC card 1 determines the presence or absence of the regular process information in which the regular command matched with each received command in log data L4 is defined.

As shown in FIG. 27, the IC card 1 to which the sixth fraud detecting process is applied selects the regular process information P3b as the regular process information in which the regular command matched with the first received command in the log data L4 is defined. This is because the processing parameter "AP2" of the first received command in the log data L4 is matched with the processing parameter "AP2" of the first regular command in the regular process information P3b while being not matched with the processing parameter "AP1" of the first regular command in the regular process information P3a. In such cases, it is determined whether or not the received commands subsequent to the first received command in the log data are matched with the regular commands in the regular process information P3b.

As shown in FIG. 27, for the second received command in the log data, the processing parameter is "key K1". On the other hand, the processing parameter is "key K2" for the third regular command in the regular process information P3b. Accordingly, the IC card 1 determines that the contents of the second received command are not matched with the contents of the second regular command in the selected regular process information P3b. In other words, the IC card 1 determines that the regular process information matched with the second received command does not exist. Accordingly, in the example of FIG. 27, the control element 11 of the IC card 1 determines that the unauthorized access is made in the series of processes indicated by the log data L4, and executes the error process in association with the unauthorized access.

Thus, in the case where the plural pieces of regular process information are set, the IC card 1 to which the sixth fraud detecting process is applied sequentially determines the presence or absence of the regular process information in which the regular command matched with each received command in log data indicating the contents of the already-executed series of processes is defined. When the IC card 1 determines that the regular process information in which the regular command matched with each received command in log data is defined does not exist, the control element 11 of the IC card 1 determines that the unauthorized access is detected from the log data.

Therefore, in the sixth fraud detecting process, the plural pieces of regular process information can be stored according to various processes, and the unauthorized access can be detected even if the plural pieces of regular process information are stored. That is, even in the IC card having the various functions, it can be detected that the unauthorized access is made based on whether or not the correct process contents are detected from the log data.

The sixth fraud detecting process can also be realized by combination with the fifth fraud detecting process. That is, in the plural pieces of regular process information to which the sixth fraud detecting process is applied, the information (permissible time) indicating the regular reception timing may be set to each command as shown in FIG. 9. In such cases, the IC card 1 can determine whether or not the command is received at the correct timing in addition to the contents and sequence of the received command in the log data. Even in the IC card having the various functions, it can be detected that the unauthorized access is made based on whether or not the correct process contents and reception timing are detected from the log data.

In the IC card to which the second embodiment is applied, the log data indicating the contents of the series of processes executed according to the commands from the outside is retained, the contents of the received commands in the log data are sequentially verified with the contents of the regular commands in the regular process information when the IC card is turned on next time, and the unauthorized access is detected in the series of processes indicated by the log data when the received command is not matched with the regular command.

Therefore, according to the second embodiment, it can be determined whether or not the command received from the log data are the regular contents and sequence, and the IC card having high security level in which the unauthorized access is detected from the log data can be provided.

Next, the recovery process of recovering the function of the IC 1 card in which a part of or all the functions are restricted (stopped) will be described.

As described above, the IC card 1 executes the error process, in the case where the unauthorized access is detected through the first to third fraud detecting processes which are the first embodiment or the fourth to sixth fraud detecting processes which are the second embodiment. In the error process, a part of or all the functions possessed by the IC card 1 are restricted (stopped). In the restriction of the functions, for example, the key information used in the verification is disabled (locked), a particular function is stopped, or execution of a process according to the select request (select command) of the application for realizing the function is rejected.

In the IC card 1 whose function is restricted, it is necessary to execute the recovery process of recovering the restricted function using a predetermined procedure. The procedure necessary to recover the restricted function is appropriately determined according to the operational mode of the IC card 1. In the case where an administrator who manages the IC card 1 or a particular function in the IC card 1 approves of recovering the function of the IC card 1 possessed by a user according to a predetermined procedure of the user, it is assumed that the IC card 1 is caused to execute the recovery process with the IC card processing device 2 operated by the administrator.

Figure 28:
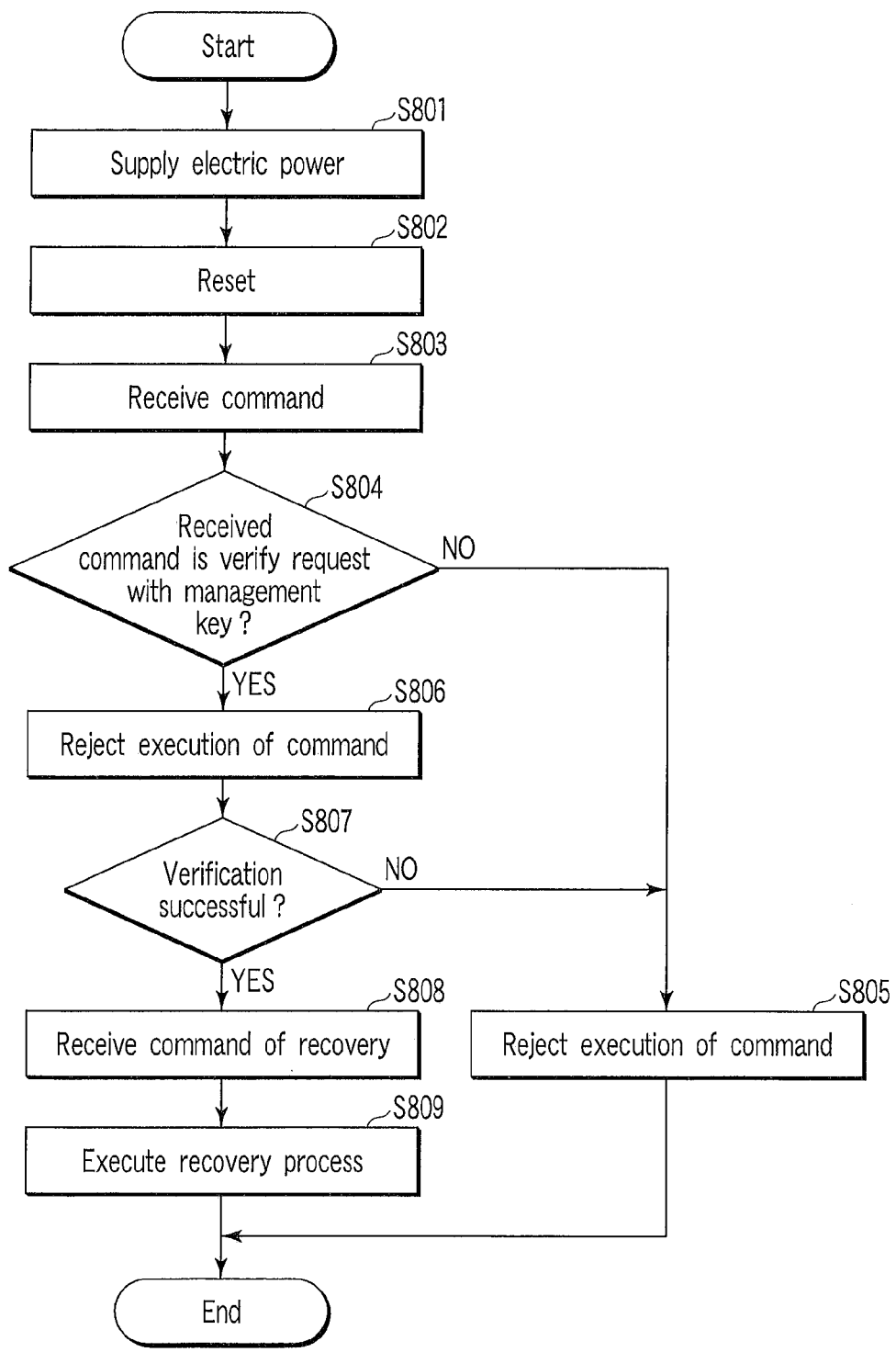
FIG. 28 is a flowchart showing a recovery process of recovering a function restricted in the IC card.

FIG. 28 is a flowchart showing a recovery process of recovering the function restricted in the IC card 1. The flowchart of FIG. 28 shows the process in the IC card 1 having the restricted function. In the restricted function of the IC card 1, it is assumed that the commands except for the verify request with the administrator key are not accepted (rejected).

When the IC card 1 receives the radio wave from the IC card processing device 2, the power supply 16 generates and supplies the power supply voltage and clock pulse to each unit (Step S801), and the reset process is executed (Step S802). After the reset process is completed, the IC card 1 is in the state in which the IC card 1 can receive the command from the IC card processing device 2 (Step S803). During the standby state, the control element 11 of the IC card 1 determines whether or not the received command is the command of the verify request with the administrator key (Step S804). In the IC card 1 having the restricted function, only the command of the verify request with the administrator key is accepted.

When the control element 11 of the IC card 1 determines that the received command is not the command of the verify request with the administrator key (NO in Step S804), the control element 11 rejects the execution of the process according to the command except for the command of the verify request with the administrator key (Step S805).

When the control element 11 of the IC card 1 determines that the received command is the command of the verify request with the administrator key (YES in Step S804), the control element 11 executes the verify process with the administrator key according to the command (Step S806). It is assumed that the verify process with the administrator key is always executed before the recovery process. That is, it is assumed that the recovery process is executed only after the successful verify process with the administrator key.

When the control element 11 of the IC card 1 fails to execute the verify process with the administrator key, the control element 11 stops the series of processes. That is, when the control element 11 of the IC card 1 fails to execute the verify process with the administrator key, the control element 11 rejects the execution of the recovery process according to the command for requesting the function recovery.

When the verify process with the administrator key is successfully executed, the control element 11 of the IC card 1 enters the state in which the control element 11 can accept the command for requesting the function recovery. When the control element 11 of the IC card 1 receives the command for requesting the function recovery from the IC card processing device 2 (Step S808), the control element 11 executes the recovery process of recovering the function according to the command (Step S809). When the recovery process is completed, the restricted function is enabled in the IC card 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An IC card comprising:
a storage unit in which information indicating contents of a plurality of commands that execute a series of regular processes and a reception sequence of the commands are stored;
a communication unit which receives a command from an external device; and
a control unit which determines whether or not a reception sequence of the command received by the communication unit matches the reception sequence stored in the storage unit, and executes the process according to the command received by the communication unit if the reception sequence of the command received from the communication unit matches the reception sequence stored in the storage unit,
wherein the storage unit stores information indicating a permissible range of a reception interval between correct commands, and
wherein the control unit determines whether or not a reception interval between an antecedent command following the antecedent command received by the communication unit exists within the permissible range of the reception interval between the correct commands stored in the storage unit, and executes a process according to the command received by the communication unit if the reception interval between the antecedent command and the command following the antecedent command received by the communication unit exists within the permissible range of the reception interval between the correct commands stored in the storage unit.

2. The IC card according to claim 1, wherein the storage unit stores information indicating a type and a processing parameter of each correct command, as information indicating correct process contents, and
wherein the control unit determines whether or not a type and a processing parameter of the command received by the communication unit matches the type and processing parameter of the correct command stored in the storage unit, and executes a process according to the command received by the communication unit if the type and processing parameter of the command received by the communication unit matches the type and processing parameter of the correct command stored in the storage unit.

3. The IC card according to claim 2, wherein the storage unit stores a plurality of values as the processing parameter.

4. The IC card according to claim 1, wherein the storage unit stores a range of a number of clocks of the IC card as the permissible range of the reception interval between the correct commands, and
the control unit determines whether or not a number of clocks indicating the reception interval between the antecedent command and the command following the antecedent command received by the communication unit exists within the permissible range of the reception interval between the correct commands stored in the storage unit.

5. The IC card according to claim 1, wherein the storage unit stores a plurality of pieces of information indicating correct process contents corresponding to a plurality of kinds of series of processes, and
wherein the control unit further selects information indicating the correct process contents from said plurality of pieces of information indicating correct process contents stored in the storage unit based on contents of the commands sequentially received by the communication unit,
determines whether or not the process contents of the command received by the communication unit matches the information indicating the correct process contents selected, and
executes a process according to the command received by the communication unit if the process contents of the command received by the communication unit matches the information indicating the correct process contents selected.

6. The IC card according to claim 5, further comprising an application storage unit in which a plurality of applications for executing various series of processes are stored,
- wherein the storage unit stores a plurality of pieces of information indicating correct process contents corresponding to the applications stored in the application storage unit, and wherein
- the control unit selects information indicating the correct process contents corresponding to the application whose selection is requested by the command from said plurality of pieces of information indicating correct process contents stored in the storage unit based on the commands for requesting the selection of the application received by the communication unit.

7. The IC card according to claim 1, further comprising a tentative storage unit in which data is tentatively stored,
- wherein the control unit stores the process contents in the tentative storage unit for a particular command, and
- cancels the process contents stored in the tentative storage unit if the command received by the communication unit does not match the process contents stored in the storage unit, and executes the process contents stored in the tentative storage unit if all the commands until the series of processes is completed are matched with the process contents stored in the storage unit.

8. The IC card according to claim 7, further comprising a non-volatile storage unit in which various pieces of data are stored,
- wherein the control unit stores write data, which should be written in the non-volatile storage unit, in the tentative storage unit with respect to the command for requesting write of data in the non-volatile storage unit,
- cancels the write data stored in the tentative storage unit if the command received by the communication unit is not authorized, and
- writes the write data stored in the tentative storage unit in the non-volatile storage unit if all the commands until the series of processes is completed are matched with the process contents stored in the storage unit.

9. The IC card according to claim 1, wherein the control unit further executes an error process of stopping a function of the portable electronic device if that the command received by the communication unit is not matched with the process contents stored in the storage unit.

10. The IC card according to claim 9, wherein the control unit further accepts a verify request with a management key from an external device in a state in which the function is stopped, and recovers the function stopped if verification is successfully executed with the management key.

11. The IC card according to claim 1, comprising:
- a module including the units; and
- a body in which the module is embedded.

12. A method of controlling an IC card, comprising:
- receiving a command from an external device;
- determining whether or not a reception sequence of the received command matches information indicating a correct reception sequence stored in a storage unit, and executing a process according to the received command, if it is determined that the reception sequence of the received command matches the reception sequence stored in the storage unit
- wherein information indicating a permissible range of a reception interval between correct commands is in the storage unit, and
- wherein the determining is configured to make a determination as to whether or not a reception interval between an antecedent command and a command following the antecedent command exists within the permissible range of the reception interval between the correct commands stored in the storage unit, and
- the executing is configured to execute a process according to the received command when it is determined the reception interval between the antecedent command and the command following the antecedent command exists within the permissible range of the reception interval between the correct commands stored in the storage unit.

13. The IC control method according to claim 12, wherein information indicating a type and a processing parameter of each correct command is stored as information indicating correct process contents in the storage unit, and
- wherein the determining is configured to make a determination as to whether or not a type and a processing parameter of the received command matches the type and processing parameter of the correct command stored in the storage unit, and the executing is configured to execute a process according to the received command when the type and processing parameter of the received command are matched with the type and processing parameter of the correct command stored in the storage unit.

14. The control method according to claim 12, wherein a plurality of pieces of information indicating correct process contents corresponding to a plurality of kinds of series of processes are stored in the storage unit, and
- further selecting information indicating the correct process contents from said plurality of pieces of information indicating correct process contents stored in the storage unit based on contents of the sequentially received commands,
- wherein the determining is configured to make a determination whether or not the process contents of the received command are matched with the information indicating the correct selected process contents, and the executing is configured to execute a process according to the received command when it is determined that the process contents of the received command are matched with the information indicating the selected correct process contents.

15. The IC control method according to claim 12, wherein the executing is configured to execute a process of tentatively storing the process contents in a tentative storage unit for a particular command, and the method further comprises:
- canceling the process contents stored in the tentative storage unit if the received command does not match the process contents stored in the storage unit; and
- executing the process contents stored in the tentative storage unit if all the commands until the series of processes is completed match the process contents stored in the storage unit.

16. The IC control method according to claim 12, further comprising:
- executing an error process of stopping a function of the portable electronic device if the received command does not match the process contents stored in the storage unit; and
- accepting a verify request with a management key from an external device in a state in which the function is stopped by the error process, and recovering the function stopped by the error process when verification is successfully executed with the management key.

17. An IC card comprising:
- a storage unit which stores information indicating a permissible range of a reception interval between correct commands executing a series of regular processes;

a communication unit which receives a command from an external device; and a control unit which determines whether or not a reception interval between an antecedent command and a command following the antecedent command received by the communication unit exists within the permissible range of the reception interval between the correct commands stored in the storage unit, and executes a process according to the command received by the communication unit if the reception interval between the antecedent command and the command following the antecedent command exists within the permissible range of the reception interval between the correct commands stored in the storage unit.

18. The IC card according to claim 17, wherein the storage unit stores a range of a number of clocks of the IC card as the permissible range of the reception interval between the correct commands, and wherein the control unit determines whether or not a number of clocks indicating the reception interval between the antecedent command and the command following the antecedent command received by the communication unit exists within the permissible range of the reception interval between the correct commands stored in the storage unit.

19. A method of controlling an IC card, comprising:

storing information indicating a permissible range of a reception interval between correct commands executing a series of regular processes;

receiving a command from an external device; and determining whether or not a reception interval between an antecedent command and a command following the antecedent command received by the communication unit exists within the permissible range of the reception interval between the correct commands stored in the storage unit, and executing a process according to the command received by the communication unit if the reception interval between the antecedent command and the command following the antecedent command exists within the permissible range of the reception interval between the correct commands stored in the storage unit.

20. The IC control method according to claim 19, further comprising storing a range of a number of clocks of the IC card as the permissible range of the reception interval between the correct commands in the storage unit, wherein the determining is configured to determine whether or not a number of clocks indicating the reception interval between the antecedent command and the command following the antecedent command received by the communication unit exists within the permissible range of the reception interval between the correct commands stored in the storage unit.

* * * * *